(12) United States Patent
Ode et al.

(10) Patent No.: US 8,260,300 B2
(45) Date of Patent: *Sep. 4, 2012

(54) BASE STATION APPARATUS AND MOBILE COMMUNICATION SYSTEM

(75) Inventors: Takayoshi Ode, Kawasaki (JP); Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 272 days.

This patent is subject to a terminal disclaimer.

(21) Appl. No.: 12/550,968

(22) Filed: Aug. 31, 2009

(65) Prior Publication Data

US 2009/0318156 A1    Dec. 24, 2009

Related U.S. Application Data

(63) Continuation of application No. 11/247,649, filed on Oct. 11, 2005, now Pat. No. 7,672,276, and a continuation of application No. PCT/JP03/07443, filed on Jun. 12, 2003.

(51) Int. Cl.
*H04W 36/00* (2009.01)

(52) U.S. Cl. ............... 455/436; 455/410; 455/452.2

(58) Field of Classification Search .......... 455/410, 455/436, 452.2, 453; 370/331–333
See application file for complete search history.

(56) References Cited

U.S. PATENT DOCUMENTS

| | | | |
|---|---|---|---|
| 5,649,000 A | 7/1997 | Lee et al. | |
| 5,848,063 A | 12/1998 | Weaver, Jr. et al. | |
| 6,498,933 B1 | 12/2002 | Park et al. | |
| 6,567,420 B1 * | 5/2003 | Tiedemann et al. | 370/468 |
| 6,768,903 B2 * | 7/2004 | Fauconnier et al. | 455/403 |
| 7,016,320 B1 * | 3/2006 | Petersson et al. | 370/331 |
| 7,197,318 B2 | 3/2007 | Schwarz et al. | |
| 7,769,382 B2 | 8/2010 | Rasanen | |
| 2002/0045447 A1 | 4/2002 | Rasanen | |
| 2003/0109256 A1 * | 6/2003 | Holcman | 455/436 |
| 2003/0190915 A1 | 10/2003 | Rinne et al. | |
| 2003/0210668 A1 | 11/2003 | Malladi et al. | |
| 2004/0090929 A1 * | 5/2004 | Laux et al. | 370/311 |
| 2004/0116143 A1 | 6/2004 | Love et al. | |
| 2004/0121777 A1 | 6/2004 | Schwarz et al. | |
| 2008/0064405 A1 | 3/2008 | Rasanen | |

FOREIGN PATENT DOCUMENTS

| | | |
|---|---|---|
| JP | 1-274524 | 11/1989 |
| JP | 7-240959 | 9/1995 |
| JP | 8-149551 | 6/1996 |
| JP | 10-66133 | 3/1998 |

(Continued)

OTHER PUBLICATIONS

Supplementary European Search Report, dated Jan. 21, 2011, for corresponding European Application No. EP 03 81 7254.

(Continued)

*Primary Examiner* — George Eng
*Assistant Examiner* — Inder Mehra
(74) *Attorney, Agent, or Firm* — Katten Muchin Rosenman LLP

(57) ABSTRACT

Disclosed is a handover method in radio communication. A base station apparatus monitors the receiving state of a terminal, detects, based upon the receiving state, whether the terminal is one in which there is a possibility that loss of a call or a decline in quality will occur or one in which loss of a call or a decline in quality has occurred, and hands over the terminal to another base station apparatus having a carrier frequency different from that of the present base station apparatus.

3 Claims, 43 Drawing Sheets

FOREIGN PATENT DOCUMENTS

| | | |
|---|---|---|
| JP | 10-136425 | 5/1998 |
| JP | 2000-511380 | 8/2000 |
| JP | 2002-315046 | 10/2002 |
| JP | 2003-18640 | 1/2003 |
| JP | 2003-78936 | 3/2003 |
| JP | 2003-143639 | 5/2003 |
| JP | 2003-143656 | 5/2003 |
| WO | WO 00/44189 | 7/2000 |
| WO | WO 02/089514 | 11/2002 |

OTHER PUBLICATIONS

United States Office Action dated Aug. 1, 2008.
United States Office Action dated Apr. 1, 2009.
International Search Report dated Sep. 2, 2003, from the corresponding International Application.
Notification of Reasons for Refusal dated Jul. 1, 2008, from the corresponding Japanese Application.

* cited by examiner

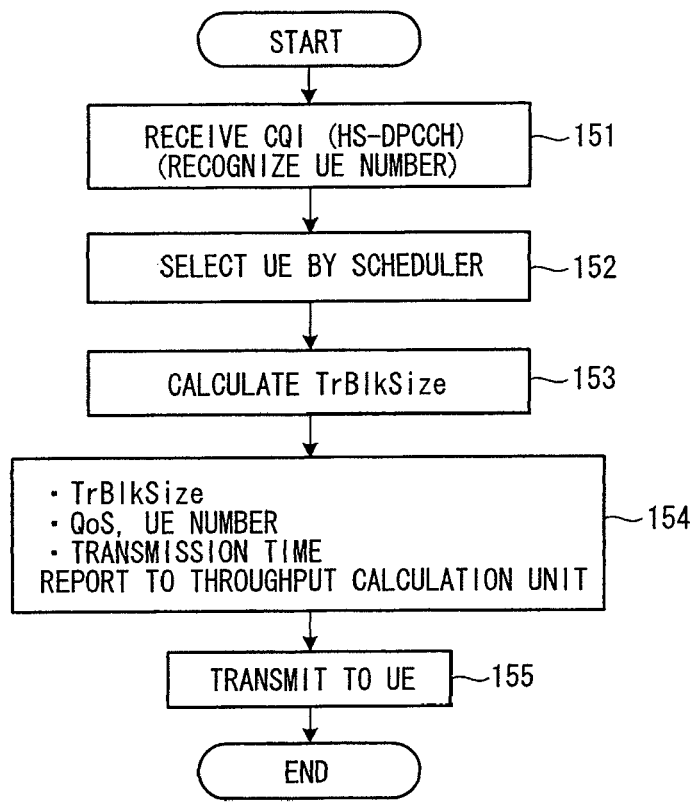
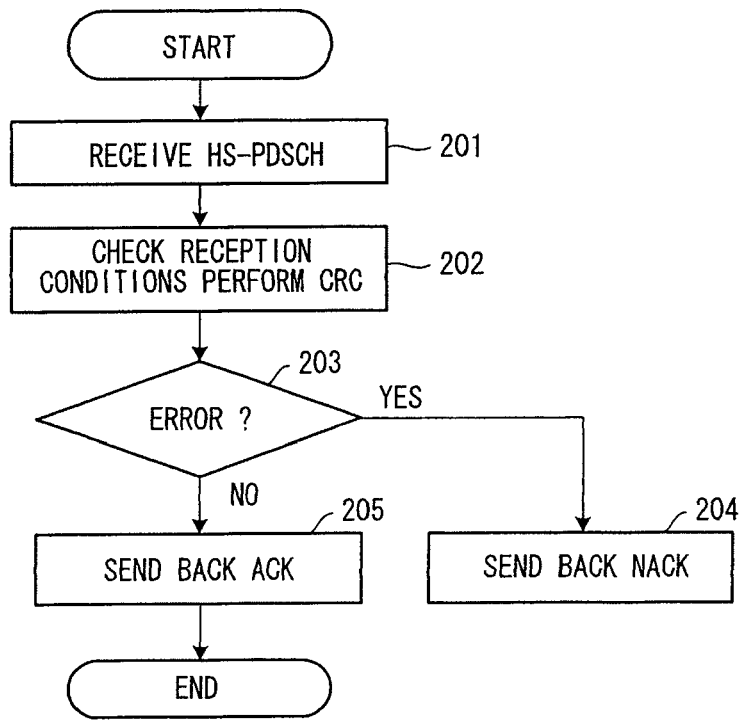

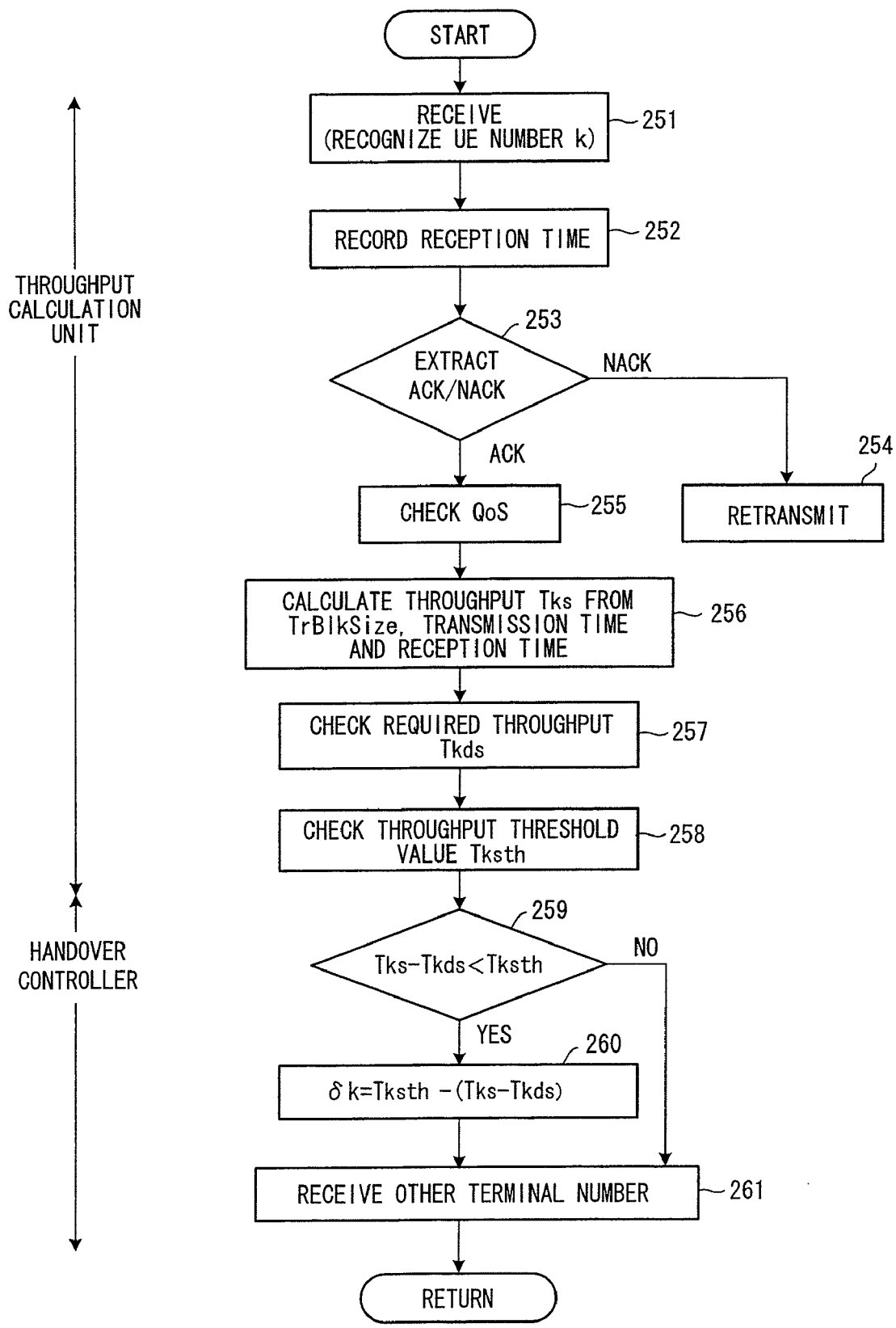

BASE STATION APPARATUS AND MOBILE COMMUNICATION SYSTEM

CROSS REFERENCE TO RELATED APPLICATION

This application is a continuation of U.S. application Ser. No. 11/247,649 filed Oct. 11, 2005, now pending, which is an continuation of International Application PCT/JP03/07443 filed on Jun. 12, 2003, now pending, the contents of which are herein wholly incorporated by reference.

BACKGROUND OF THE INVENTION

This invention relates to a base station apparatus and mobile communication system. More particularly, the invention relates to a base station apparatus and mobile communication system for dealing with loss of calls or decline quality as caused by a decrease in transmission speed, wherein when a required transmission speed for a certain terminal or service is no longer met or the required transmission speed is met but without enough margin, the terminal is handed over to another frequency being used at the same position (location) without the terminal moving, thereby solving problems such as loss of calls.

Although a W-CDMA system is described below by way of example, the invention is capable of being implemented in mobile communication systems unless stated otherwise. That is, the present invention is applicable to mobile communications as a whole and not just to W-CDMA systems alone.

In a W-CDMA system, service areas (hexagonal areas) in a cellular configuration of the kind shown in FIG. 48 are formed, a radio base station is deployed at the center and each service area is composed of one or a plurality of sectors. FIG. 48 illustrates a three-sector arrangement. A radio base station will be referred to simply as a base station or Node B below.

Further, a plurality of frequencies (carrier waves) are assigned to each sector. FIG. 49 illustrates a case where two frequencies have been assigned to one sector. The frequency of a base station Node B1 in FIG. 49 is assumed to be f1 and its service area is indicated by the solid line. The frequency of a base station Node B2 is assumed to be f2 and its service area is indicated by the dashed line. For the sake of illustration, the solid and dashed lines are drawn offset from each other although they may just as well overlap. In FIG. 49, one base station, i.e., one Node B, is indicated for one frequency. However, one Node B may be associated with two frequencies, as illustrated in FIG. 50. In this specification, basically one transceiver TRX is shown to be deployed per frequency. Accordingly, there are two cases, namely a case (FIG. 49) where one transceiver (one frequency) is provided for one Node B, and a case (FIG. 50) where a plurality of transceivers TRX1, TRX2 are provided for one Node B.

It should be noted that a terminal normally is capable of sending and receiving using all frequencies employed in a W-CDMA system.

Handover

An operation in which a terminal UE1 moves from a cell CL1 of a base station BTS1 to a cell CL2 of a base station BTS2 to thereby change the base station that is the connection destination, as illustrated in FIG. 51, is referred to generically as handover. Handover based upon movement is well known and, depending upon the particular method, is classified into soft handover, hard handover, different-frequency handover and cell change. Simply "handover" will be used below.

Handover in a system such as the conventional 3GPP Release 99 and PDC (Personal Digital Cellular) is implemented under the initiative of a Radio Network Controller (RNC), which is above the base station hierarchically. That is, the RNC manages movement of terminals and controls handover between cells, between sectors, between different frequencies and between different systems. Specific examples of control are designating a handover-destination base station, designating the establishment of a radio link to a handover-destination base station and designating the re-establishment of a radio link to a terminal UE. The base station (Node B) at this time executes processing in accordance with the designation made by the RNC. Further, ordinary handover is carried out as the terminal moves.

HSDPA (High Speed Downlink Packet Access)

In mobile communication such as W-CDMA, data communication is performed using packets. In the case of W-CDMA, specifications are being reviewed in the 3GPP ($3^{rd}$ Generation Partnership Project) and packet communication is being performed between radio base stations and terminals (mobile telephones, etc.) using protocols that have been decided by the project.

In 3GPP at the present time, the HSDPA (High Speed Downlink Packet Access) scheme is being studied in order to perform packet communication at higher speeds. This is a technique for the purpose of adopting a high speed of 2 Mbps for packet communication on the downlink (communication from the base station to the terminal). As mentioned above, HSDPA is being studied with a view to implementing standardization in Release 5, which is a 3GPP specification. The major changes in HSDPA in comparison with 3GPP Release 9 of the conventional specifications are the composition of the radio channels, retransmission control and the introduction of a scheduler. The composition of radio channels will be described below in simple terms and a scheduler that is directly related to the present invention will be described as well.

FIG. 52 is a schematic view of the configuration of an HSDPA system. A radio access system in 3GPP comprises an RNC (Radio Network Controller) 1, a Node B (base station) 2 and UEs (User Equipment: terminals) 3. The RNC is connected to a CN (Core Network) 4.

With HSDPA, a ① HS-DSCH (High Speed-Downlink Shared Channel) in a wired downlink section and a ② HS-PDSCH (High Speed-Physical Downlink Shared Channel) in a wireless downlink section are used as packet-data transmission channels CH. That is, HS-DSCH and HS-PDSCH are channels exclusively for the downlink and are shared by a plurality of UEs. They transmit packets that have been encoded as by turbo encoding.

In a wireless downlink section, a ③ HS-SCCH (High-Speed Shared Control Channel) is set up as a high-speed control channel, and control information for allowing the plurality of UEs to receive packet data on the HS-PDSCH is transmitted. The control information includes a user identifier (UEID: User Equipment Identifier) and various parameters (radio spreading code, modulation scheme, data-length information, etc.) for receiving data on the HS-PDSCH. The HS-SCCH is shared by a plurality of the UEs.

Furthermore, in a wireless uplink section, a ④ HS-DPCCH (High Speed Dedicated Physical Control Channel) is set up on a per-user basis. HS-DPCCH is a dedicated channel. This is a channel that transmits a value, which indicates the number of receivable bits, from each terminal to the base station based upon reception conditions (whether or not a packet could be received without errors) and the receiving state (the C/I, as one simple example). Notification indicative of the former, namely the reception conditions, is referred to as ACK (notification of acknowledgement of reception) or NACK (notification of reception failure), and information indicating the latter, namely the receiving state, is referred to as CQI (Channel Quality Indicator).

Channels in addition to those mentioned above are ⑤ DL Associated DPCH (Downlink Associated Dedicated Physical Channel) and ⑥ UL Associated DPCH (Uplink Associated Dedicated Physical Channel). These channels are radio channels established individually between each terminal and the base station. These are channels used in association with the HS-PDSCH in particular among the DPCHs (Dedicated Physical Channels) employed in conventional Release 99. These channels will be abbreviated to DL A-DPCH and UL A-DPCH below.

ACK/NACK and Retransmission Control

With HSDPA, data retransmission control is exercised between the Node B 2 and UE3. The UE3 reports ACK (notification of acknowledgement of reception) or NACK (notification of reception failure) with respect to the received data to the Node B 2 using the HS-DPCCH.

The flow of retransmission control is illustrated in FIG. 53, the structure of the terminal UE in FIG. 54 and the structure of the base station Node B in FIG. 55.

The terminal UE3 receives a packet, which has been transmitted by the above-mentioned HS-PDSCH, using a radio unit 3a, demodulates and decodes the packet using a demodulator 3b, performs a CRC check using a retransmission controller 3c and verifies the packet reception conditions (e.g., whether or not the packet could be received without errors). For example, in the event that no errors have been found, the terminal transmits ACK via a modulator 3d and radio unit 3e using the above-mentioned UL HS-DPCCH, thereby requesting the base station Node B to perform a new transmission. On the other hand, if an error is found as a result of the CRC check, the terminal transmits NACK using the UL HS-DPCCH, thereby requesting the base station Node B to perform retransmission. Retransmission is performed until error-free reception can be achieved, by way of example.

Meanwhile, the base station Node B receives UL HS-DPCCH by a radio unit 2a and demodulates and decodes the packet in a demodulator 2b. The base station then extracts the ACK/NACK signal in an ACK/NACK extraction unit 2c and performs retransmission control using a retransmission controller 2d. Specifically, in case of ACK, the retransmission controller 2d deletes a successfully transmitted packet that has been stored in a transmit buffer 2e. In case of NACK, the retransmission controller 2d retransmits an unsuccessfully transmitted packet, which has been stored in the transmit buffer 2e, via a modulator 2f and radio unit 2g using HS-PDSCH. Such retransmission control is carried out by a scheduler, which is described next.

Whether ACK or NACK is sent back changes depending upon whether or not receive data contains an error, which depends upon the receiving state of the terminal UE. As for the cause, factors that depend upon the states of C/I or/and S/N or/and the traveling speed of the terminal are significant. Here C/I stands for Carrier/Interference and corresponds to S/N and SIR (Signal/Interference), C represents signal power and I interference power with respect to interference. This is an index of the magnitude of interference. It indicates that the smaller the C/I, i.e., the greater the amount of interference, the greater the degradation of the receiving state.

Scheduler

In HSDPA introduced by 3GPP Release 5, the above-mentioned radio channels and a scheduler function that is for deciding the order of packet transmission are added anew. In order to describe the scheduler, a description will also be rendered with regard to HS-PDSCH. Unlike the conventional DPCH, HS-PDSCH is not a radio channel provided individually for a terminal that is a communicating party. That is, one HS-PDSCH, for example, is time-division multiplexed and is used by one terminal or by being shared by a plurality of terminals.

FIGS. 56 (A) to 56 (D) are diagrams useful in describing a mechanism for receiving packet data on the HS-PDSCH.

As shown at (A) of FIG. 56, a transmit cycle referred to as a "TTI" (Transmission Time Interval=2 ms) is set up on HS-SCCH. Control information is transmitted in conformity with the TTI and received by a plurality of UEs (two UEs #0 and #1) only if control information to be transmitted exists. The data transmitted on the HS-SCCH includes a user identifier (UEID: User Equipment Identifier) and various parameters (radio spreading code, modulation scheme, data-length information, etc.) for receiving data on the HS-PDSCH.

UE receives HS-SCCH data in all TTIs. For example, in slot #1 at (B) of FIG. 56, UE #1 and UE #2 receive the HS-SCCH data simultaneously. Each UE refers to the UEID in the data and compares it with its own ID. In this case, the UEID of the HS-SCCH data in slot #1 is "UE #1", and therefore UE #0 discards the receive HS-SCCH data and UE #1 loads the control data contained in the receive HS-SCCH data. UE #1 thenceforth extracts a parameter, which is for HS-PDSCH receive, from the control data portion, and receives the packet data on the HS-PDSCH [(C), (D) of FIG. 56].

Upon receiving data, the UE #1 refers to a "sequence number" contained in the data and checks to determine whether there is loss of data. In a case where all data could be received without error (without CRC error) and without loss of data, the UE #1 reports ACK to Node B using the HS-DPCCH. Further, if data has been lost or a CRC check error has occurred, then the UE #1 reports NACK to Node B using the HS-DPCCH. Operation is similar with regard to slots #2 to #5 and slots #7 and #8. The UE #1 receives packet data via the HS-PDSCH of slots #1, #4, and the UE #0 receives packet data via the HS-PDSCH of slots #2 and #3, slot #5 and slots #7 and #8.

A scheduler executes scheduling management and retransmission control for deciding in which slot a packet should be transmitted and which terminal should be assigned. FIG. 57 is a diagram illustrating the structure of base station Node B that includes a scheduler. Here reference characters 2h represent a scheduler, 2i a handover controller, and 2j a CQI extraction unit for extracting CQI information, which is information indicating the receiving state of a terminal, from receive data.

An example of operation of the scheduler 2h will be described below. Depending upon the CQI reported from a terminal and the communication service content (quality of service QoS) of the data transmitted, the scheduler 2h decides the order of data transmission suited for each terminal and effects the transmission in this order. A specific example of the decision of an order will be given below. It should be noted that what follows is a representative method and that the method is not limitative in any way.

① C/I Method

On the basis of the C/I, transmission is performed in order of descending C/I excellence. In case of HSDPA, a CQI of high value is adopted as an excellent C/I. There is a possibility that a terminal with a poor C/I will not be given an opportunity to transmit.

② Round Robin Method

This is a method in which transmission is performed equally irrespective of the receiving state of the terminal.

③ Proportional Fairness Method

This is a method in which transmission time is equalized and transmission is performed in order of descending C/I excellence.

Further, in addition to the methods cited above, weighting with regard to the traffic class (Streaming class, Conversational class, Interactive class and Background class), which will be described later, also is conceivable. These traffic classes are referred to generically as QoS (Quality of Service). Maximum speed (bit/sec) and minimum speed (bit/sec), etc., are defined as parameters in QoS. In particular, in case of the Conversational or Streaming class, quick response is sought in view of the applications of these classes and the stipulation on minimum speed is severe. In cases where the minimum speed is not complied with, service may no longer be provided, service may be suspended and the quality of transmitted data may not be maintained. As examples that may readily be understood, frame advance may occur when a moving picture is transmitted, and audio or video may be interrupted.

① Conversational class: This is a class in which a small-delay quality is required in both directions (example: voice).

② Streaming class: This is a class in which a small-delay streaming service is required in one direction (example: distribution of real-time moving pictures).

③ Interactive class: This is a class that requires a response within a fixed period of time as well as a low error rate (example: a Web browser or server access).

④ Background class: This is a best-effort class of the kind that is implemented in the background (example: E-mail or ftp).

Problems of the Prior Art

Depending upon the propagation environment in which a terminal is placed or the traveling speed of the terminal, problems may arise. That is, the stipulation on minimum speed in the QoS of the transmitted service may not be adhered to, a call may be lost in the midst of communication and quality may decline. This will be described below using a specific example.

Assume that a certain terminal UE2 is receiving a service (transmission of a moving picture) that requires quick response, and that the throughput required is 2 Mbyte/sec. Assume that since the propagation environment has worsened and interference has increased (i.e., that C/I has deteriorated), it is necessary to repeat retransmission and the actual throughput (transmission speed) has become 1 Mbyte/sec. A problem which arises at this time is that frames of the moving picture are lost, motion of people, etc., becomes stiff and the moving picture becomes a still picture. In some cases service must be halted because the quality of the moving picture is not maintained.

Prior art (JP01-274524A) in which the communication rate (throughput) of a mobile terminal is measured to render a decision as to whether handover should be performed is available as art for preventing loss of calls and a decline in quality. However, this is not art in which a terminal having little margin is allowed to handed over to a base station of a different frequency.

Prior art (JP07-240959A) in which handover from a terminal having little margin is performed based upon the reception level is available as art for preventing loss of calls and a decline in quality. However, this is not art in which whether handover will be performed or not is decided based upon the communication rate (throughput) of a mobile terminal or delay time or transmission power, and handover is allowed to be made to a base station of a different frequency.

Prior art (JP10-136425A) in which handover is performed at a different frequency is available. However, this is not art in which handover is performed upon detecting a terminal that is likely to experience loss of a call or a decline in quality based upon the communication rate (throughput) of the mobile terminal, delay time or transmission power.

SUMMARY OF THE INVENTION

Accordingly, an object of the present invention is to detect a terminal that is likely to experience loss of a call or a decline in quality and hand over this terminal to a base station having a different frequency, thereby preventing loss of calls and a decline in quality.

A base station apparatus according to the present invention monitors the receiving state of a terminal, detects, based upon the receiving state, whether the terminal is one in which there is a possibility that loss of a call or a decline in quality will occur or one in which loss of a call or a decline in quality has occurred, and hands over the terminal to another base station apparatus having a different carrier frequency.

More specifically, a base station apparatus receives and demodulates a signal that has been transmitted from each terminal, extracts CQI information, which is indicative of the receiving state of the terminal, from the demodulated data, sets the size of data to be transmitted to this terminal based upon the CQI information of this terminal, calculates transmission speed based upon the size of this transmit data, transmit time and receive time of this data, determines whether handover is necessary for this terminal based upon a required transmission speed, which is decided by service quality QoS of the transmit data, and the calculated transmission speed, and hands over this terminal to another base station apparatus, which has a different carrier frequency, if handover is necessary.

In another example, the base station apparatus receives and demodulates a signal that has been transmitted from each terminal, extracts CQI information, which is indicative of the receiving state of the terminal, from the demodulated data, sets the size of data to be transmitted to this terminal based upon the CQI information of this terminal, calculates transmission delay time based upon the size of this transmit data, transmission time and reception time of this data, determines necessity of handover for each terminal based upon a maximum allowable delay time, which is decided by service quality QoS of the transmit data, and the calculated transmission time, and hands over this terminal to another base station apparatus, which has a different carrier frequency, if handover is necessary.

Thus, in accordance with the present invention, in a case where a required transmission speed for a certain terminal or service is no longer met or the required transmission speed is met but without enough margin, the terminal is handed over to another frequency being used at the same position (location) without the terminal moving, thereby making it possible to solve problems such as loss of calls.

BRIEF DESCRIPTION OF THE DRAWINGS

FIG. 4 is an example of a second processing flow according to the first embodiment;

FIG. 5 is an example of a third processing flow according to the first embodiment;

FIG. 6 is an example of a fourth processing flow according to the first embodiment;

DESCRIPTION OF THE PREFERRED EMBODIMENTS

(A) First Embodiment

Figure 1:
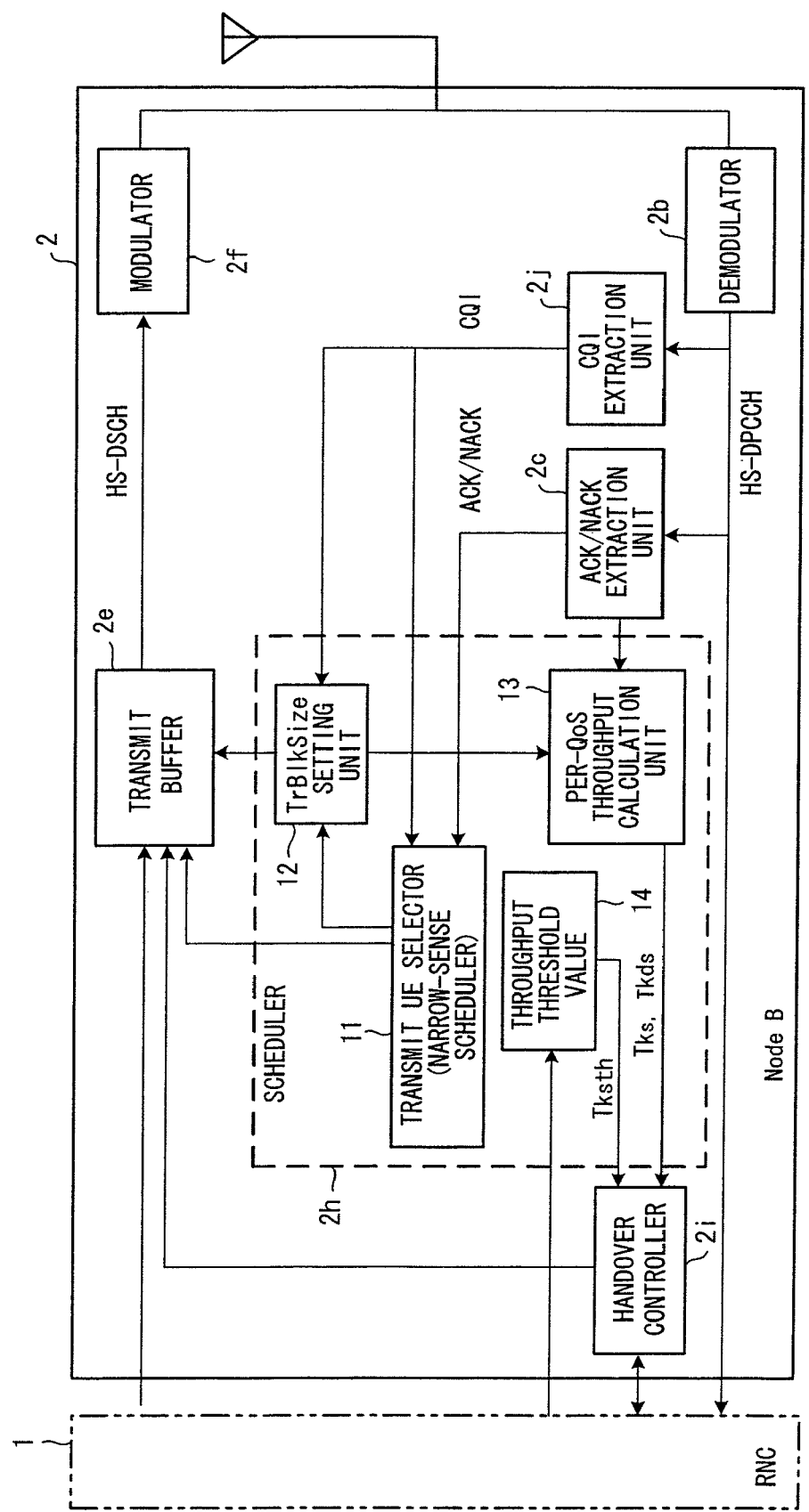
FIG. 1 is a structural view of a first embodiment in which throughput (transmission speed) is calculated on a per-service basis and handover is performed based upon the throughput.
Figure 2:
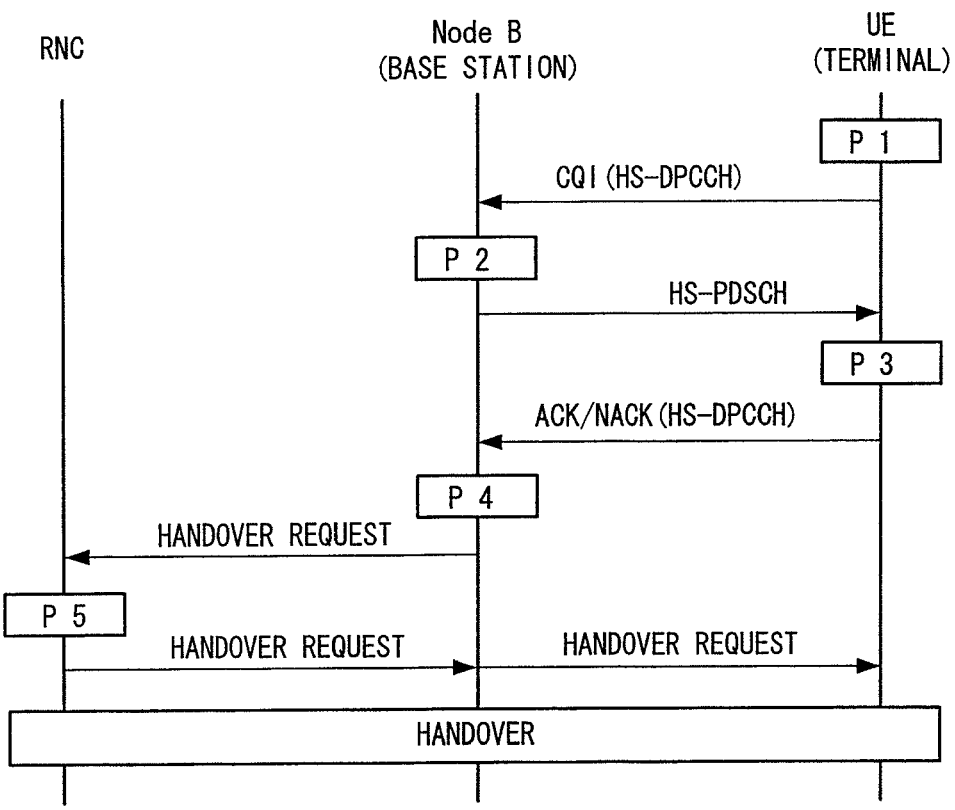
FIG. 2 illustrates an example of a protocol in the first embodiment.
Figure 3:
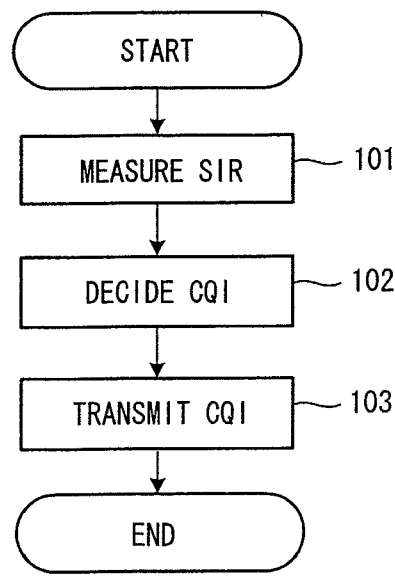
FIG. 3 is an example of a first processing flow according to the first embodiment.
Figure 7:
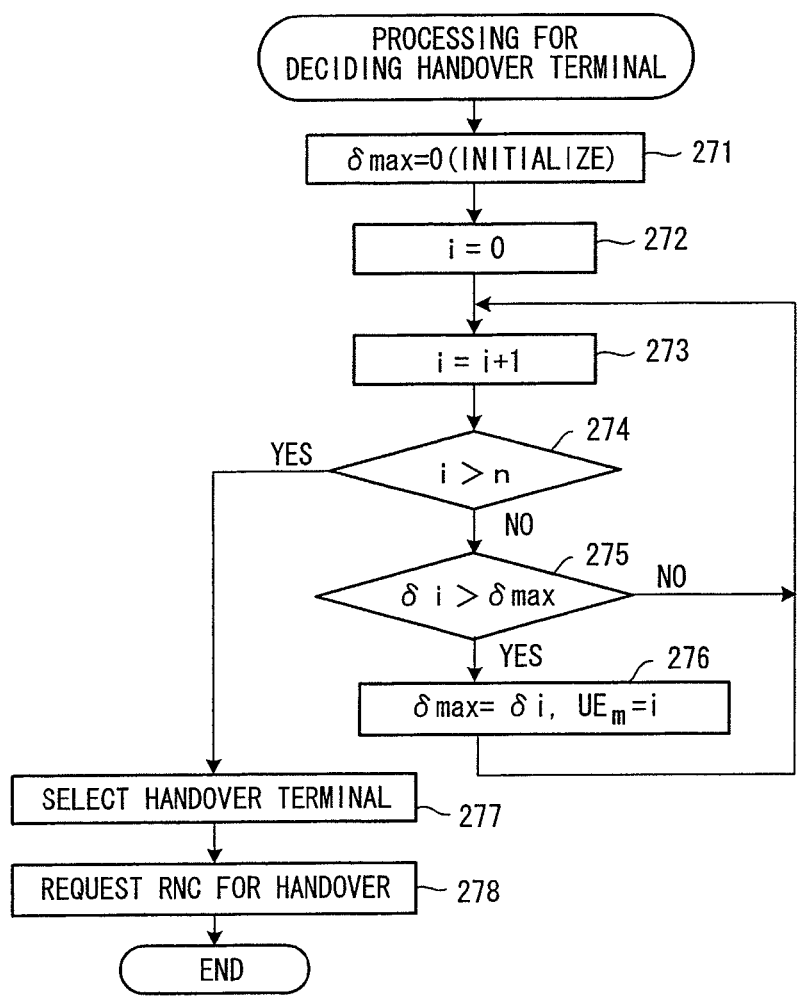
FIG. 7 is an example of a fifth processing flow according to the first embodiment.
Figure 8:
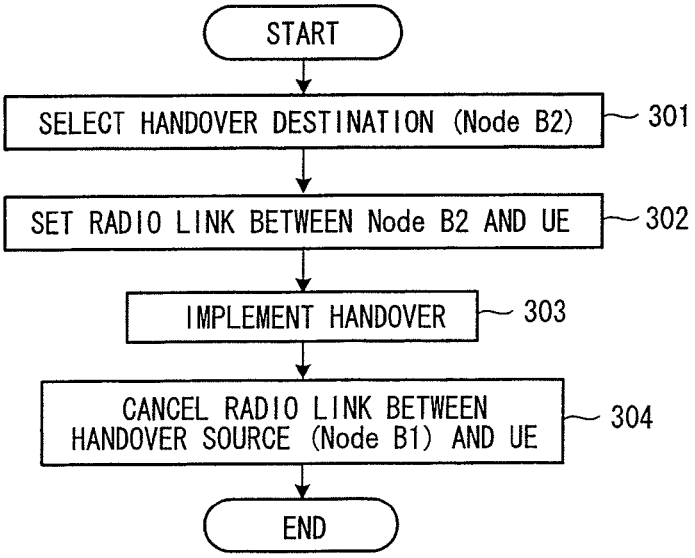
FIG. 8 is an example of a sixth processing flow according to the first embodiment.
Figure 57:
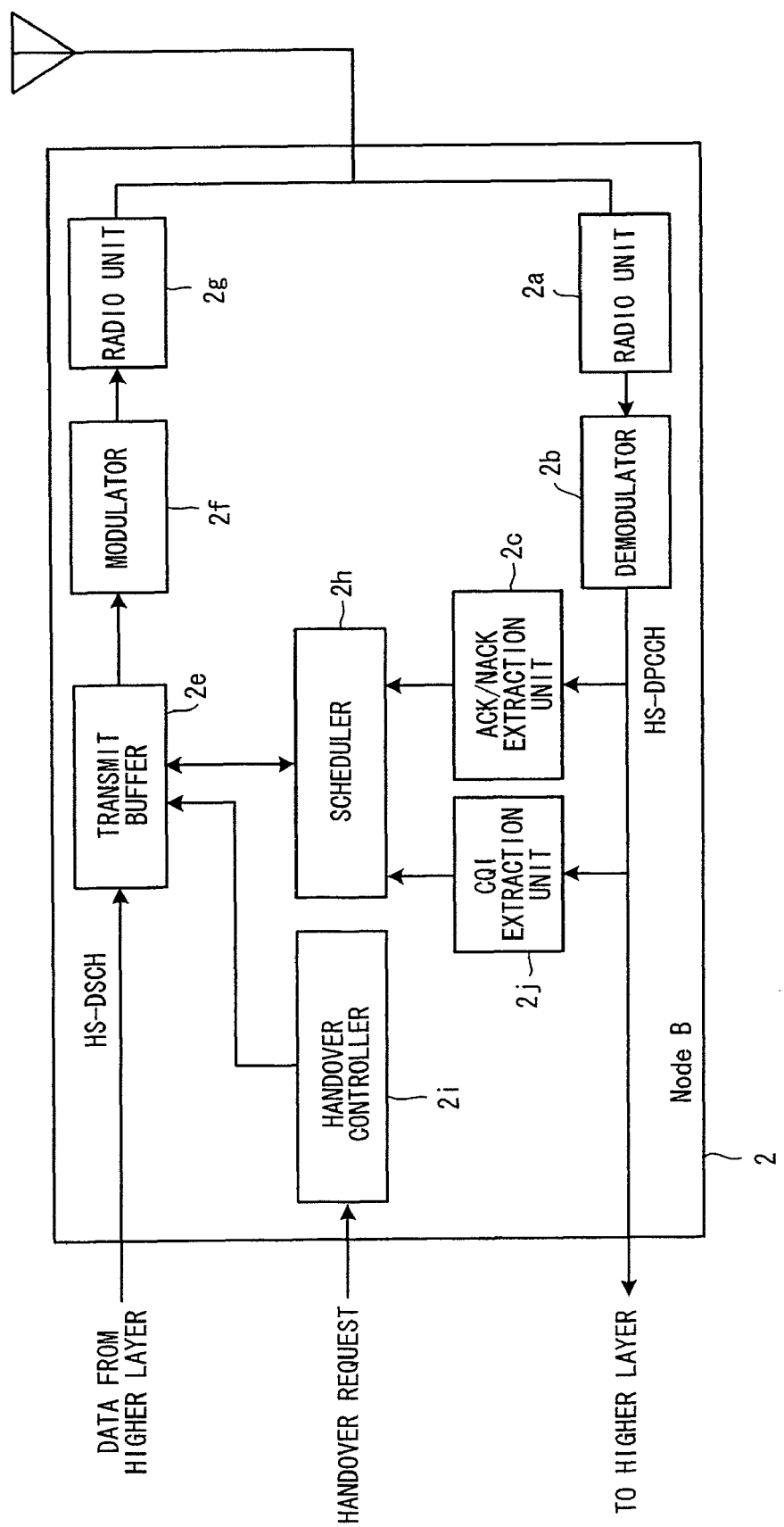
FIG. 57 is a structural view of a base station Node B that includes a scheduler.

FIG. 1 is a structural view of a first embodiment in which throughput (transmission speed) is calculated on a per-service basis and handover is performed based upon this throughput, FIG. 2 illustrates an example of a protocol and FIGS. 3 to 8 illustrate examples of processing flow. FIG. 3 illustrates the processing flow of processing P1 in the protocol of FIG. 2, FIG. 4 illustrates the processing flow of processing P2, FIG. 5 illustrates the processing flow of processing P3, FIGS. 6 and 7 illustrate the processing flows of processing P4, and FIG. 8 illustrates the processing flow of processing P5. Components in FIG. 1 identical with those of the prior art described in FIG. 57 are designated by like reference characters.

A case in which it is assumed that communication is performed between base station Node B and terminals UE1 to UEn (not shown) and is implemented by HSDPA of W-CDMA will be described below as one example.

First, as will be illustrated in FIG. 3, a terminal UEk measures or calculates C/I or SIR by receiving a pilot channel CPICH (step 101). Based upon the result, the terminal estimates the receiving state (or propagation environment) of the terminal UEk and calculates CQI (step 102). The CQI is obtained by preparing a table of correspondence between C/I and CQI and finding it from the table. Next, the terminal encodes and modulates the CQI, places it on the HS-DPCCH and sends it back to the base station Node B (step 103), as illustrated in FIG. 2.

At base station Node B, a radio receiver (not shown) receives HS-DPCCH, the demodulator 2b demodulates and decodes the receive signal and a CQI extraction unit 2j extracts CQI information from the decoded data (FIG. 4; step 151). In this case, it is possible to identify from which terminal the information was obtained by using a spreading code specific to the terminal.

Based upon the CQI reported from each terminal and the communication service content (quality of service QoS) of the transmit data, a transmit UE selector 11 of the scheduler 2h decides the order of data transmission suited for each terminal and inputs the data to the transmit buffer 2e (step 152).

A block size setting unit 12 calculates the transport block size (TrBlkSize) based upon the CQI (step 153) and inputs a terminal number of interest and number of transmit bits (transport block size TrBlkSize) to the transmit buffer 2e.

The block size setting unit 12 notifies a throughput calculation unit 13 of the terminal number (UE number), which is the communicating party, the transport block size (TrBlkSize), the time of transmission and the service quality QoS (or traffic class) of the transmit data (step 154). Since throughput is substantially defined as transmission speed, transmission speed will be abbreviated to throughput below.

The transmit buffer 2e inputs data, which conforms to the transport block size of the terminal, to the modulator 2f, and the modulator 2f encodes and modulates the data and transmits it to the terminal using HS-PDSCH (see FIG. 2) (step 155).

As illustrated in FIG. 5, the terminal UEk that has received HS-PDSCH determines by a CRC check whether the received data contains an error (steps 201 to 203). If the data contains an error, the terminal construes that the data has not arrived and sends NACK back to the base station Node B using HS-DPCCH (see FIG. 2; step 204). If there is no error, the terminal sends back ACK similarly using HS-DPCCH (step 205).

At the base station that has received HS-DPCCH from the terminal UEk, the demodulator 2b demodulates and decodes the received signal and the ACK/NACK extraction unit 2c extracts ACK/NACK from the demodulated data, records the reception time and inputs the results to throughput calculation unit 13 (steps 251 to 253). In case of NACK, the scheduler 2h performs retransmission control (step 254). In case of ACK, the throughput calculation unit 13 checks the quality of service QoS (step 255) and calculates throughput Tks for every quality of service QoS based upon the transport block size TrBlkSize held at the time of transmission, transmission time ts and reception time tr in accordance with the following equation:

$$Tks = TrBlkSize/(tr-ts)$$

and inputs the throughput to handover controller 2i (step 256).

Further, the throughput calculation unit 13 obtains a required throughput Tkds that conforms to QoS and inputs this to the handover controller 2i (step 257). The method of calculating the required throughput Tkds involves preparing a table of correspondence between QoS and the required throughput and finding the required throughput Tkds from this correspondence table.

Further, a throughput threshold value generator 14 inputs a throughput threshold value Tksth, which conforms to the QoS set beforehand at a higher layer, to the handover controller 2i (step 258). The throughput threshold value Tksth is a threshold value of throughput margin, which is the difference between the actual throughput and desired throughput.

The handover controller 2i calculates the difference Tks−Tkds between Tks and the required throughput Tkds and compares the difference (Tks−Tkds) with the throughput threshold value Tksth of throughput margin (step 259).

If Tks−Tkds<Tksth holds, then the controller adopts the terminal of interest as a handover candidate and calculates and stores δk=Tksth−(Tks−Tkds) (step 260). On the other hand, if Tks−Tkds≧Tksth holds, then the controller does not adopt the terminal as a handover candidate and takes no action.

The controller thenceforth executes the above-described processing with regard to all terminals (UE1 to UEn) currently connected (step 261) and selects a terminal UEm having the least margin with respect to the threshold value in accordance with the processing flow of FIG. 7. It should be noted that since it is also possible to furnish a plurality of services to a terminal, throughput can be calculated for every QoS with respect to one terminal and it is possible to determine the difference with respect to the required throughput as well as the margin.

In FIG. 7, initialization is performed as δmax=0 (step 271) Next, after i=0 is performed, i is incremented (steps 272, 273) and whether i has exceeded a number n of handover candidates is checked (step 274). If i≦n holds, an ith candidate δi and δmax are compared in size (step 275). If δi≦δmax holds, control returns to step 273 and processing from this step onward is repeated. If δi>δmax holds, the operation δmax=δi is performed, UEm=ith candidate is adopted (step 276), control returns to step 273 and processing from this step onward is repeated.

On the other hand, if i>n is found to hold at step 274, the ith candidate that has been stored is selected as the terminal UEm having the least margin with respect to the threshold value (step 277), this terminal UEm is transmitted to the radio network controller RNC and handover is requested (step 278).

The handover management unit of the RNC performs conventional well-known handover control from the base station Node B to the terminal UEm for which handover has been requested. As illustrated in FIG. 8, this handover control includes selecting the handover-destination Node B2 having a carrier frequency different from that of the present base station (step 301), setting a radio link between the handover-destination Node B2 and the UE (step 302), implementing handover (step 303) and canceling the radio link between original Node B1 and the UE (step 304)

By achieving handover to a base station of a different frequency based upon the first embodiment, the following effects are obtained:

In a case where the terminal UEm has moved to a better transmission environment, it becomes possible to perform communication without a failure such as loss of an image in the transmission of a moving picture, by way of example.

The base station Node B is capable of alleviating the processing load ascribable to communication. Further, it is possible to level the processing load between base stations or frequencies. As a result, it is possible to service new users.

A communication system (provider) may readily assure a communication speed with respect to a service (QoS). As a result, an appealing offer of high quality can be made to users.

In the first embodiment, CQI is calculated based upon C/I that has been measured or calculated and the CQI is sent back to the base station. However, C/I may be sent back without using the CQI, and S/N may be sent back. Further, although transport block size TrBlkSize is decided in the base station based upon this CQI, transmission may be performed using TrBlkSize, which has been specified at the higher layer (RNC), without using CQI.

Further, although data arrival/non-arrival is sent back using ACK/NACK, ACK/NACK need not be used if calculation of throughput is possible.

Further, it is possible to perform handover based simply upon whether the required throughput has or has not been met without determining the margin of throughput, i.e., in a case where Tks<Tkds holds. In this case, however, there is a possibility that a call will be lost and communication terminated.

The throughput threshold value Tksth may be provided from a higher layer or decided by the base station. Further, the throughput threshold value Tksth may be varied for every service and may be changed dynamically based upon the transmission environment.

Furthermore, since the required throughput indicates the time that can be allowed in order to transmit certain data, it is equivalent to the maximum allowable amount of delay.

It is also possible to share the burden of processing between the RNC and base station as by using the RNC to make the comparison with threshold value of throughput margin.

Further, it is possible to perform control by a higher-layer device rather than by the RNC. By controlling and managing handover in an RNC of a higher layer, selection of the frequency of the handover-destination is facilitated.

The transmit UE selector 11 that selects the terminal as the party to communications in accordance with the conventional method is adopted as a narrow-sense scheduler and portions inclusive of functional portions for retransmission control and for deciding transport block size TrBlkSize, AMC (Adaptive Modulation and Coding) and the like shall be referred to as the scheduler 2h.

Figure 9:
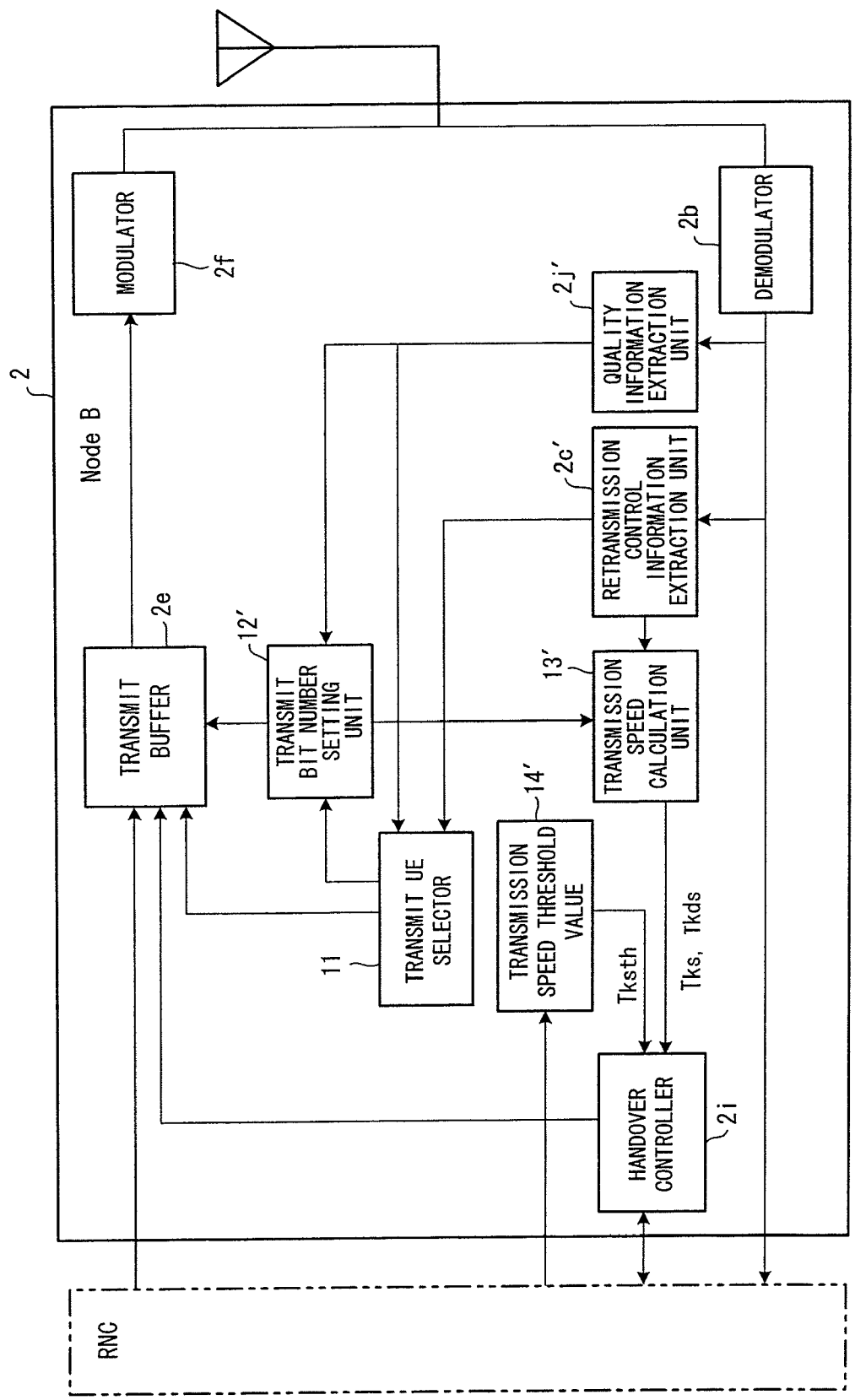
FIG. 9 is a structural view of the general form of the first embodiment.

FIG. 9 is a structural view of the general form of the first embodiment. Here the ACK/NACK extraction unit 2c, CQI extraction unit 2j, block size setting unit 12, throughput calculation unit 13 and throughput threshold value generator 14 of FIG. 1 have been changed to a retransmission control information extraction unit 2c', a quality information extraction unit 2j', a transmit bit number setting unit 12', a transmission speed calculation unit 13' and a transmission speed threshold value generator 14', respectively.

Figure 10:
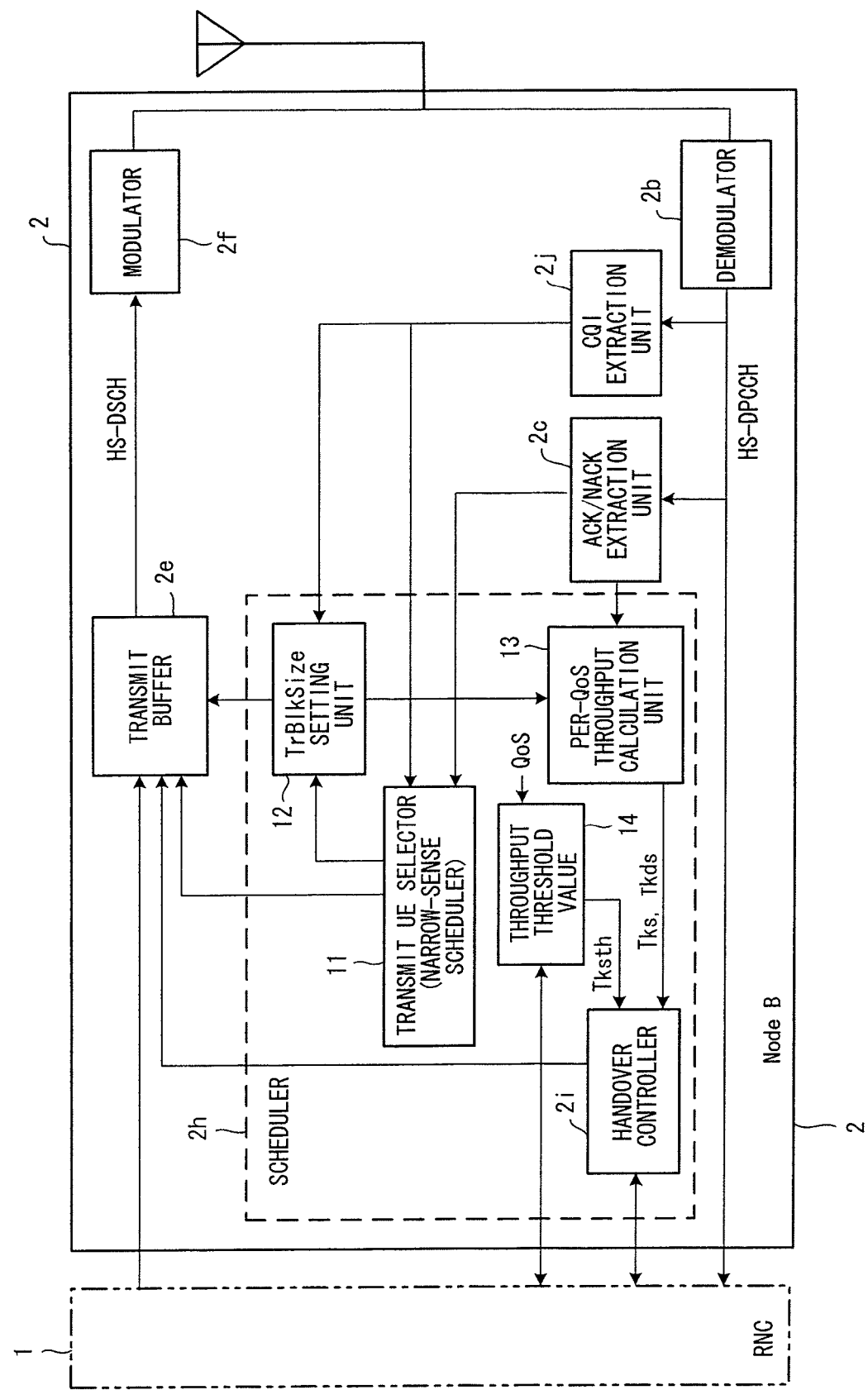
FIG. 10 is a structural view of the first embodiment in a case where a handover controller is incorporated in a scheduler.
Figure 11:
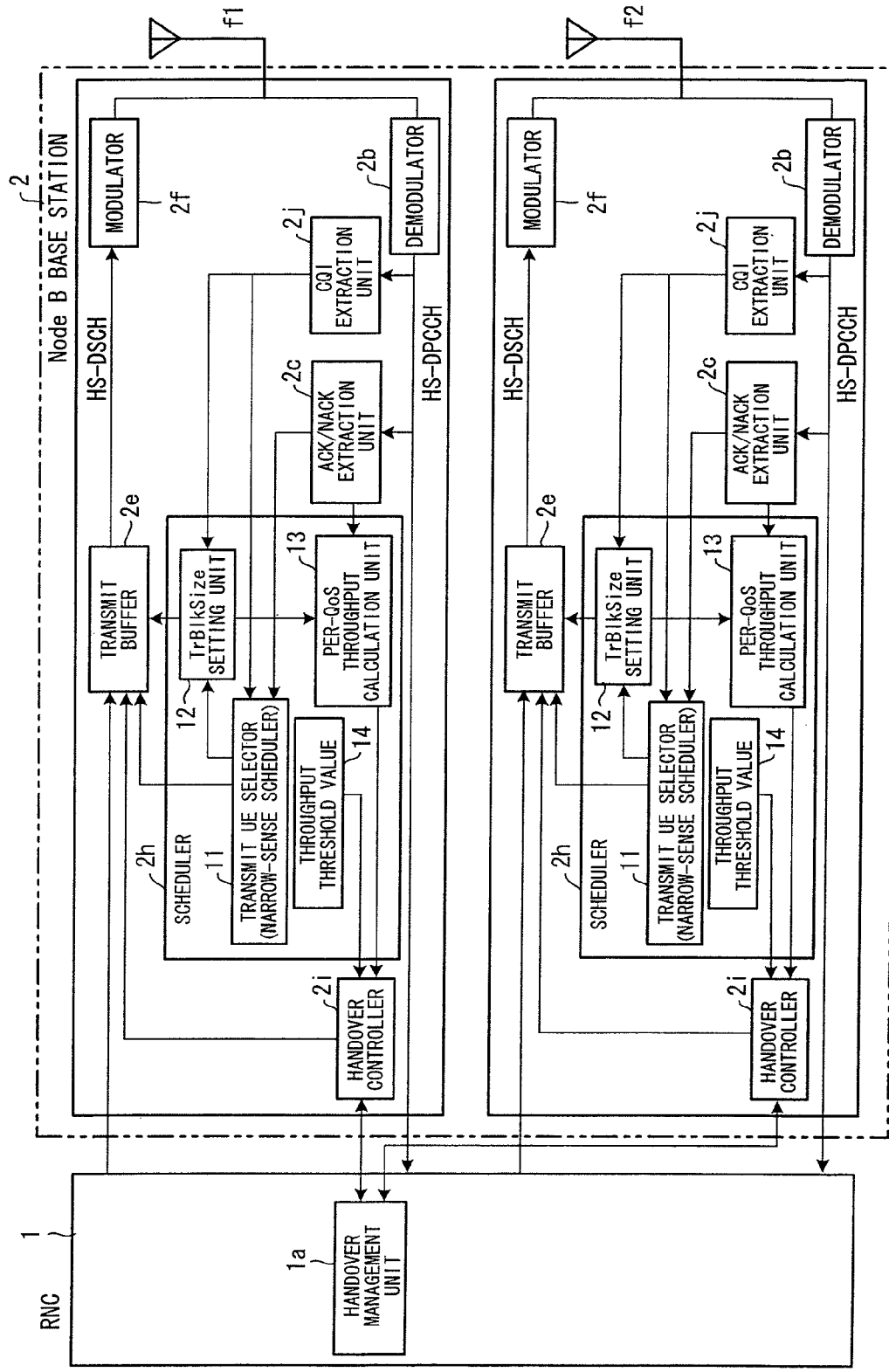
FIG. 11 is a structural view of a case where two carrier waves (frequencies f1, f2) have been assigned to one Node B.

In the embodiment of FIG. 1, the handover controller 2i is not placed in the scheduler 2h. As shown in FIG. 10, however, it can also be incorporated in the scheduler 2h. Further, the first embodiment illustrates a case where one Node B is associated with one carrier wave, i.e., where one carrier wave is assigned to one Node B. However, plurality carrier waves can be assigned to one Node B. FIG. 11 is a structural view of a case where two carrier waves (frequencies f1, f2) have been assigned to one Node B. This is an arrangement in which a transceiver (scheduler and handover controller) is provided for each carrier wave, and it is just as if two Node Bs, each of which has one carrier wave assigned thereto, exist. Furthermore, a handover management unit 1a in the RNC performs the handover control of FIG. 8.

(B) Second Embodiment

In the first embodiment, the base station Node B exercises handover control, decides the necessity of handover and the terminal to be handed over and requests the radio network controller RNC to perform handover. However, all of this processing can be brought to the RNC.

Figure 12:
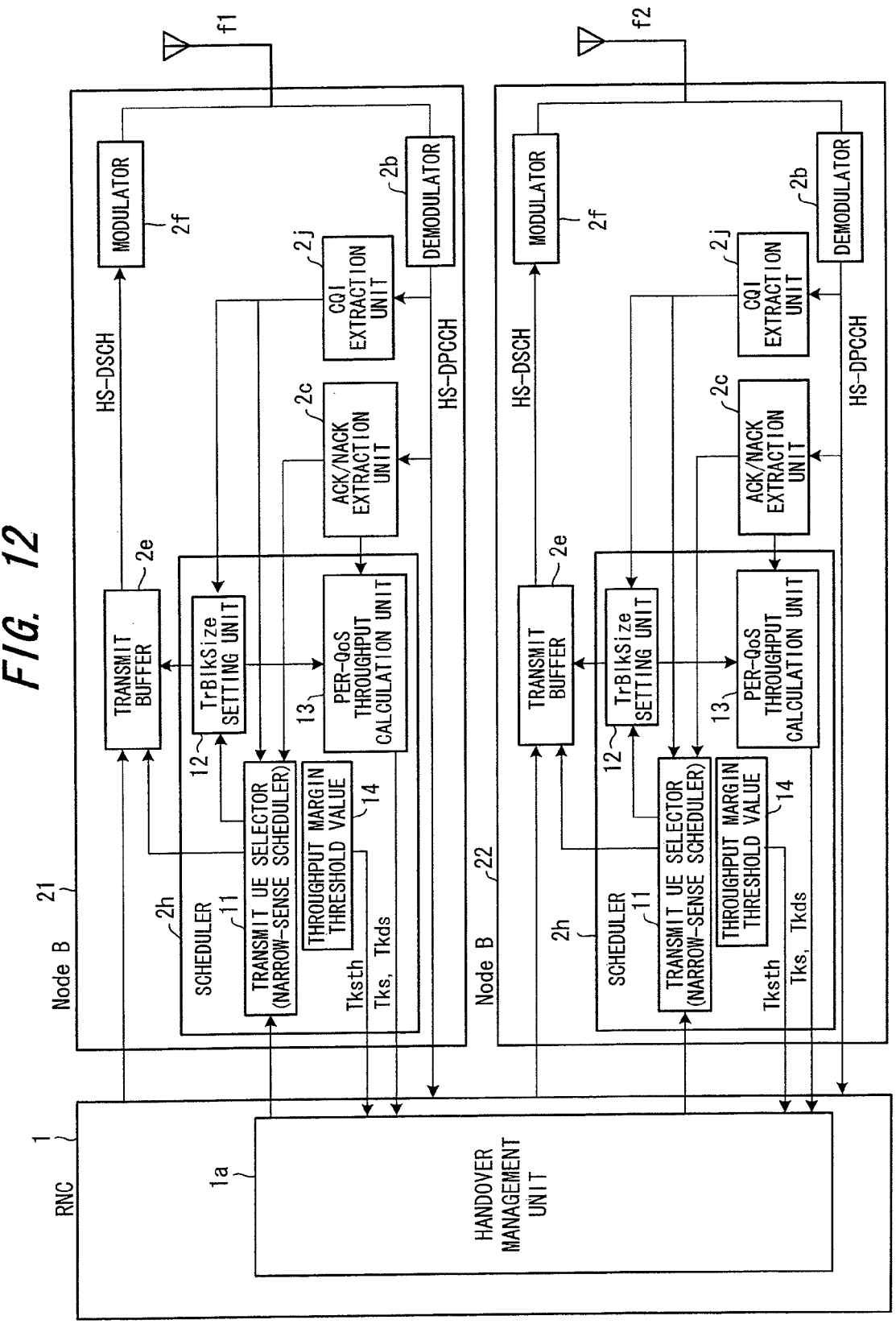
FIG. 12 is a structural view of a second embodiment.
Figure 13:
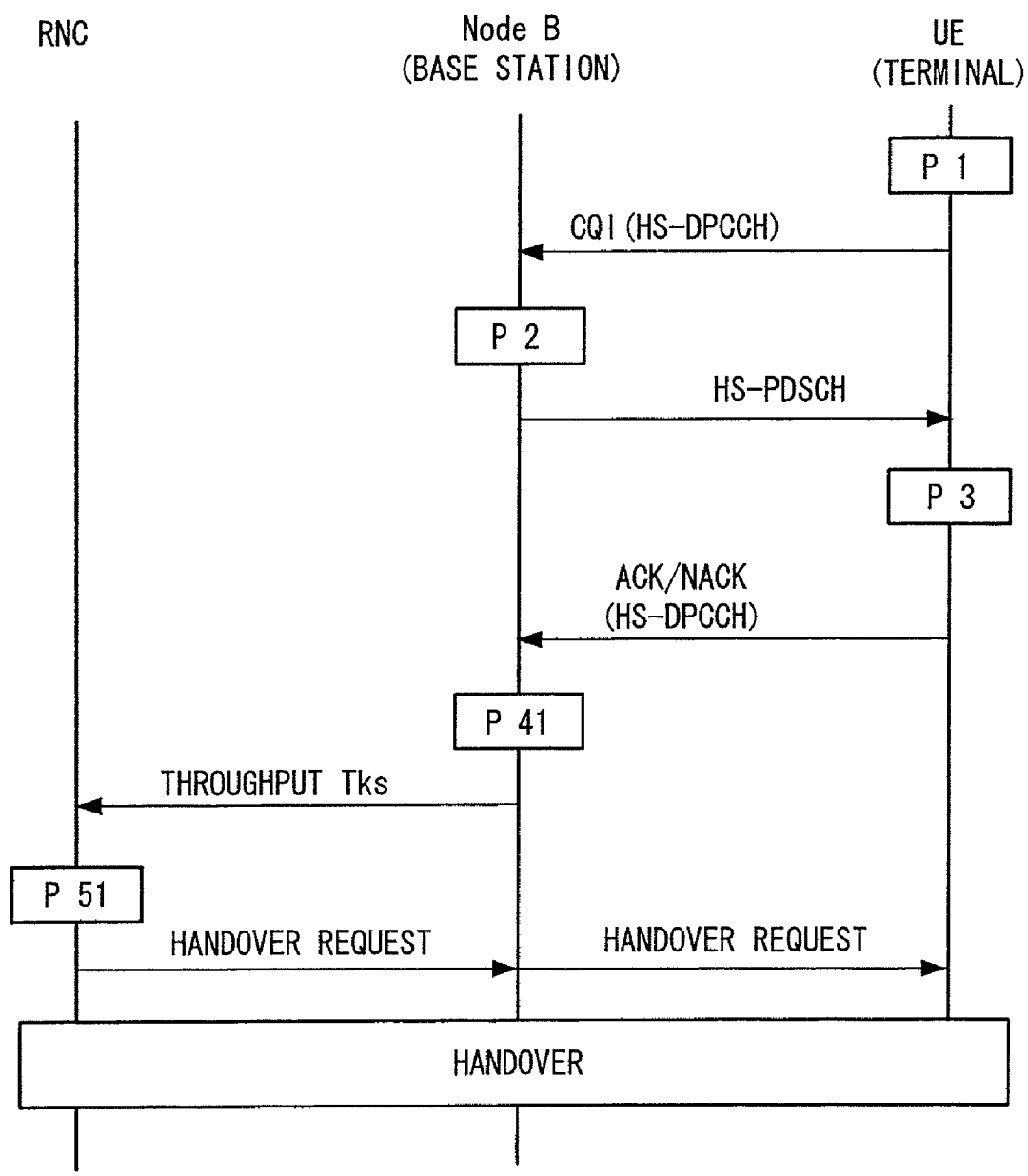
FIG. 13 illustrates an example of a protocol in the second embodiment.
Figure 14:
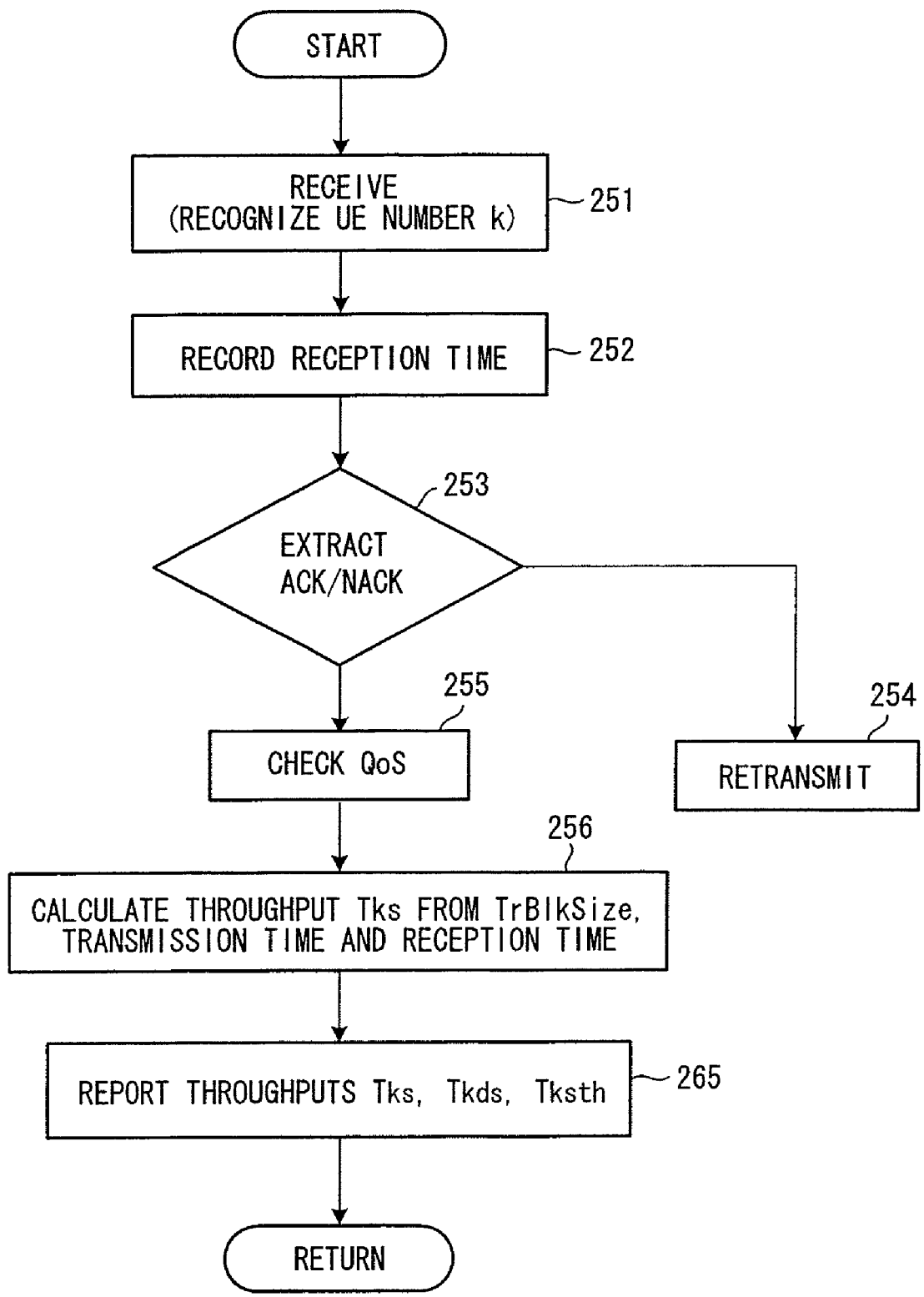
FIG. 14 is a first processing flow according to the second embodiment.
Figure 15:
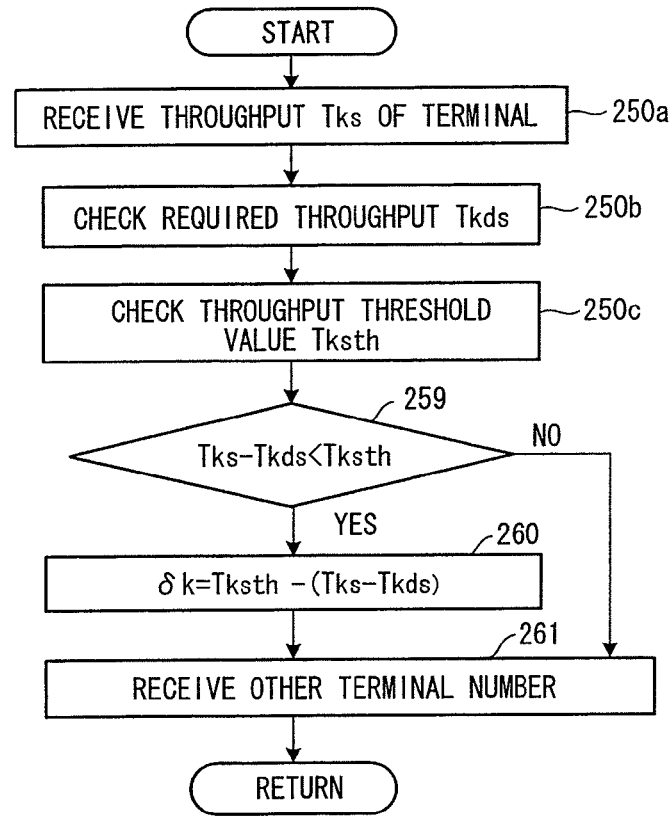
FIG. 15 is a second processing flow according to the second embodiment.
Figure 16:
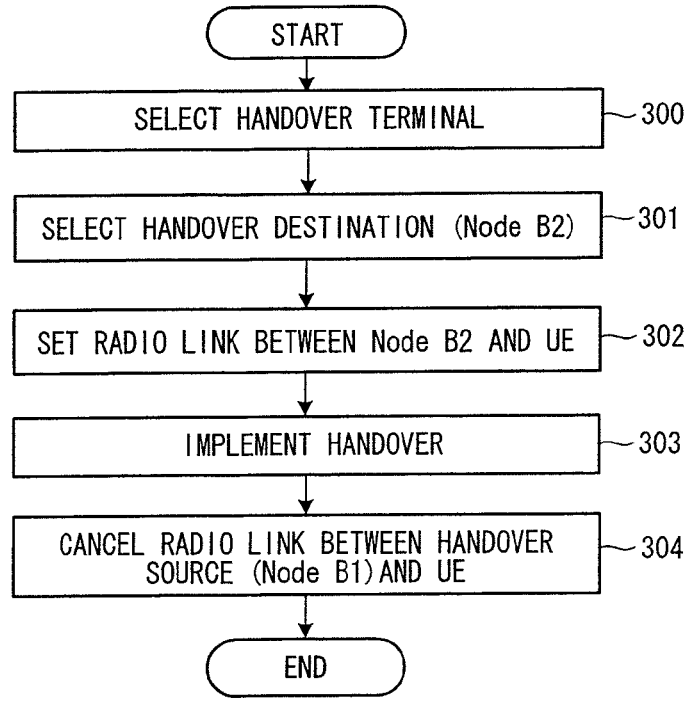
FIG. 16 is a third processing flow according to the second embodiment.

FIG. 12 is a structural view of a second embodiment, FIG. 13 is an example of a protocol in the second embodiment and FIGS. 14 to 16 illustrate processing flow. Only portions that are different from the first embodiment will be described below. In the protocol of FIG. 13, processing P1 to P3 is the same as that of the first embodiment, and processing P41, P51 is different from that of the first embodiment. FIG. 14 shows the processing flow of processing P41, and FIGS. 15, 16 show the processing flow of processing P51.

In the second embodiment, the required throughput Tkds with respect to service quality QoS, the actual throughput Tks for every UE and every QoS and the throughput threshold value Tksth are all managed in unified fashion by the RNC, which is the higher layer, and whether handover is necessary or not is determined. As a result, the determination as to whether or not handover is necessary and the selection of the frequency of the handover destination are facilitated by taking into account status of use and actual throughput with regard to a frequency being used by a certain sector. This arrangement also has a high degree of affinity for conventional systems.

Only operation different from that of the first embodiment will be described below.

In a base station Node B 21 having the frequency f1 as its carrier, processing for calculating actual throughput Tks with regard to a certain terminal UEk and required throughput Tkds is similar to that of the first embodiment (steps 251 to 256 in FIG. 14).

Next, the throughput calculation unit 13 and throughput threshold value generator 14 of base station Node B 21 report the throughput Tks, the required throughput Tkds and the throughput threshold value Tksth to the RNC (step 265). At this time the throughput calculation unit 13 also reports the UE number (k in this case) and QoS (or traffic class) to the RNC.

The handover management unit 1a of the RNC exercises handover control in accordance with the processing flow of FIG. 15. Specifically, upon receiving the throughput Tks, the required throughput Tkds and the throughput threshold value Tksth (steps 250a to 250c), the handover management unit 1a selects the terminal UEm that has the least margin or that does not meet the required throughput (steps 259 to 261) in a manner similar to that of the first embodiment (see the processing flow of FIG. 6).

Next, the handover management unit 1a selects the handover destination (e.g., base station Node B 22, which has the different frequency f2 as its carrier) and performs handover in accordance with the processing protocol of FIG. 16. It should be noted that step 300 is a step of deciding the handover terminal by processing identical with that of FIG. 7, and that steps 301 to 304 are processing steps identical with those of FIG. 8 in the first embodiment.

Thus, in accordance with the second embodiment, effects similar to those of the first embodiment can be obtained. Furthermore, control of the RNC becomes flexible and easier owing to the fact that the information for performing handover can be managed in unified fashion.

(C) Third Embodiment

A third embodiment has a controller for every carrier frequency and executes decentralized processing of handover solely within the base station.

Figure 17:
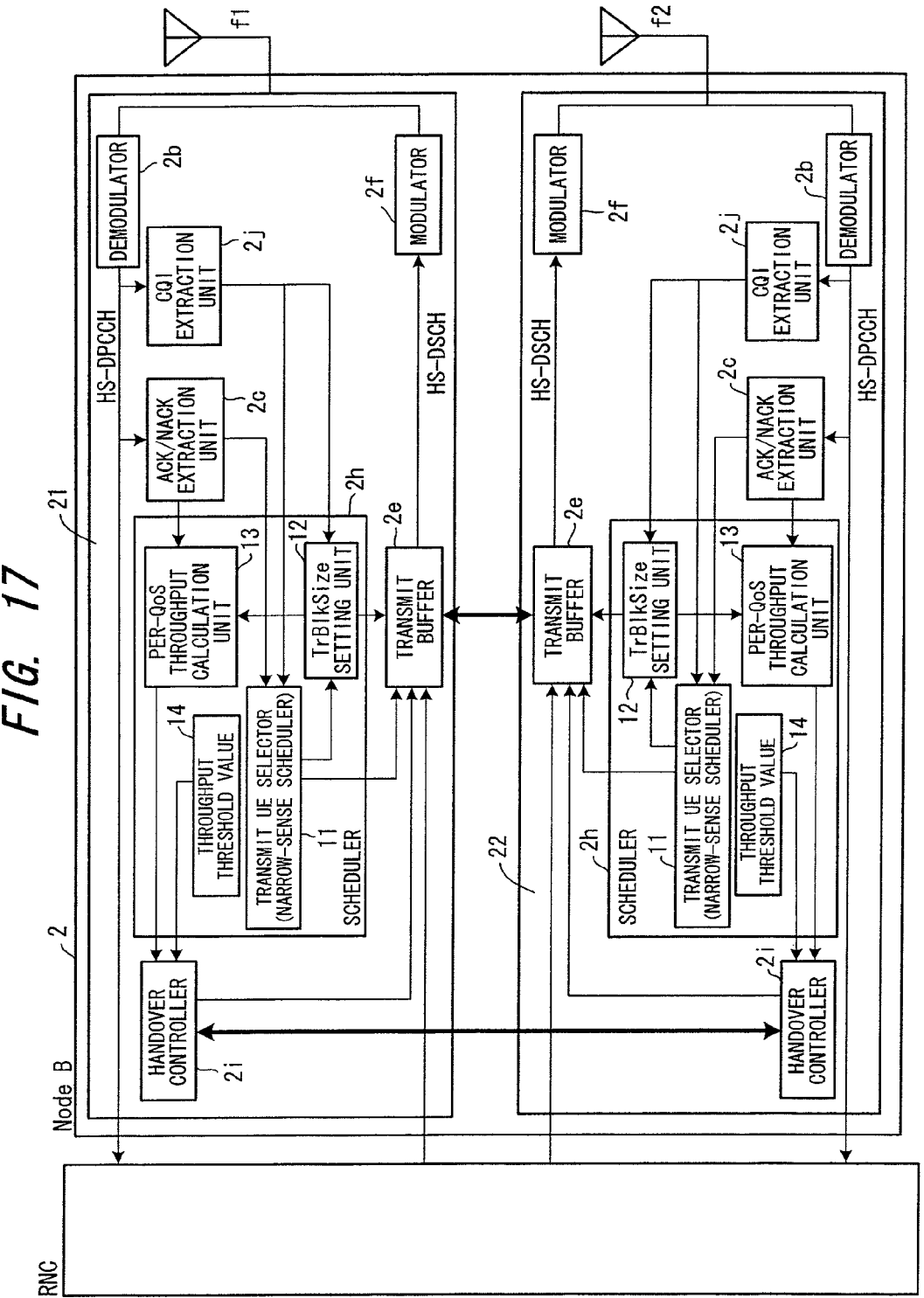
FIG. 17 is a structural view of a third embodiment.
Figure 18:
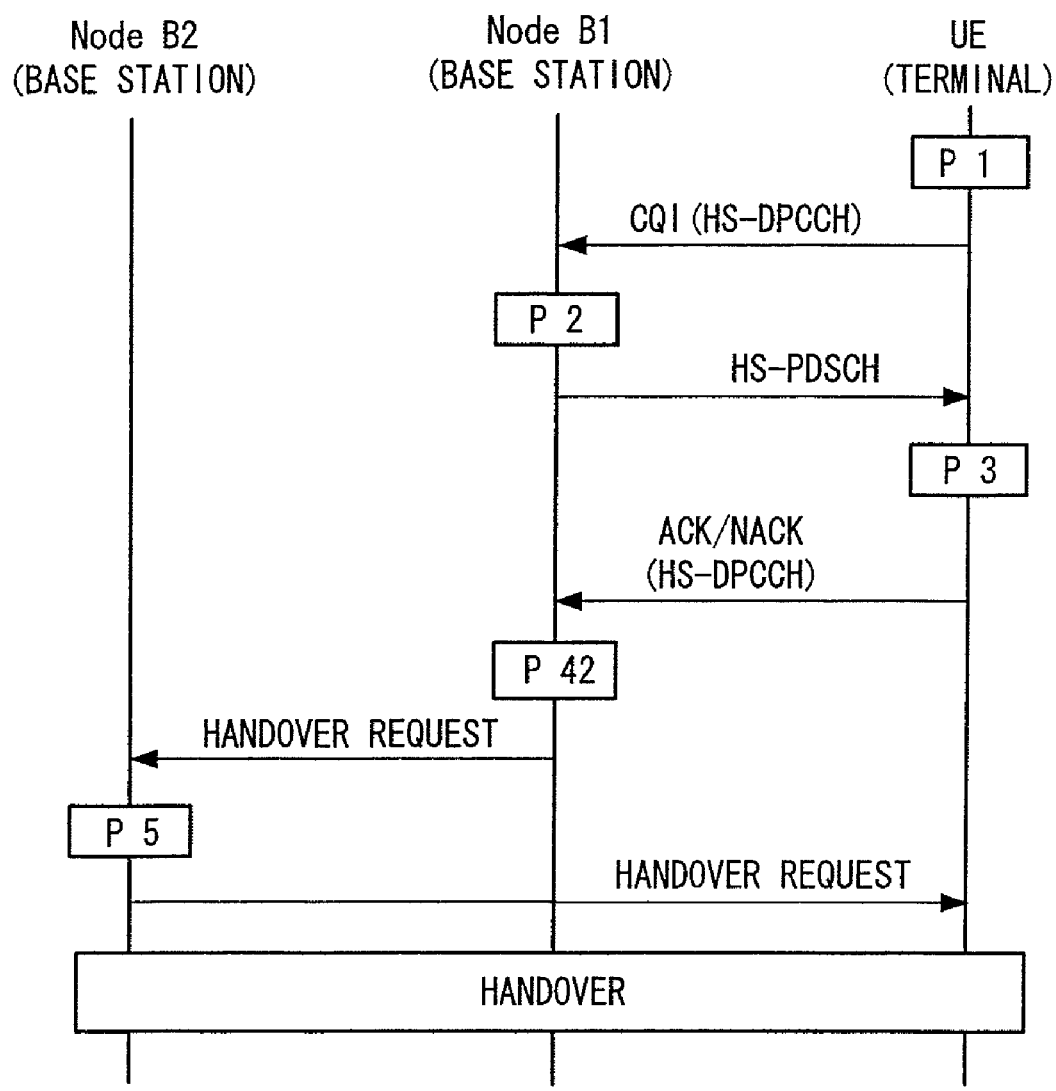
FIG. 18 illustrates an example of a protocol in the third embodiment.
Figure 19:
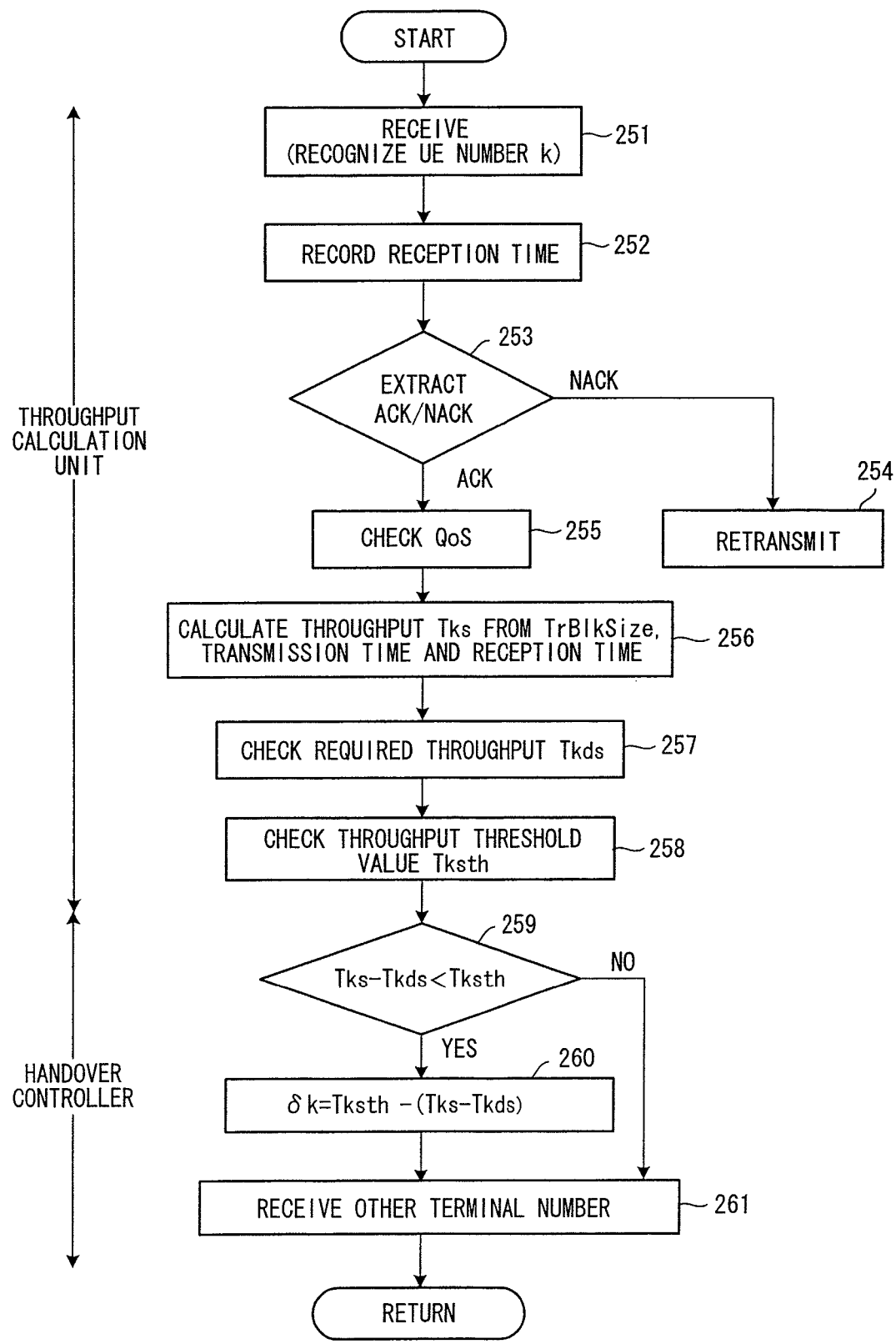
FIG. 19 is a first processing flow according to the third embodiment.
Figure 20:
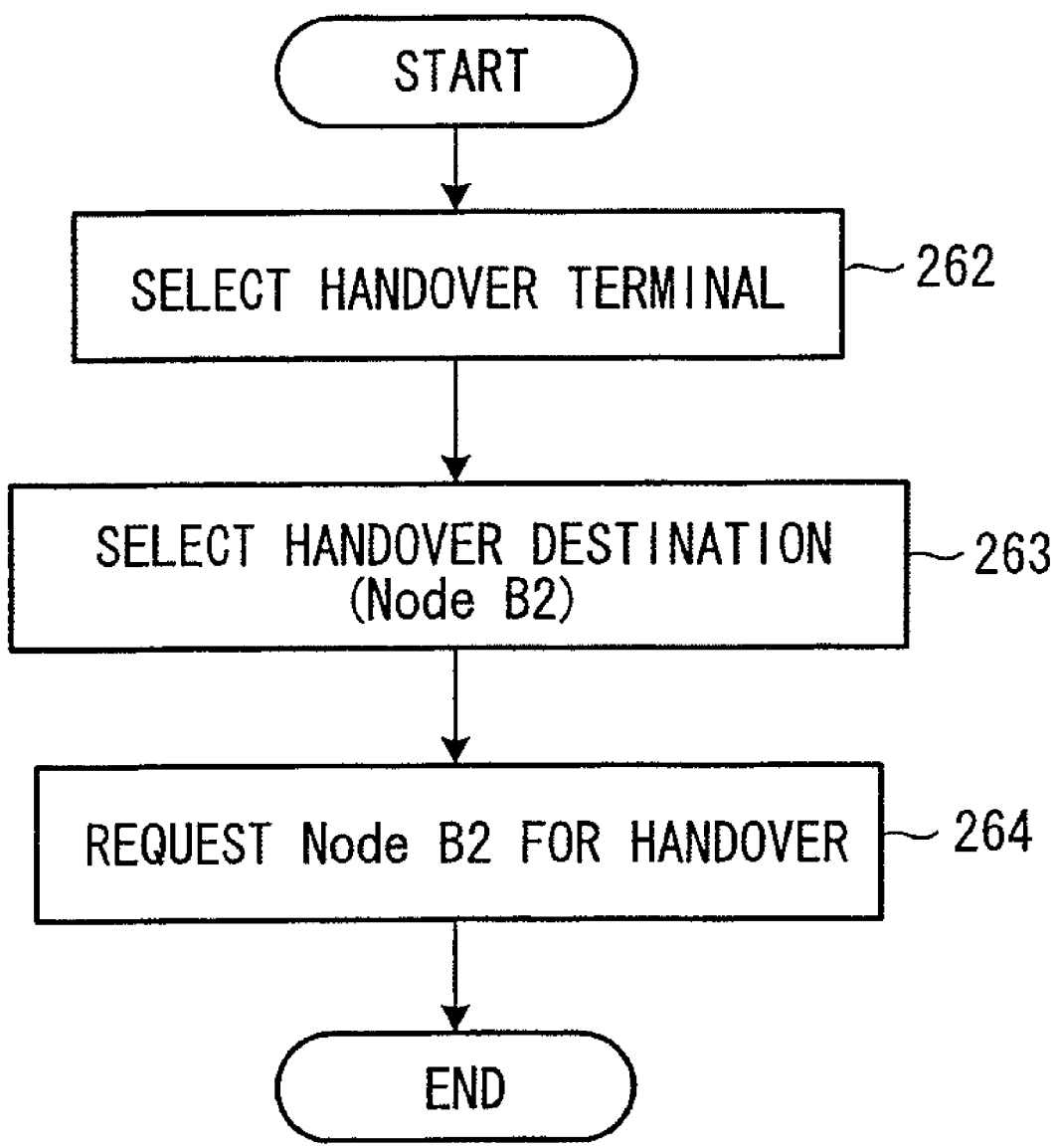
FIG. 20 is a second processing flow according to the third embodiment.

FIG. 17 is a structural view of the third embodiment, FIG. 18 is an example of a protocol in the third embodiment and FIGS. 19, 20 illustrate processing flow. In the protocol of FIG. 18, processing P1 to P3 and P5 is the same as that of the first embodiment, and processing P42 is different from that of the first embodiment. FIGS. 19, 20 show the processing flow of processing P42.

In the first and second embodiments, management and control of handover are carried out at a higher layer (e.g., the RNC). In the third embodiment, however, control and management of handover are performed by the base stations or by the transceivers within the base stations, as indicated by the arrow symbols between the handover controllers. That is, decentralized autonomous control is performed and not unified control by the higher-layer apparatus.

Only operation that differs from that of the first embodiment will be described below. It will be assumed that a terminal that has been assigned to the transceiver (frequency f1)

21 within the base station Node B will be handed over to the transceiver (frequency f2) 22 within the base station Node B.

In the transceiver 21, processing up to the selection of terminal UEm having the least margin with respect to a threshold value and the decision to perform handover (steps 251 to 261 in FIG. 19, step 262 in FIG. 20) is similar to that of the first embodiment. Step 262 is a processing step of deciding the handover terminal in accordance with the processing flow of FIG. 7.

Next, the handover controller 2i of transceiver 21 selects the handover destination from among base stations or transceivers within base stations that are transmitting a frequency that terminal UEm, which is to be handed over, is capable of receiving without moving (step 263 in FIG. 20). Assume that the destination is transceiver 22 in Node B. The handover controller 2i then requests handover to the handover controller 2i of this transceiver 22 (step 264).

The handover controller 2i of transceiver 22 to which handover has been requested performs handover control with respect to the terminal UEm.

Thus, in accordance with the third embodiment, effects similar to those of the first embodiment can be obtained. In addition, according to the third embodiment, it becomes possible to perform handover without the intermediary of the RNC, as a result of which the amount of communication with the higher layer can be reduced. Further, since it is possible for information to be exchanged directly, the time required for handover can be shortened.

(D) Fourth Embodiment

In the first to third embodiments, the difference between the required throughput and the actual throughput is provided with a threshold value and handover is performed from the terminal of greatest degradation. In a fourth embodiment, maximum allowable delay time that has been set for each service is taken into consideration, the terminal that is most strict concerning delay is selected and handover control is carried out.

Figure 21:
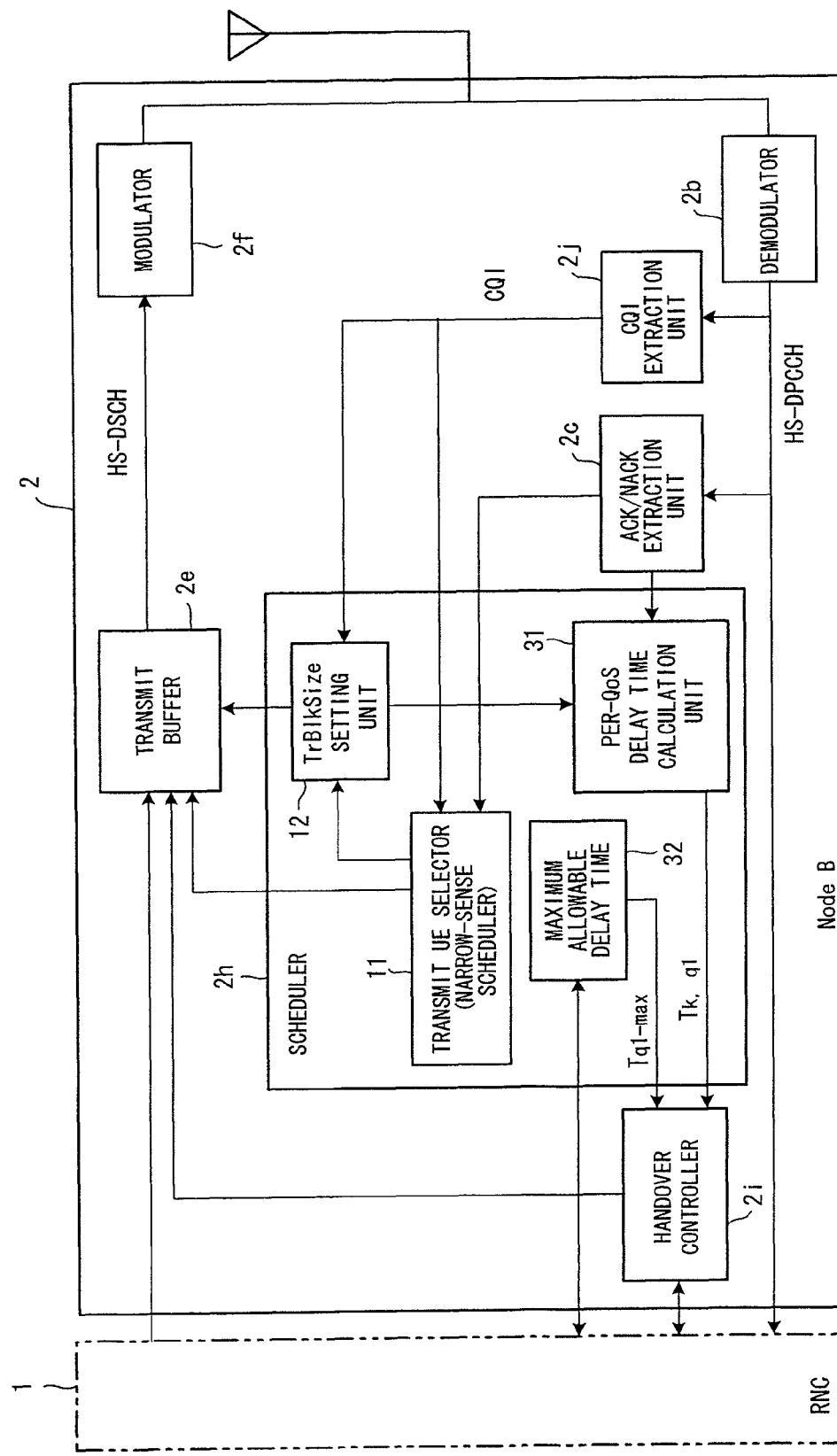
FIG. 21 is a structural view of a fourth embodiment.
Figure 22:
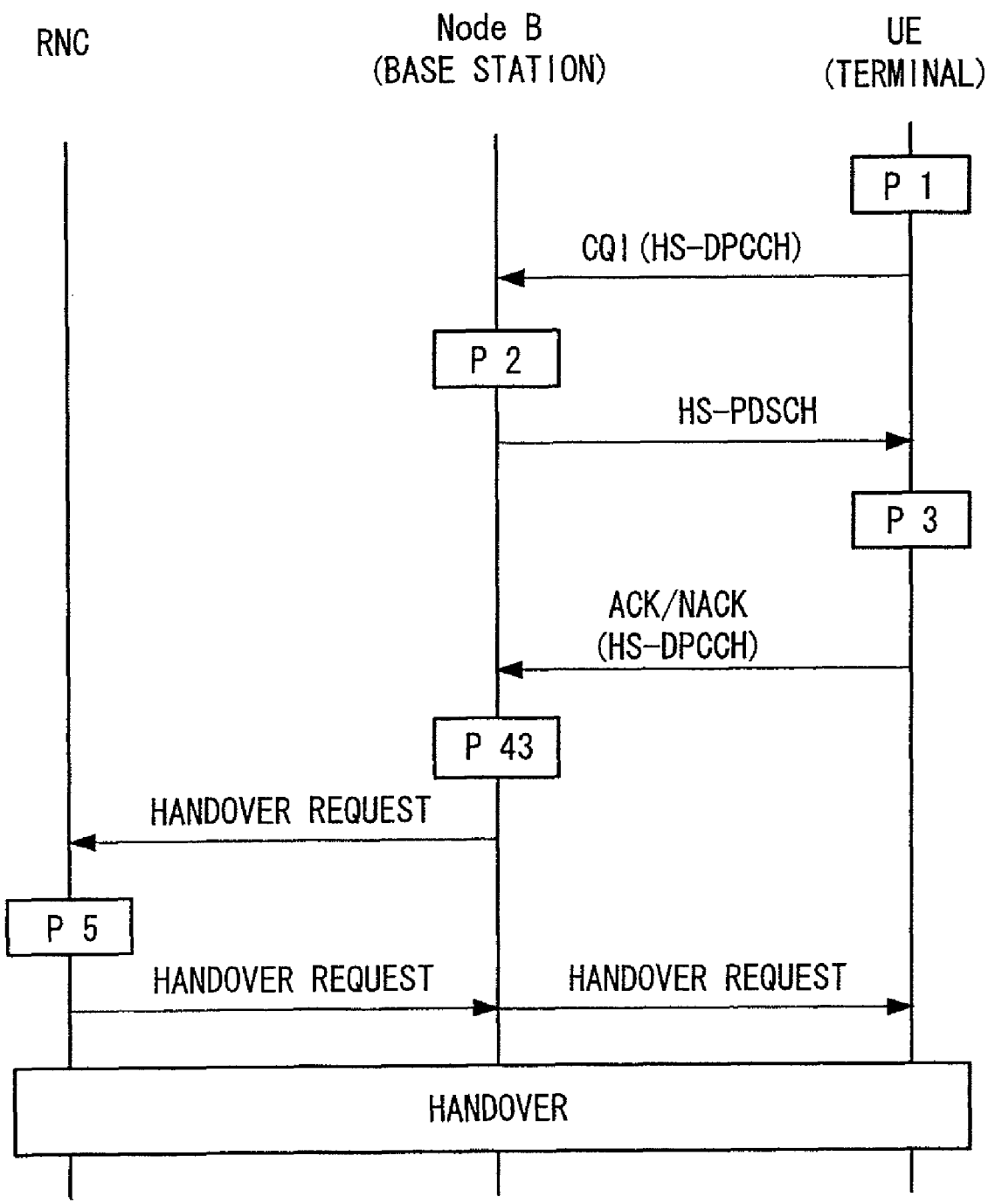
FIG. 22 illustrates an example of a protocol in the fourth embodiment.
Figure 23:
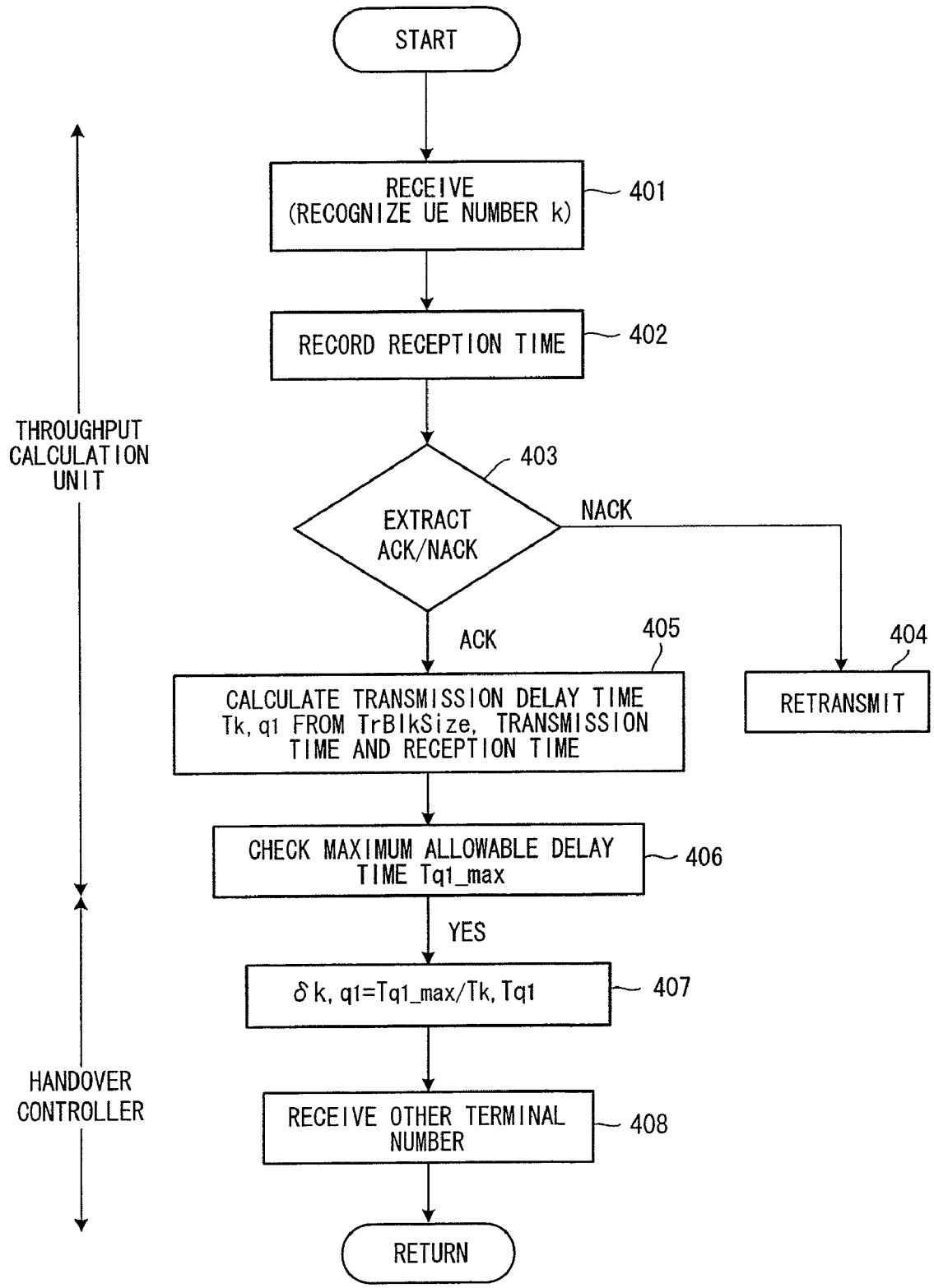
FIG. 23 is a first processing flow according to the fourth embodiment.
Figure 24:
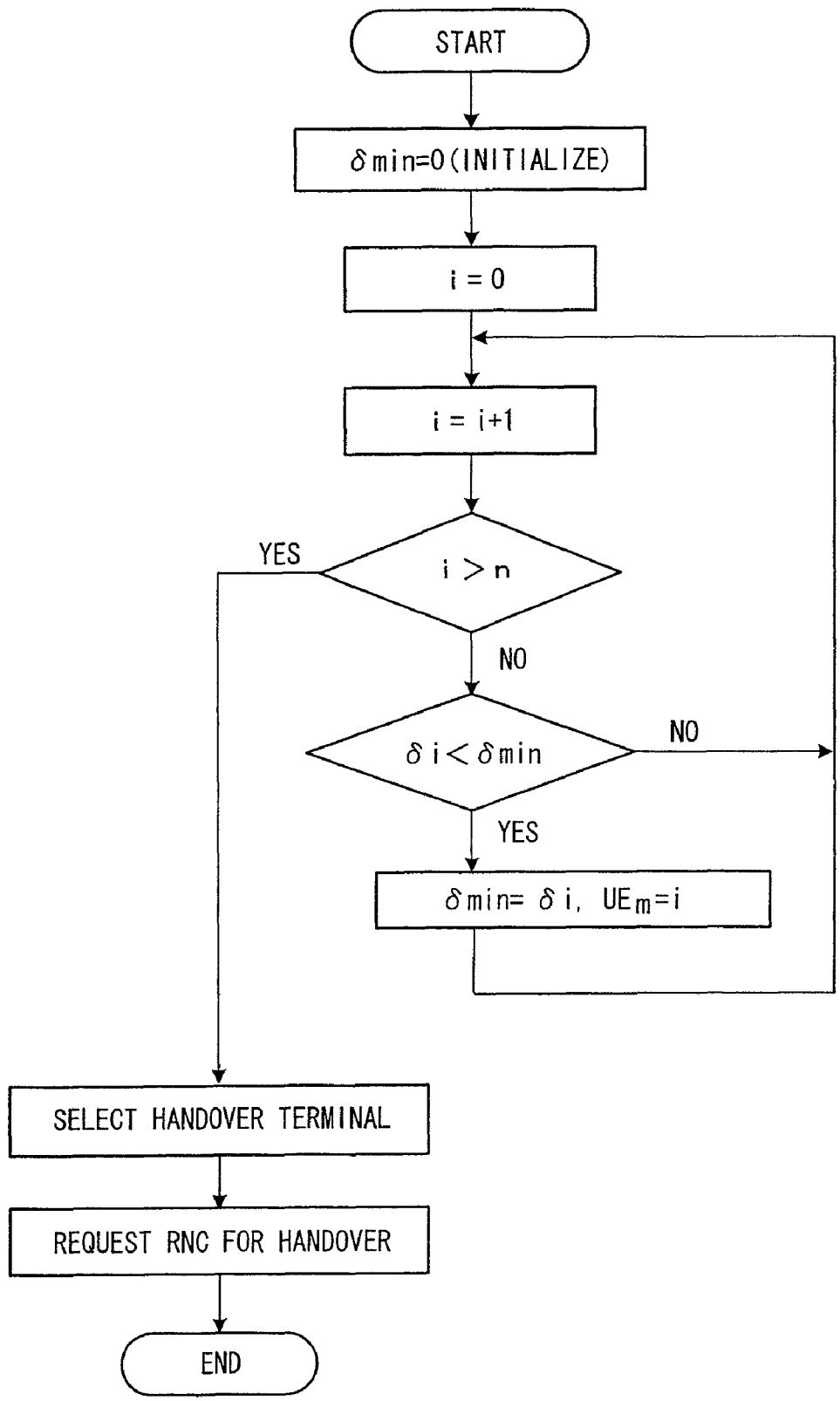
FIG. 24 is a second processing flow according to the fourth embodiment.

FIG. 21 is a structural view of the fourth embodiment, FIG. 22 is an example of a protocol in the 22 embodiment and FIGS. 23, 24 illustrate processing flow. FIG. 21 differs from the first embodiment of FIG. 1 in that a delay time calculation unit 31 is provided instead of the throughput calculation unit 13, and a maximum allowable delay time setting unit 32 is provided instead of the throughput threshold value generator 14. In the protocol of FIG. 22, processing P1 to P3 and P5 is the same as that of the first embodiment, and processing P43 is different from that of the first embodiment. FIGS. 23, 24 show the processing flow of processing P43.

It is assumed that the terminal UEk, which is similar to that of the first embodiment, is receiving a service q1 (QoS=q1), and that the maximum allowable delay time is tq1_max. It should be noted that the maximum allowable delay time is set in the maximum allowable delay time setting unit 32 from the higher layer. The time required for certain data to be transmitted to the terminal correctly is the transmission delay time. Let this be represented by tk,q1. As for the method of calculating the transmission delay time, the time at which the base station transmitted the data to the terminal is stored by the delay time calculation unit 31 of the scheduler 2h. The delay time calculation unit 31 monitors the reception time of ACK sent back from the terminal, calculates the transmission delay time tk,q1 per unit amount of data in accordance with the following equation based upon the transmitted amount of data (transport block size TrBlkSize) and the above-mentioned transmit time ts and receive time tr:

$$tk,q1 = (tr-ts)/TrBlkSize$$

and inputs the transmission delay time to the handover controller 2i (steps 401 to 405 in FIG. 23). Next, the maximum allowable delay time setting unit 32 inputs the maximum allowable delay time tq1_max, which conforms to the quality of service QoS set in advance, to the handover controller 2i (step 406).

In order to evaluate the actual transmission delay time with respect to the maximum allowable delay time, the handover controller 2i adopts the ratio between the two as transmission delay time margin and performs a calculation according to the following equation (step 407):

$$\delta_{k,q1} = \frac{t_{q1\_max}}{t_{k,q1}}$$

This indicates that the larger $\delta_{k,q1}$, the greater the margin with respect to the maximum allowable delay time, and the smaller $\delta_{k,q1}$, the less margin. In communication over a fixed period of time, the handover controller calculates the transmission delay time allowance with respect to all services to all terminals (step 408), finds the terminal UEk for which the value of margin is smallest by the processing of FIG. 24 and requests the RNC to perform handover control of the terminal UEk. By control the same as that of the first embodiment, the RNC exercises control to hand over the terminal to another base station apparatus having a different carrier frequency.

Thus, handover is performed from the terminal having the smallest transmission time margin. However, handover may be performed from a terminal having a large transmission time margin. This is because owing to movement of a terminal with a large margin, there is a possibility that there may be an improvement in a terminal that exhibited a small margin until it moved.

Thus, in accordance with the fourth embodiment, effects similar to those of the first embodiment can be obtained.

Modification

Figure 25:
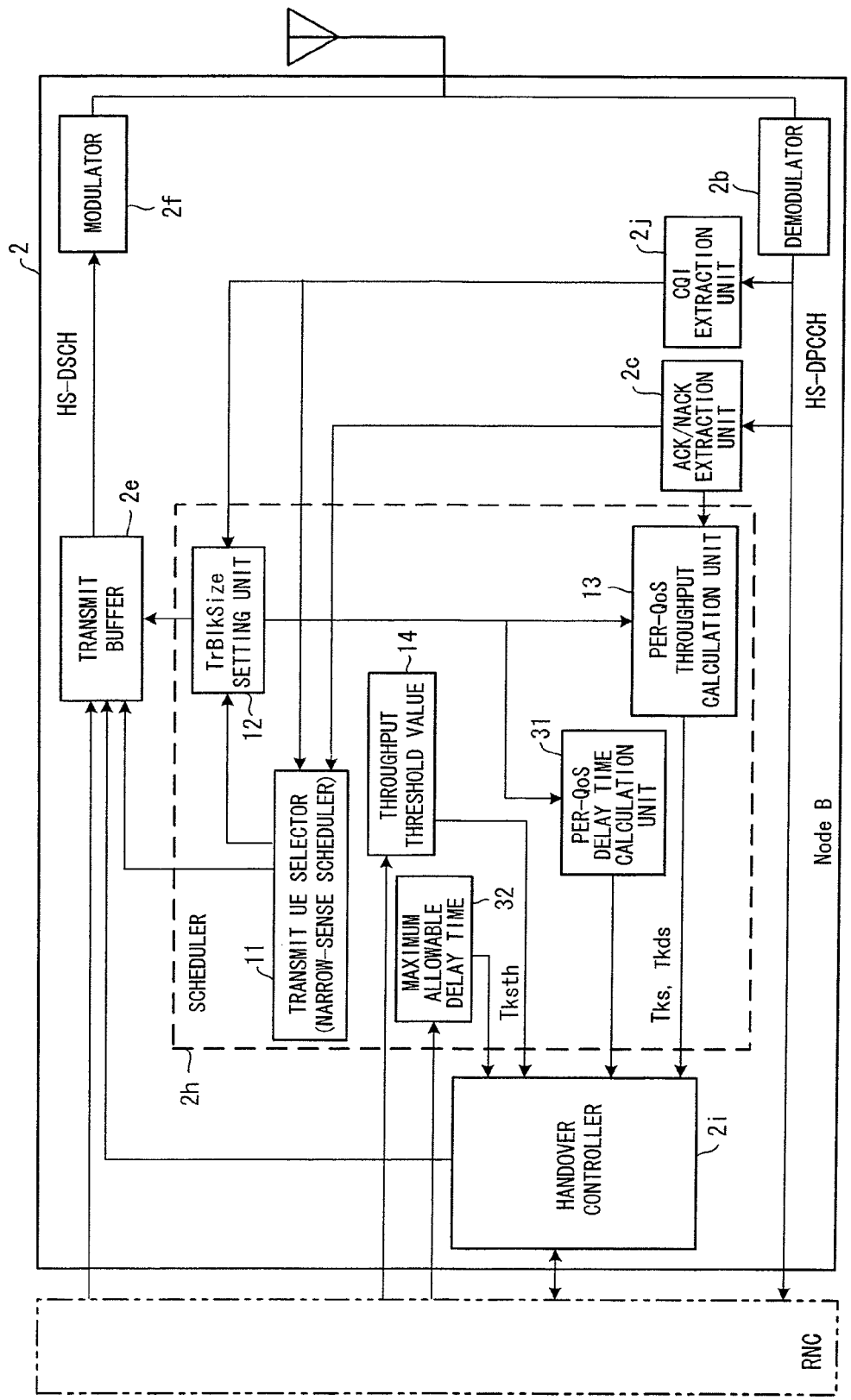
FIG. 25 is a structural view of a modification.

It is possible to perform handover control by combining the first and fourth embodiments. FIG. 25 is a structural view of a modification and FIGS. 26, 27 illustrate the processing flows of a base station.

Figure 26:
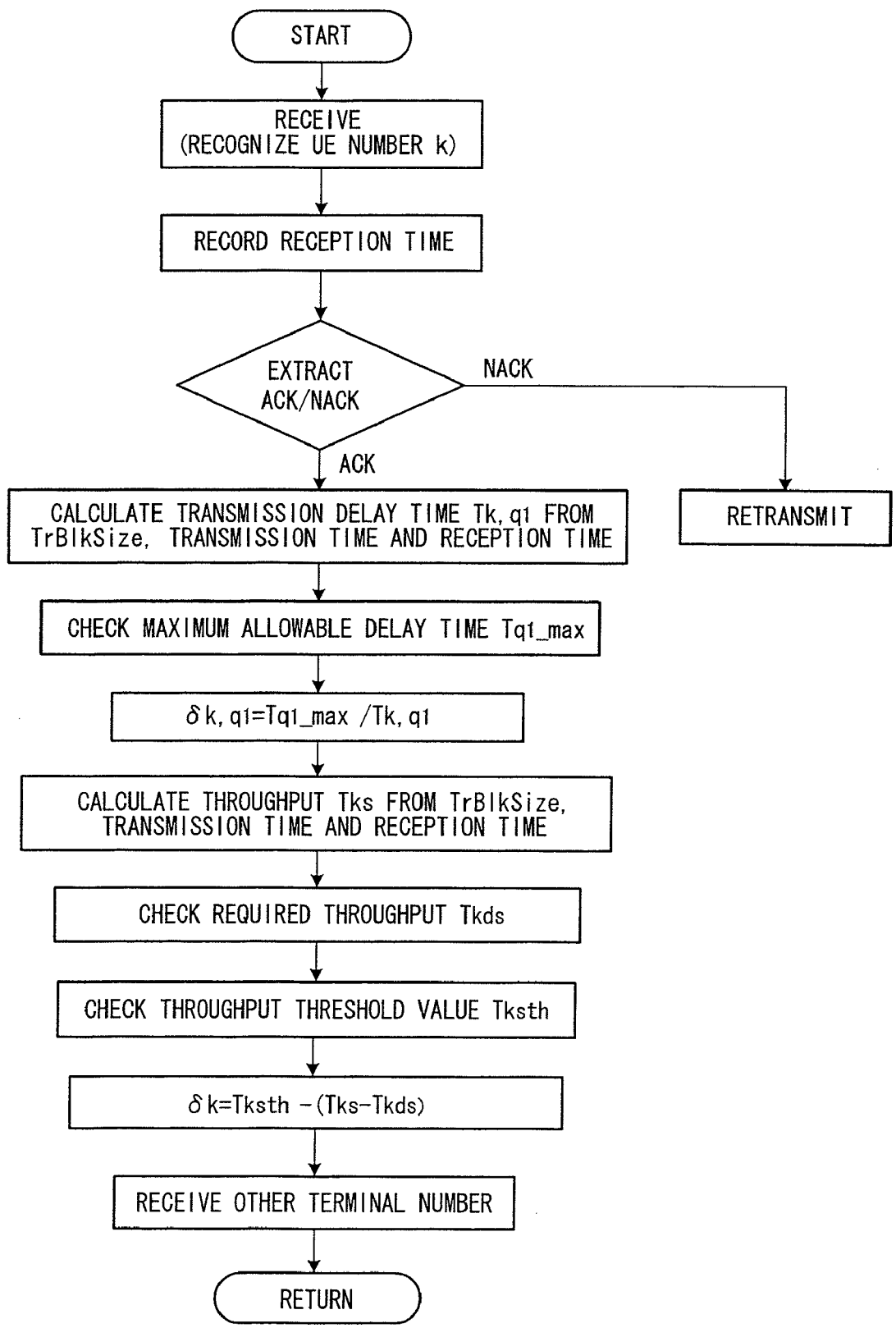
FIG. 26 is a first control processing flow of a base station.
Figure 27:
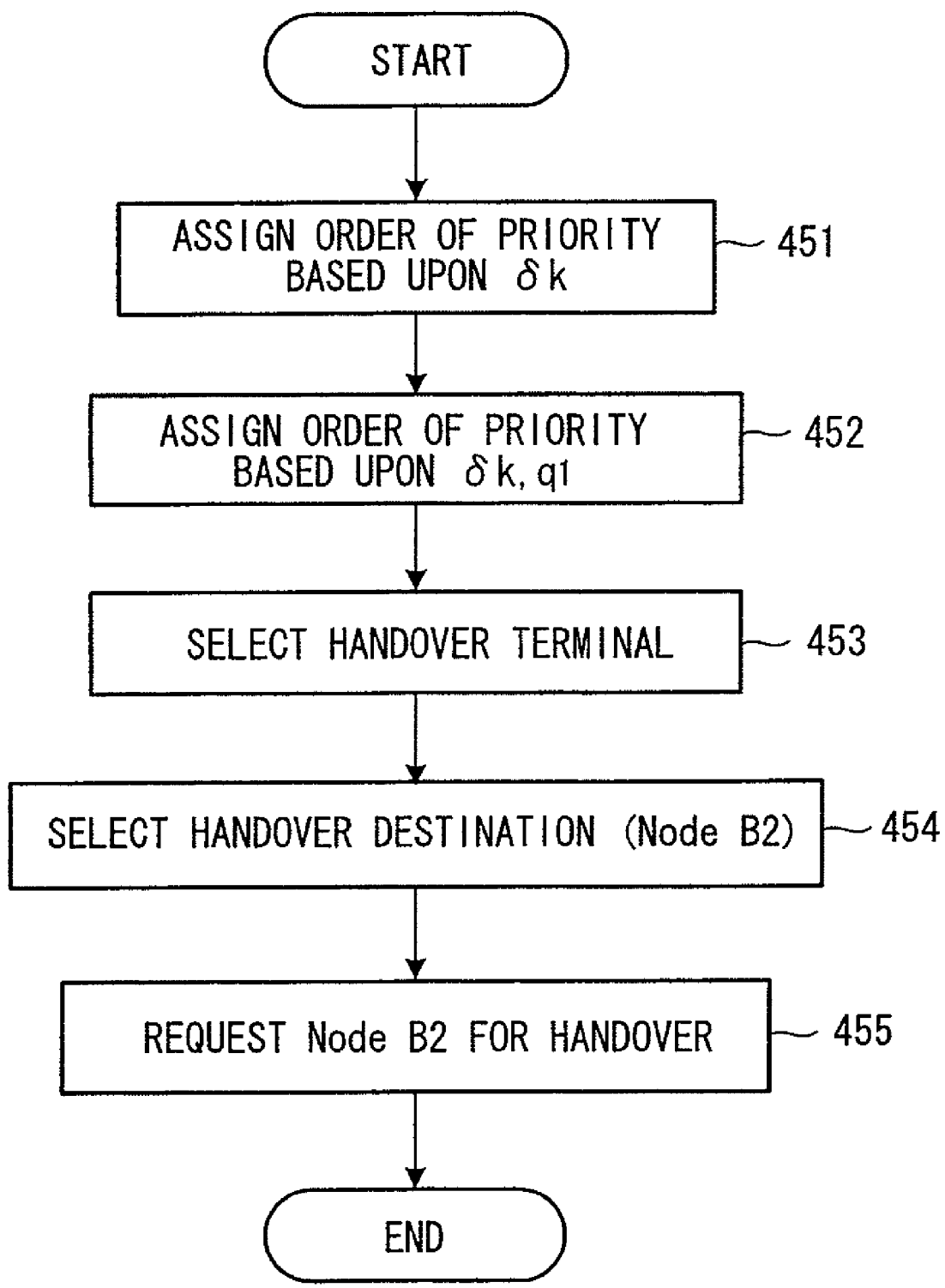
FIG. 27 is a second control processing flow of a base station.

The base station executes the base-station processing of the first and fourth embodiments in accordance with the processing flow of FIG. 26, calculates the transmission delay time margin $\delta k,q1$ ($=t_{q1\_max}/t_{k,q1}$) and throughput margin $\delta k$ [=Tksth−(Tks−Tkds)] of each UEk and stores these margins.

If the transmission delay time margin $\delta k,q1$ and throughput margin $\delta k$ of all terminals are found, the handover controller 2i refers to the throughput margin $\delta k$ and decides a first order of priority of handover from a terminal that has experienced the most degradation (step 451). The handover controller 2i further refers to the transmission delay time margin $\delta k,q1$ to decide a second order of priority of handover from a terminal having a strict transmission delay time margin (step 452).

Next, the handover controller 2i takes these two orders of priority into account to decide the terminal to be handed over (step 453). For example, points are assigned to the first order of priority. Specifically, rank 1 of the order of priority is assigned 20 points, rank 2 is assigned 19 points and rank L1 is assigned (20−L1+1) points. Similarly, rank 1 of the second order of priority with respect to the maximum allowable delay time is assigned 20 points, rank 2 is assigned 19 points and rank L2 is assigned (20−L2+1) points. Assume now that the rank of a certain UE with respect to the threshold value is m1, that the rank with respect to the maximum allowable delay time is m2, and that both of these scores are multiplied together to obtain (20−m1+1)×(20−m2+1). This processing is applied to all terminals and the terminal having the highest score is adopted for handover.

If a terminal to be handed over is found, the RNC is requested to perform handover. In response, the RNC selects a base station apparatus Node B, which has a different carrier frequency, as the handover destination (step 454) and exercises control to hand over the target terminal to this base station (step 455).

It should be noted that although the threshold value and the maximum allowable delay time are handled as being equivalent, it is permissible to apply weighting. Further, in the manner described above, handover may be performed from the terminal having the lowest score.

Thus, in accordance with this modification, effects similar to those of the first embodiment can be obtained.

(E) Fifth Embodiment

A fifth embodiment is one for controlling handover taking into consideration the margin and priority with regard to a threshold value.

Figure 28:
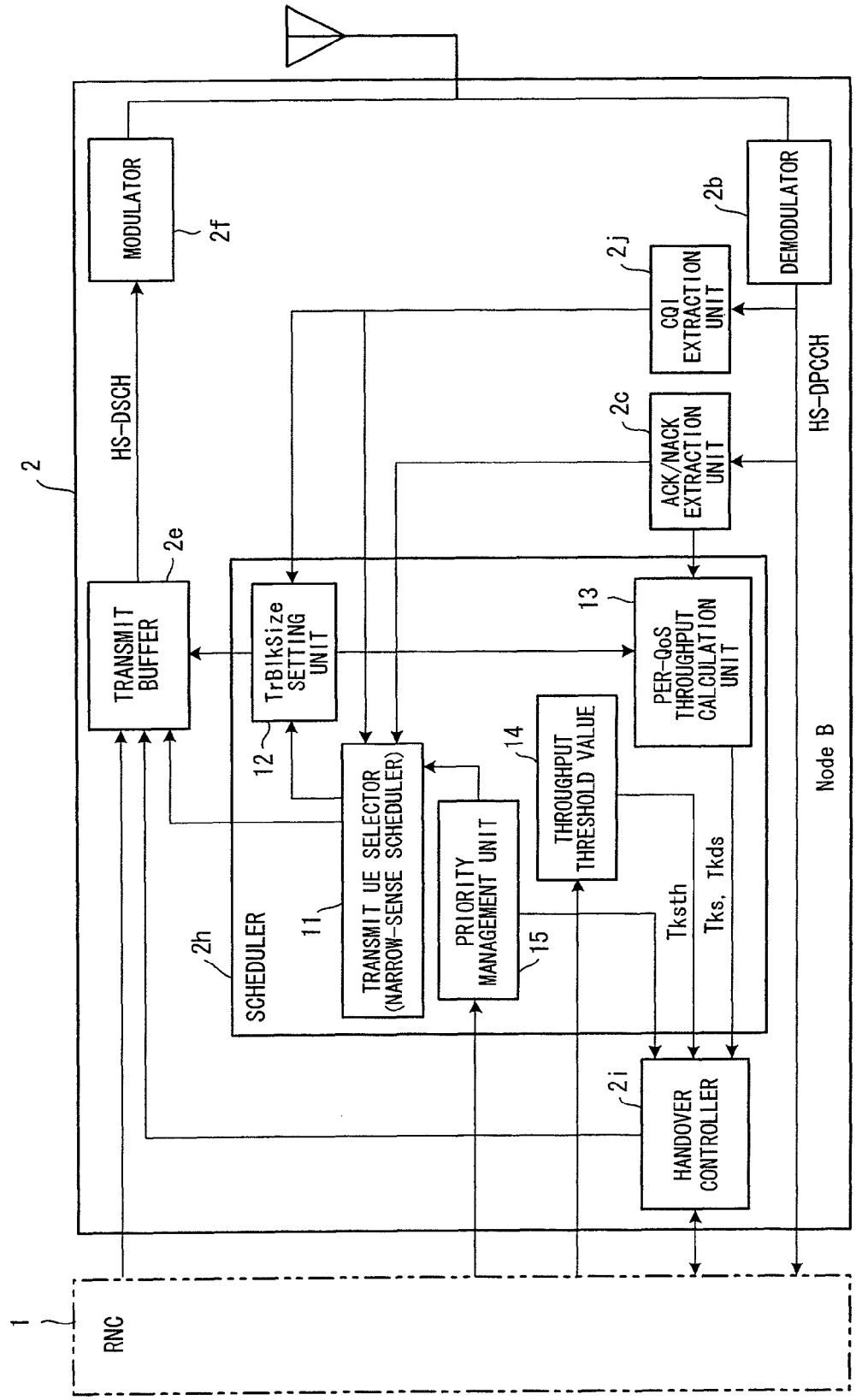
FIG. 28 is a structural view of a fifth embodiment.
Figure 29:
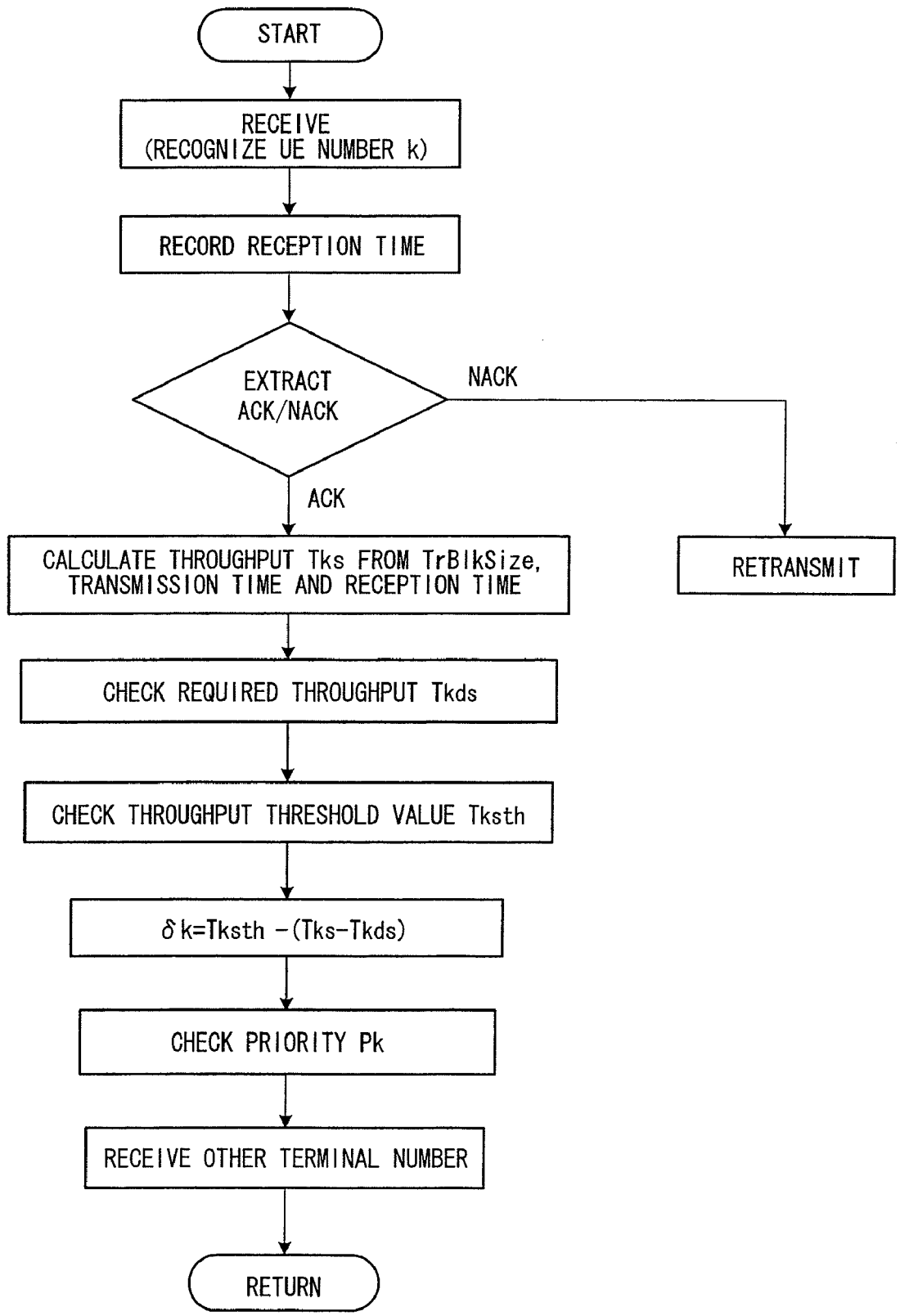
FIG. 29 is a first control processing flow of a base station.
Figure 30:
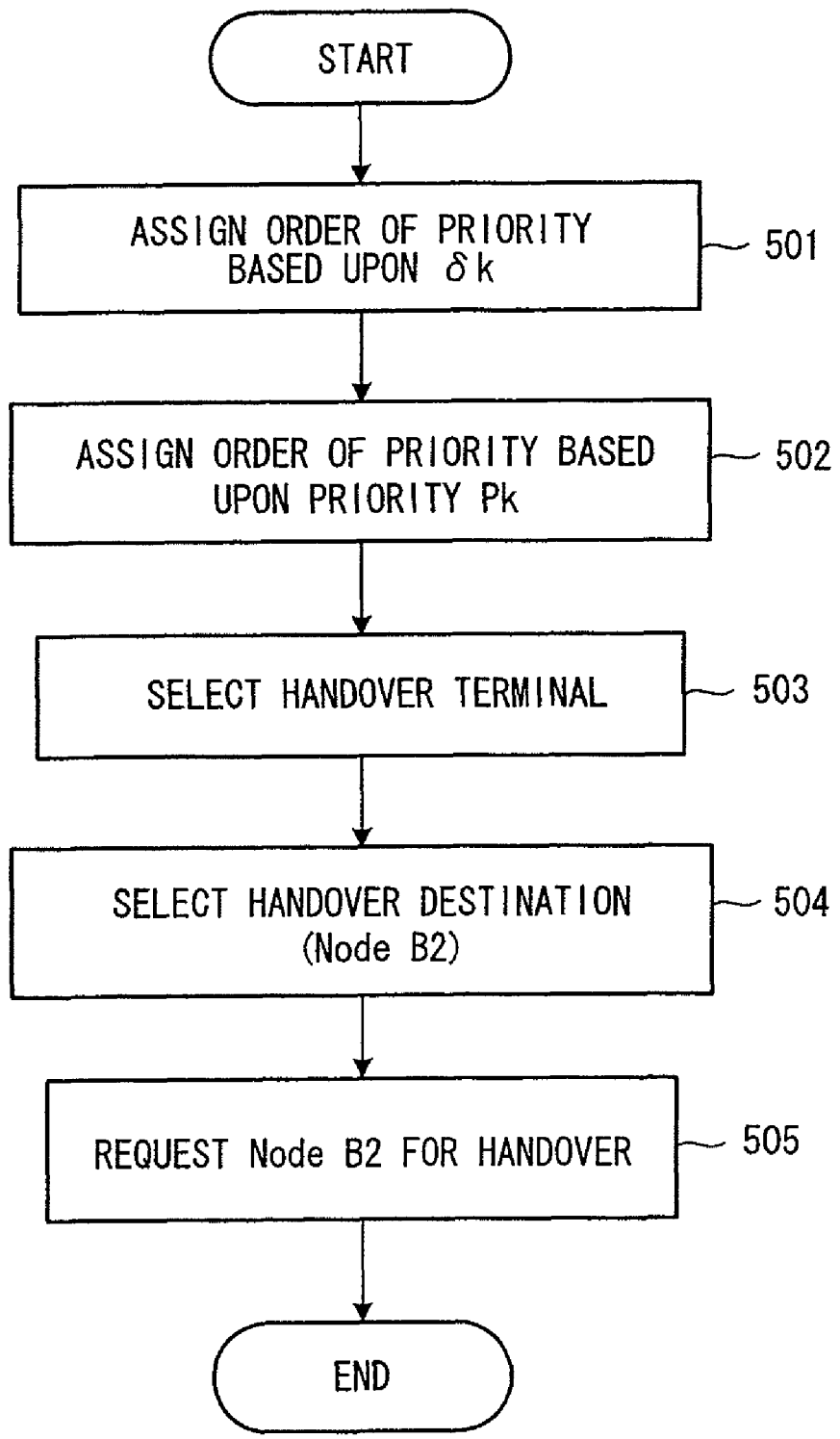
FIG. 30 is a second control processing flow of a base station.

FIG. 28 is a structural view of the fifth embodiment, and FIGS. 29, 30 illustrate processing flows of a base station. FIG. 28 differs from the first embodiment of FIG. 1 in that a priority management unit 15 is provided and in that the handover controller 2i controls handover taking priority into account.

The decision on priority (order of priority) includes the factors set forth below. In this embodiment the method of setting order of priority does not particularly matter.

Priority Among Terminals

As a specific example, assume a case where a telephone that is easy to connect to an outside line and a telephone that is difficult to connect to an outside line exist in an extension telephone system that has been introduced in an enterprise. That is, there is a ranking for every terminal. The priority is assigned by the higher layer.

Priority Among Services (Between QoS's)

Ranking of the following kind is conceivable: For example, since transmission of a moving picture requires quick response, the priority of such a transmission is raised. With regard to a transmission such as an ftp transmission in which transmission time is not a concern, the priority of transmission is lowered. Further, even in one and the same moving-picture transmission system, for example, priority need not necessarily be the same. High and low priorities exist depending upon the content. The setting of priority is performed at the higher layer.

Priority Based Upon Propagation Environment of Terminal

This relates to the scheduler described in the first embodiment. A terminal is ranked depending upon whether the propagation environment such as the S/I of the terminal is good or bad.

The setting of priority may be decided by the base station or by the higher layer. In the illustration, order of priority conforming to the QoS has been set in the priority management unit 15 from the higher layer.

As mentioned above, the QoS (service) is ranked. Consequently, a method in which the terminal UE to be handed over is merely decided based upon the throughput of every service, as in the first embodiment, is not necessarily the best method. Accordingly, in the fifth embodiment, the terminal handed over is selected taking into consideration the margin and priority of throughput with respect to a threshold value.

The base station executes the base-station processing of the first embodiment in accordance with the processing flow of FIG. 29, calculates throughput margin δk [=Tksth−(Tks−Tkds)] of each terminal UEk, obtains the priority Pk of each terminal and stores δk and Pk as a set.

If the throughput margin δk and priority Pk of all terminals are found, the handover controller 2i, in accordance with the processing flow of FIG. 30, refers to the throughput margin δk and decides a first order of priority of handover from a terminal that has experienced the most degradation (step 501). The handover controller 2i further refers to the priority 2k to decide a second order of priority of handover from a terminal having a low priority (step 502).

Next, the handover controller 2i takes these two orders of priority into account to decide the terminal to be handed over (step 503). For example, points are assigned to the first order of priority. Specifically, rank 1 of the order of priority is assigned 20 points, rank 2 is assigned 19 points and rank L1 is assigned (20−L1+1) points. Similarly, rank 1 of the order of priority with respect to priority is assigned 20 points, rank 2 is assigned 19 points and rank L2 is assigned (20−L2+1) points. Assume now that the rank of a certain UE with respect to the threshold value is m1, that the rank with respect to priority is m2, and that both of these scores are multiplied together to obtain (20−m1+1)×(20−m2+1). This processing is applied to all terminals and the terminal having the highest score is adopted for handover.

If a terminal to be handed over is found, the RNC is requested to perform handover. In response, the RNC selects a base station apparatus Node B, which has a different carrier frequency, as the handover destination (step 504) and exercises control to hand over the target terminal to this base station (step 505).

It should be noted that although the threshold value and the maximum allowable delay time are handled as being equivalent, it is permissible to apply weighting. Further, in the manner described above, handover may be performed from the terminal having lowest score. Furthermore, although handover is ranked according to priority, a terminal may be ranked in order of decreasing priority.

Thus, in accordance with the fifth embodiment, effects similar to those of the first embodiment can be obtained.

(E) Sixth Embodiment

A sixth embodiment is one for controlling handover based upon throughput on a per-terminal basis.

Figure 31:
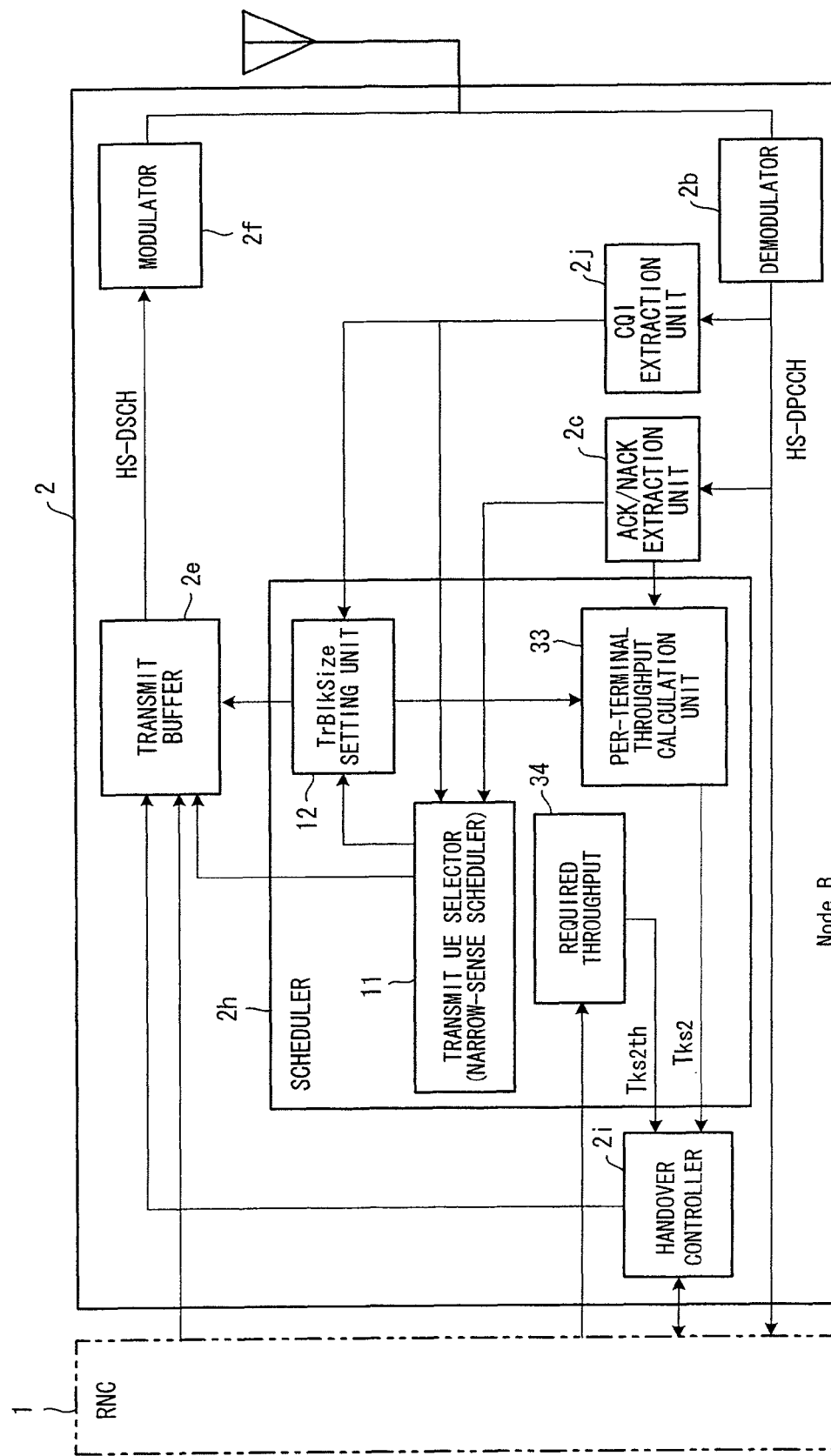
FIG. 31 is a structural view of a sixth embodiment.
Figure 32:
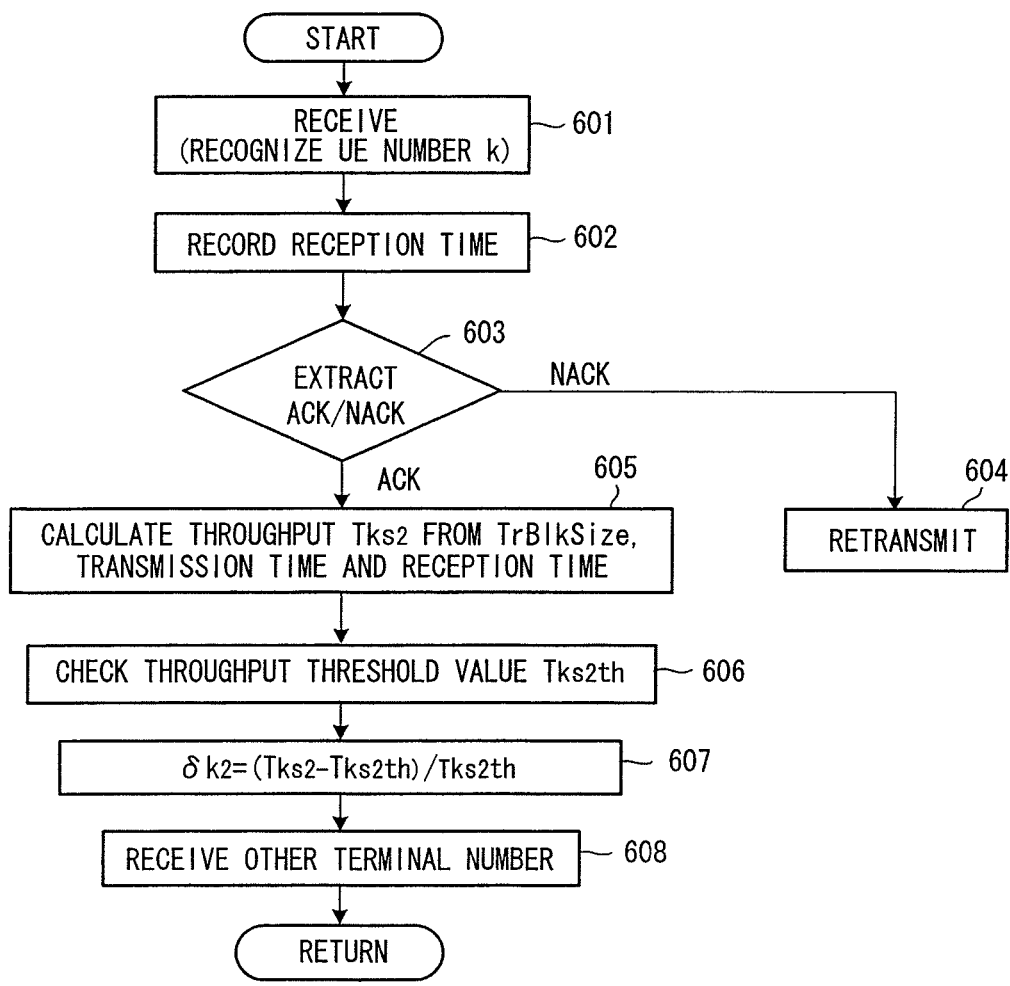
FIG. 32 is a first control processing flow of a base station.
Figure 33:
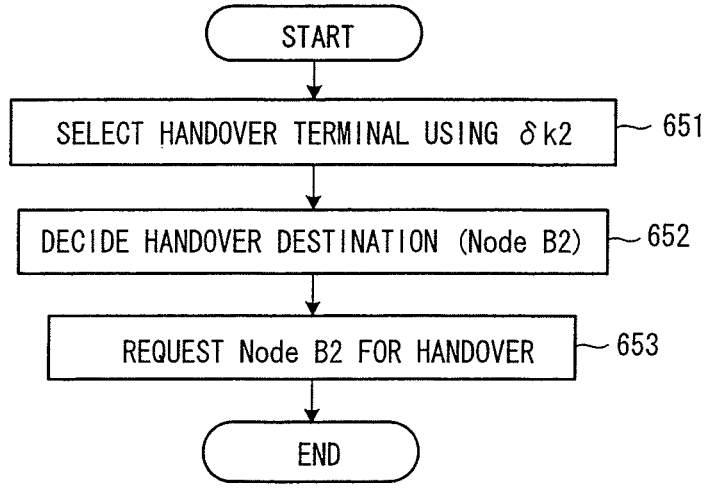
FIG. 33 is a second control processing flow of a base station.

FIG. 31 is a structural view of the sixth embodiment, and FIGS. 32, 33 illustrate processing flows of a base station. FIG. 31 differs from the first embodiment of FIG. 1 in that a per-terminal throughput calculation unit 33 is provided instead of the per-QoS throughput calculation unit 13, a required-throughput generator 34 is provided instead of the throughput threshold value generator 14, and the handover controller 2i controls handover upon taking into consideration throughput on a per-terminal basis.

The six embodiment performs handover control upon calculating throughput with respect to each terminal regardless of service quality QoS.

In accordance with the processing flow of FIG. 32, the throughput calculation unit 33 measures throughput Tks2 of every terminal, without being aware of the service quality QoS of each terminal UEk, and inputs the result to the handover controller 2i through control similar to that of the first embodiment (steps 601 to 605). Further, the required-throughput generator 34 inputs the required throughput (stipulated throughput) Tks2th of each terminal to the handover controller 2i (step 606).

In response, the handover controller 2i calculates dk2 in accordance with the following equation using the throughput Tks2 and stipulated throughput threshold value Tks2th (step 607):

$$\delta_{k2} = \frac{T_{ks2} - T_{ks2th}}{T_{ks2th}}$$

In accordance with this equation, the larger δk2, the more margin there is with respect to the stipulated throughput, and the smaller δk2, the less margin. Similarly, the handover controller 2i calculates δ12 to δm2 with respect to all of the terminals UE1 to UEm that have been connected to the base station (step 608). It should be noted that Tks2th may be the same value or a different value for all terminals.

Next, the handover controller 2i continues processing in accordance with the processing flow of FIG. 33. Specifically, the handover controller 2i selects the minimum value of the aforesaid δ12 to δm2 (step 651) and specifies this terminal UEn. That is, the handover controller 2i selects the terminal UEk having the smallest margin with respect to the stipulated throughput and performs handover giving precedence to this terminal.

If a terminal to be handed over is found, the RNC is requested to perform handover. In response, the RNC selects a base station apparatus Node B, which has a different carrier frequency, as the handover destination (step 652) and exercises control to hand over the target terminal to this base station (step 653).

Thus, in accordance with the sixth embodiment, effects similar to those of the first embodiment can be obtained.

(E) Seventh Embodiment

A seventh embodiment is one for controlling handover using necessary transmission power.

Figure 34:
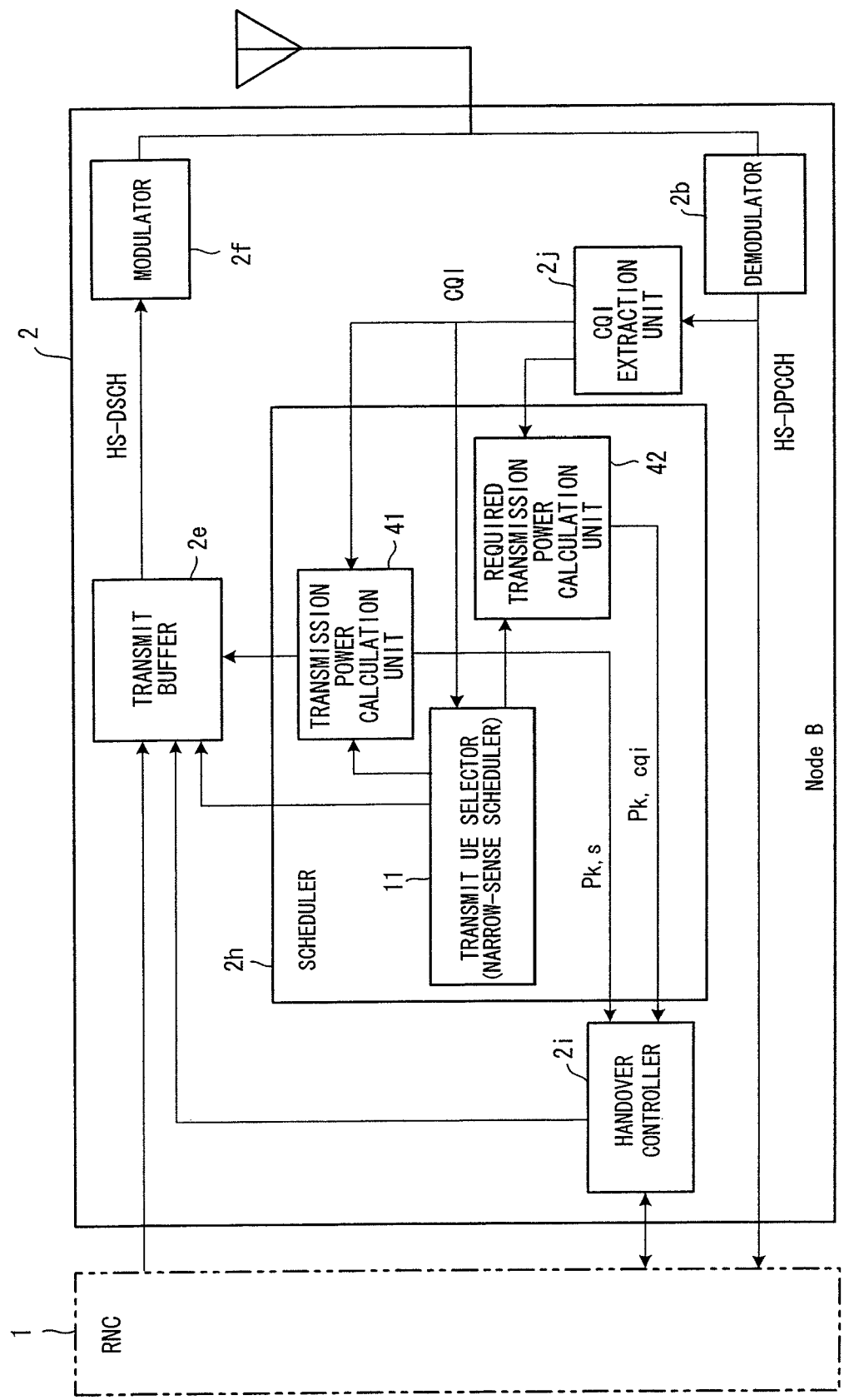
FIG. 34 is a structural view of a seventh embodiment.
Figure 35:
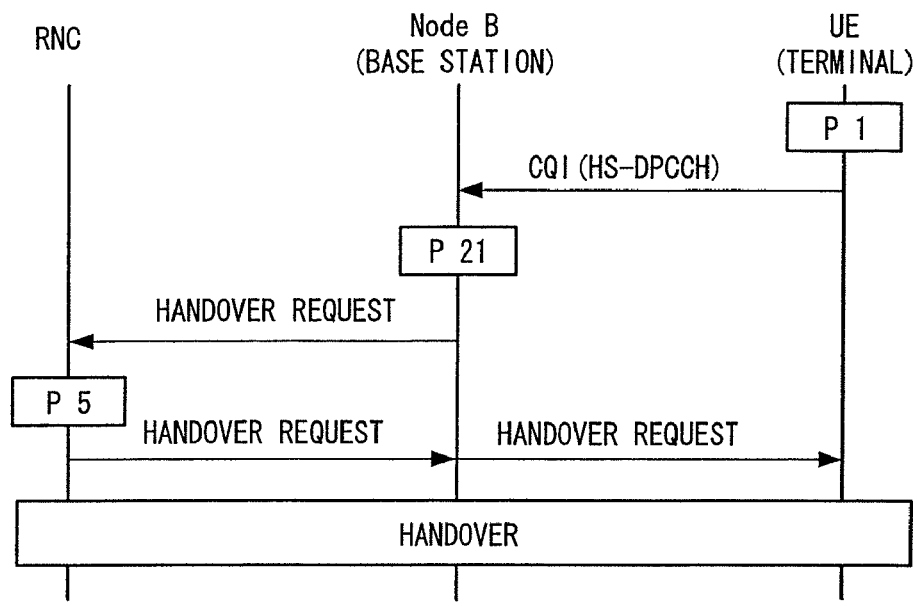
FIG. 35 illustrates an example of a protocol in the seventh embodiment.
Figure 36:
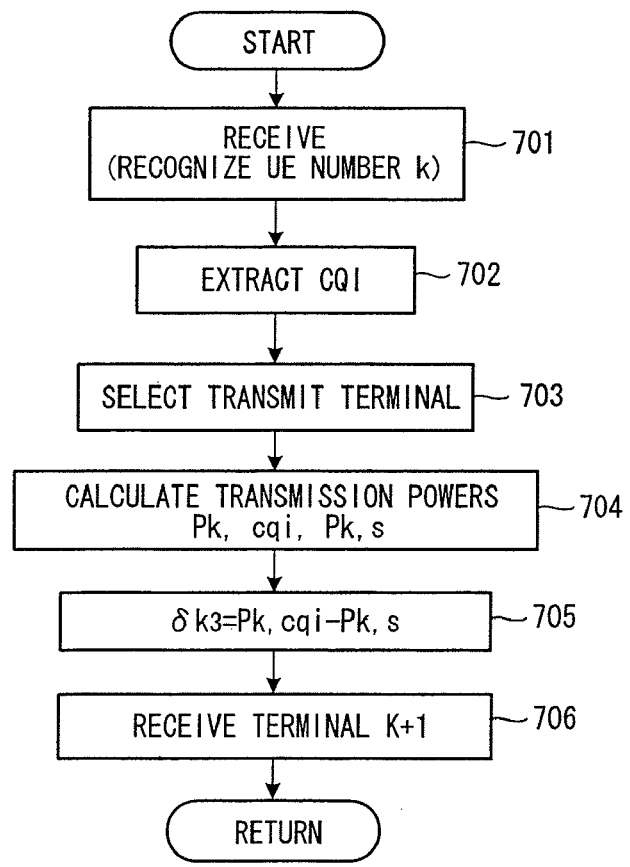
FIG. 36 is a first processing flow of a base station.
Figure 37:
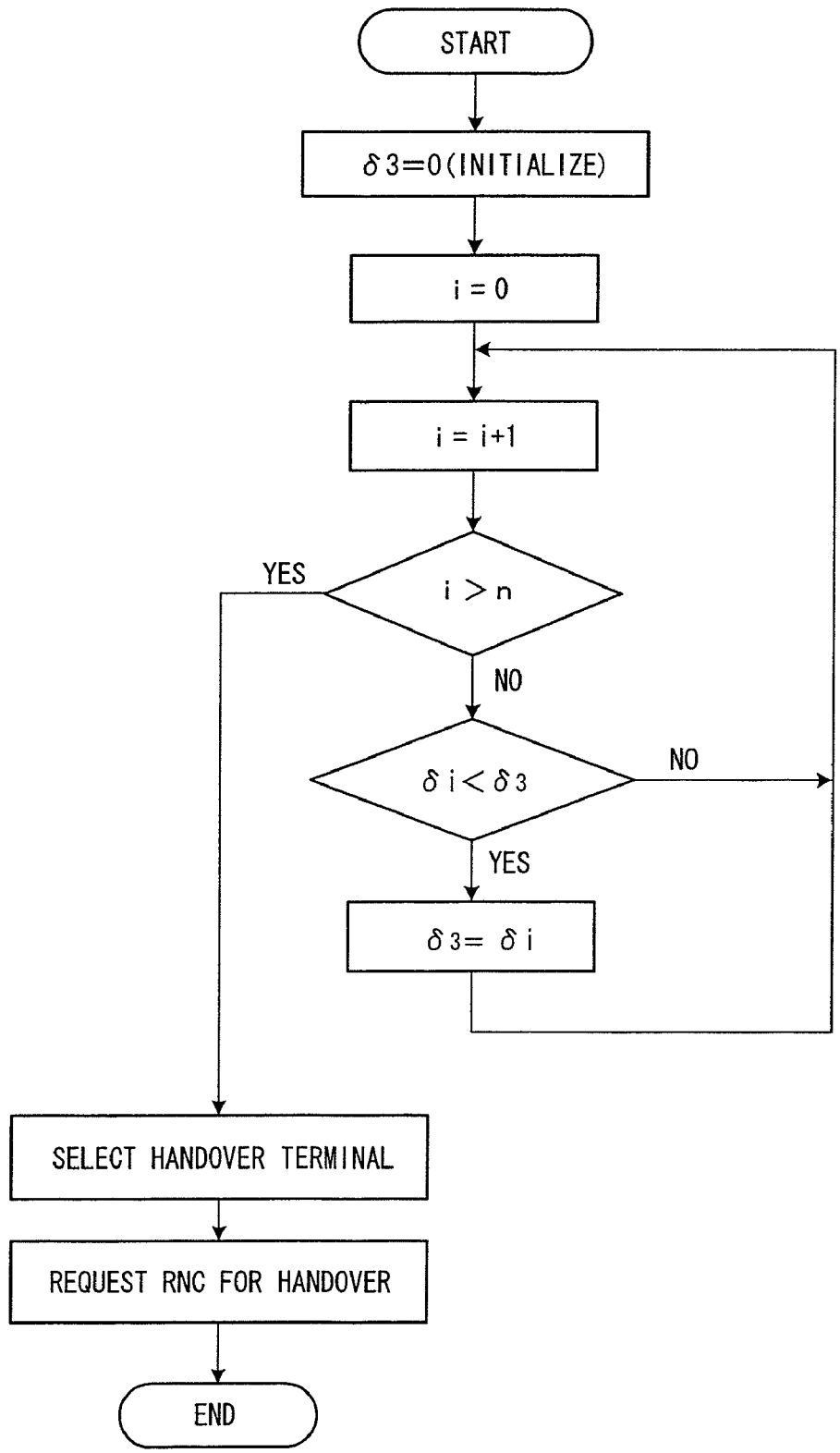
FIG. 37 is a second processing flow of a base station.

FIG. 34 is a structural view of the seventh embodiment, FIG. 35 shows an example of a protocol in the seventh embodiment, and FIGS. 36, 37 illustrate processing flows of a base station. FIG. 35 differs from the first embodiment of FIG. 1 in that the block size setting unit 12, throughput calculation unit 13 and throughput threshold value generator 14 are deleted, a transmission power calculation unit 41 and required transmission power calculation unit 42 are provided instead, and the ACK/NACK extraction unit 2c is deleted. In the protocol of FIG. 35, processing P1, P5 is the same as that of the first embodiment but processing P21 is different from that of the first embodiment. FIGS. 36, 37 illustrate the processing flows of processing P21.

In the first to third embodiments, it has been described that CQI indicates the reception environment (propagation environment) at a certain terminal. Here the CQI can be created based upon a transmission condition that satisfies a required error rate in a certain specific reception condition (e.g., modulation scheme, number of spreading codes, transmission power of the base station, etc.) (This is the case in the 3GPP specifications.)

According to the seventh embodiment, control is carried out with regard to the transmission power of the base station.

In the CQI that has been sent from a certain UEk, as mentioned above, the required base-station transmission power for obtaining the required error rate in the terminal UEk becomes necessary. On the other hand, since the transmission power of the base station also is transmission power intended for other terminals, there is a stipulation on overall transmission power. In other words, the total transmission power is divided into transmission powers intended for each of the terminals. In view of these two points, there is a possibility that a base-station transmission power for satisfying the required reception error rate of a certain terminal will be inadequate owing to a tradeoff with the transmission powers intended for the other terminals. In case of such an inadequacy, an error may occur in reception at the terminal and a retransmission request may be sent back to the base station. In a worst-case scenario, there is the possibility that retransmission will be repeated and, as a result, that the required throughput will not be met.

In accordance with the processing flow of FIG. 36, if the required transmission power calculation unit 42 receives the CQI of terminal UEk, then the unit calculates the base-station transmission power Pk,cqi for meeting the required reception error rate that conforms to this CQI and inputs the calculated power to the handover controller 2i. The base-station transmission power Pk,cqi is capable of being found using a previously prepared table of correspondence between CQI and Pk,cqi. The transmission power calculation unit 41 calculates transmission power Pk,s regarding the terminal UEk based upon an even balance relative to the transmission powers that have been assigned to the other terminals by the scheduler 2h and inputs the calculated power to the handover controller 2i (steps 701 to 704).

The handover controller 2i obtains the difference between Pk,cqi and Pk,s as a required power difference δk3 in accordance with the following equation (step 705):

$$\delta k3 = P_{k,cqi} - P_{k,s} \geq 0$$

The handover controller 2i thenceforth calculates and stores δk3 with regard to all terminals (step 706).

If δk3 regarding all terminals is found, the handover controller 2i subsequently selects the terminal, which has the maximum required power difference, as the handover terminal and requests the RNC for handover in accordance with the processing flow of FIG. 37. The RNC selects the base station apparatus Node B, which has a different carrier frequency, as the handover destination and exercises control to hand over the target terminal to this base station. It should be noted that handover may be performed with respect to all terminals for which δk3<0 holds.

Thus, effects similar to those of the first embodiment can be obtained by handover control of the seventh embodiment.

(H) Eighth Embodiment

Figure 38:
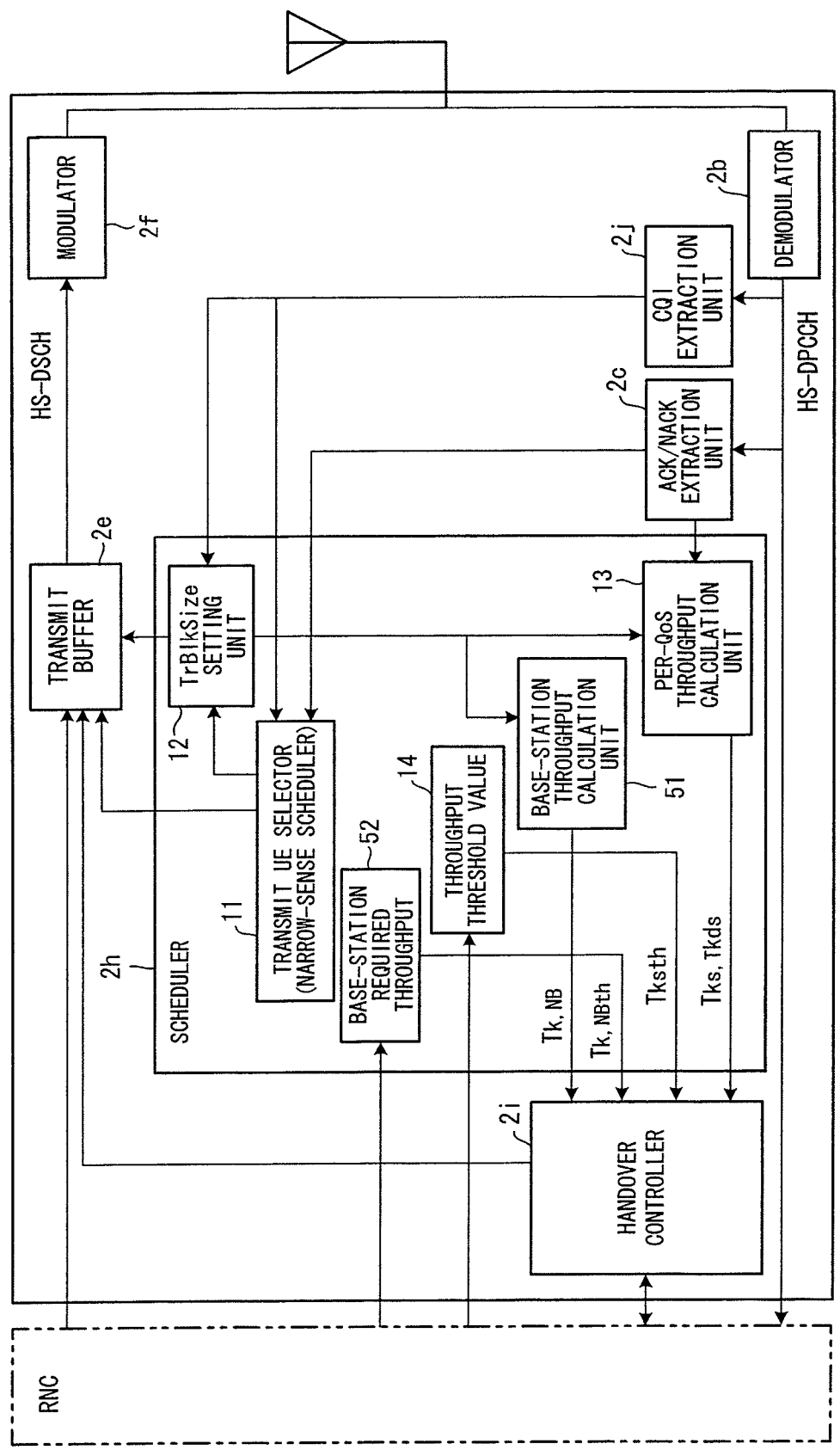
FIG. 38 is a structural view of an eighth embodiment.
Figure 39:
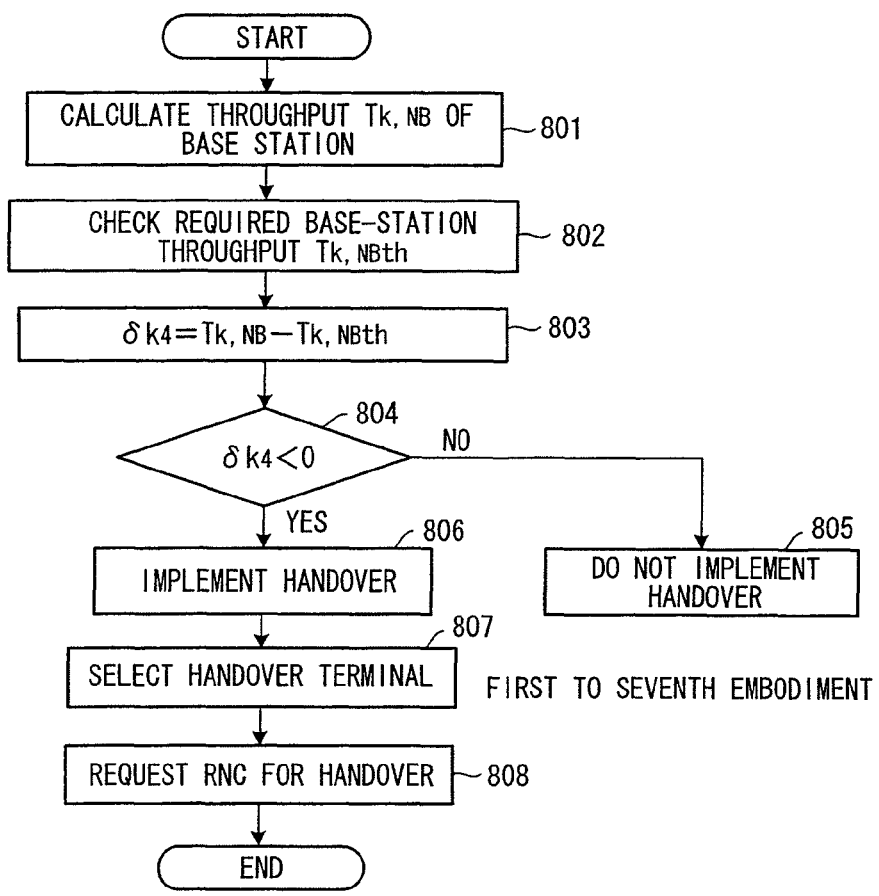
FIG. 39 is a first processing flow according to the eighth embodiment.
Figure 40:
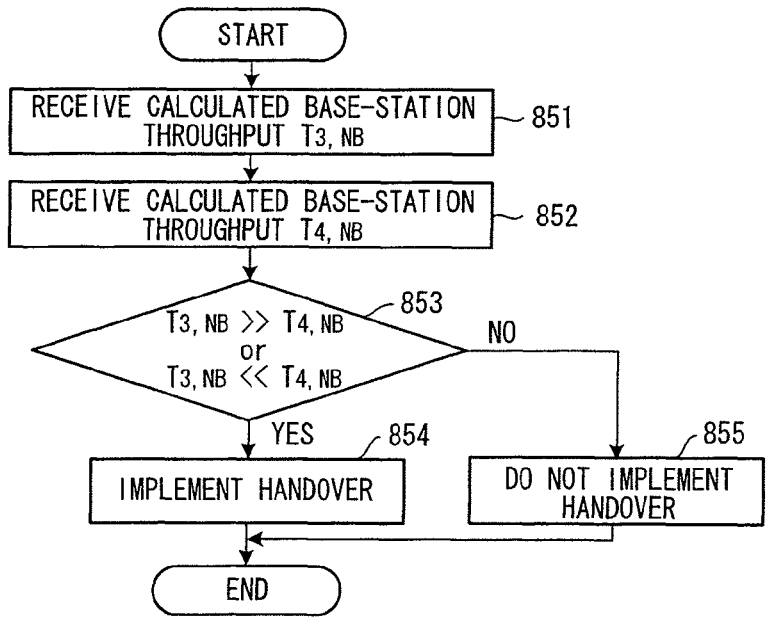
FIG. 40 is a second processing flow according to the eighth embodiment.

FIG. 38 is a structural view of an eighth embodiment, and FIGS. 39, 40 illustrate processing flows according to the eighth embodiment. FIG. 38 differs from the first embodiment of FIG. 1 in that a base-station throughput calculation unit 51 and base-station required-throughput generator 52 are provided.

The eighth embodiment is such that even in a case where the throughput of each terminal connected to the base station Node B has sufficient margin with respect to a throughput threshold value and it is unnecessary to perform handover with regard to each terminal, a handover terminal is decided and handed over in the event that the throughput of the overall base station does not have enough margin with respect to the throughput threshold value of the base station. It should be noted that an instance in which it is not necessary to perform handover with regard to all terminals will be described for the sake of simplicity. However, there may be instances where handover control is necessary for some terminals.

At the base station Node Bk, the base-station throughput calculation unit 51 measures the throughput Tks at each terminal UEk, calculates throughput $T_{k,NB}$ of the overall base station (the base-station throughput) based upon the average throughput of each terminal and inputs the result to the handover controller 2i (step 801). Further, the base-station required-throughput generator 52 inputs the required throughput (base-station throughput threshold value) $T_{k,NBth}$ of the base station to the handover controller 2i (step 802).

Upon input of the base-station throughput and base-station throughput threshold value thereto, the handover controller 2i determines whether the base-station throughput $T_{k,NB}$ meets the base-station throughput threshold value $T_{k,NBth}$ stipulated. That is, the handover controller 2i obtains the difference between these in accordance with the following equation (step 803):

$$\delta_{k4}=T_{k,NB}-T_{k,NBth}$$

and checks to determine whether $\delta_{k4}<0$ holds (step 804).

If $\delta_{k4} \geq 0$ holds, the handover controller 2i decides not to implement handover (step 805). On the other hand, if $\delta_{k4}<0$ holds, the handover controller 2i decides to implement handover (step 806) and, in accordance with the first to seventh embodiments, decides the handover terminal (step 807) and requests the RNC for handover (step 808). In response, the RNC selects a base station apparatus Node B, which has a different carrier frequency, as the handover destination and exercises control to hand over the target terminal to this base station.

The above-described processing makes it possible to improve the throughput of the overall base station.

Further, consider two base stations Node B3 and Node B4 that cover the same area and use separate frequencies as another method of handover control. In accordance with the processing flow of FIG. 40, the RNC receives throughputs $T_{3,NB}$, $T_{4,NB}$ of each of the base stations (steps 851, 852) and compares these (step 853). In case of an imbalance such that $T_{3,NB} \gg T_{4,NB}$ holds, or in other words, when one is larger than the other by more than a set value, handover is performed from one node, namely Node B3, to the other node, namely Node B4 (step 854). Accordingly, handover from Node B4 to Node B3 is performed even in a case where $T_{3,NB} \ll T_{4,NB}$ holds. Handover is carried out using a method of the kind illustrated in the first to seventh embodiments. However, if one is larger than the other by more than a set value, handover control is not carried out (step 855).

It should be noted that the RNC may gather information, make these judgments and execute processing, or information may be exchanged between base stations, judgments made and processing executed between them.

By virtue of the control set forth above, an imbalance between the throughputs of the two base stations can be corrected, an imbalance in base-station loads can be reduced and load can be alleviated.

(I) Ninth Embodiment

Figure 41:
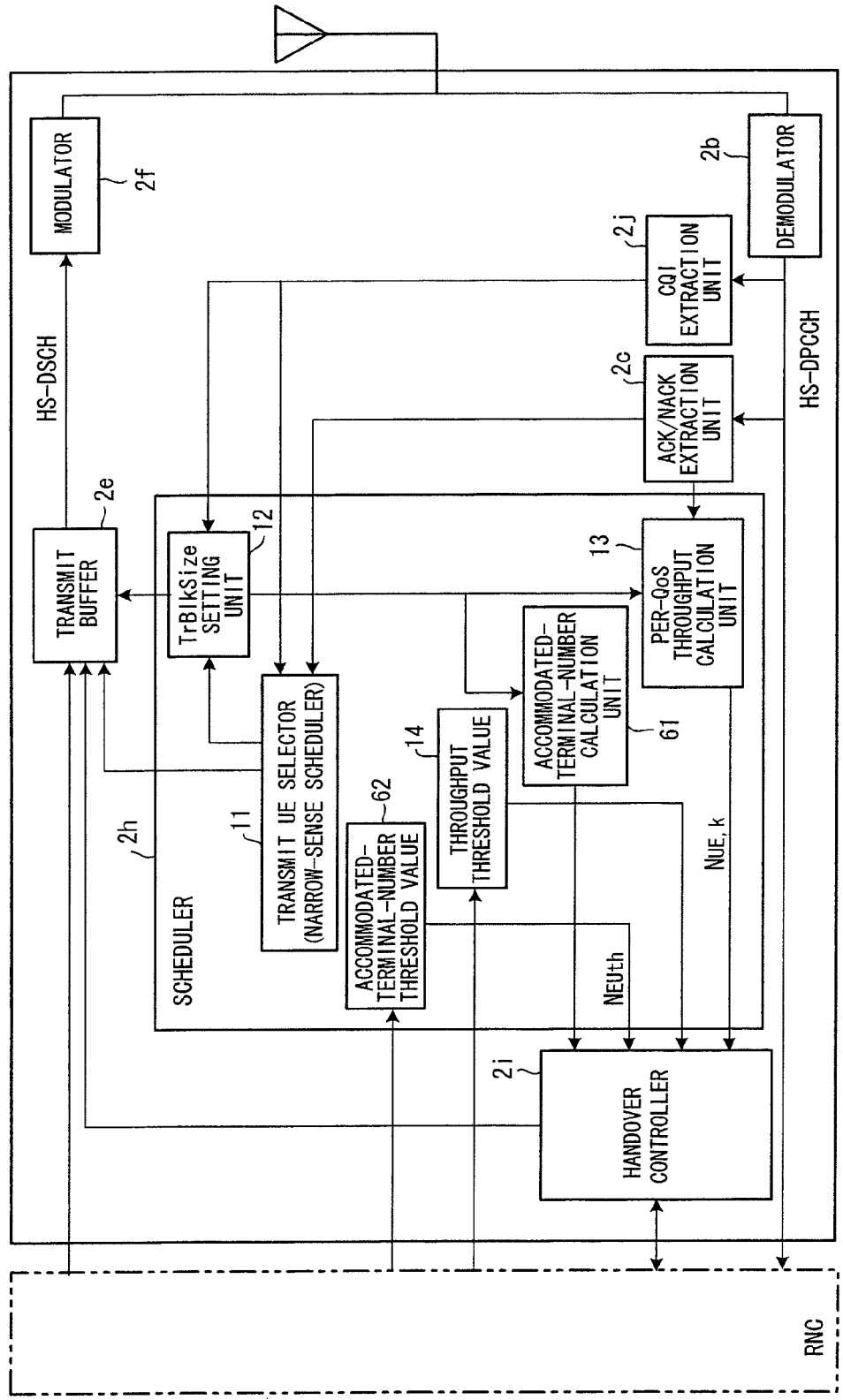
FIG. 41 is a structural view of a ninth embodiment.
Figure 42:
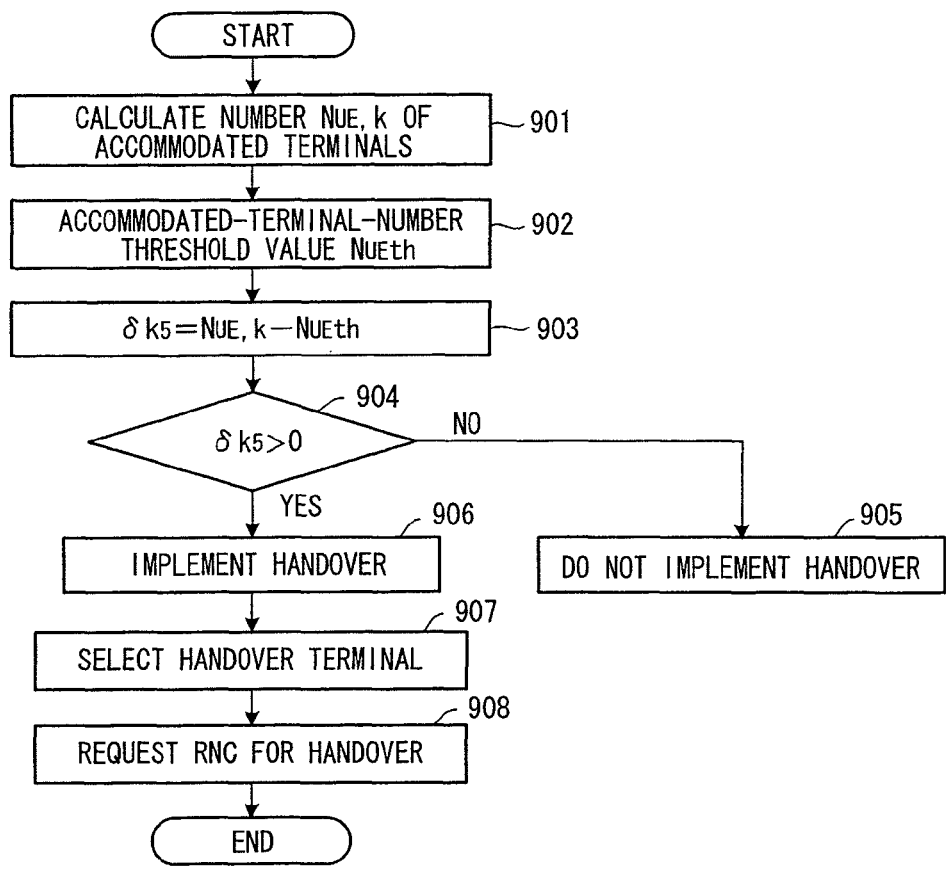
FIG. 42 is a first processing flow according to the ninth embodiment.
Figure 43:
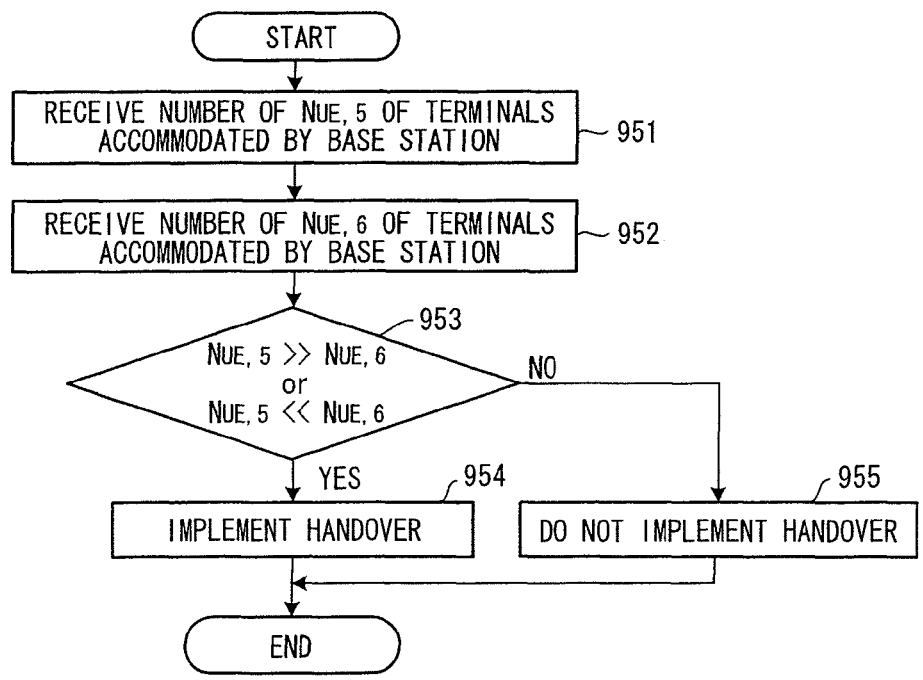
FIG. 43 is a second processing flow according to the ninth embodiment.

A ninth embodiment decides whether to perform handover based upon number terminals accommodated per base station. FIG. 41 is a structural view of the ninth embodiment, and FIGS. 42, 43 illustrate processing flows according to the ninth embodiment. FIG. 41 differs from the first embodiment of FIG. 1 in that an accommodated-terminal-number calculation unit 61 and accommodated-terminal-number threshold value generator 62 are provided.

The ninth embodiment is such that even in a case where the throughput of each terminal connected to the base station Node B has sufficient margin with respect to a throughput threshold value and it is unnecessary to perform handover with regard to each terminal, a handover terminal is decided and handed over in the event that the number of terminals accommodated by the base station is large. It should be noted that an instance in which it is not necessary to perform the handover of the first embodiment with regard to all terminals will be described for the sake of simplicity. However, there may be instances where handover control is necessary for some terminals.

At the base station Node Bk, the accommodated-terminal-number calculation unit 61 calculates the number $N_{UE,k}$ of accommodated terminals and inputs the result to the handover controller 2i (step 901). Further, the accommodated-terminal-number threshold value generator 62 inputs the threshold value $N_{UEth}$ on the number of terminals accommodated by the base station to the handover controller 2i (step 902). Upon input of the number $N_{UE,k}$ of accommodated terminals and threshold value $N_{UEth}$ on the number of terminals accommodated thereto, the handover controller 2i determines whether the number $N_{UE,k}$ of accommodated terminals satisfies the stipulated threshold value $N_{UEth}$ on the number of terminals accommodated. That is, the handover controller 2i obtains the difference between these in accordance with the following equation (step 903):

$$\delta_{k5}=N_{UE,k}-N_{UEth}$$

and checks to determine whether $\delta_{k5}>0$ holds (step 904).

If $\delta_{k5} \leq 0$ holds, the handover controller 2i decides not to implement handover (step 905). On the other hand, if $\delta_{k5}>0$ holds, the handover controller 2i decides to implement handover (step 906) and, in accordance with the first to seventh embodiments, decides the handover terminal (step 907) and requests the RNC for handover (step 908). In response, the RNC selects a base station apparatus Node B, which has a different carrier frequency, as the handover destination and exercises control to hand over the target terminal to this base station.

The above-described processing makes it possible to reduce the processing load at the base station.

Further, consider two base stations Node B5 and Node B6 that cover the same area and use separate frequencies as another method of handover control. In accordance with the processing flow of FIG. 43, the RNC receives numbers $N_{UE,5}$, $N_{UE,6}$ of terminals accommodated by each base station (steps 951, 952) and compares these (step 953). In case of an imbalance such that $N_{UE,5} \gg N_{UE,6}$ holds, or in other words, when one is larger than the other by more than a set value, handover is performed from one node, namely Node B5, to the other node, namely Node B6 (step 954). Accordingly, handover from Node B6 to Node B5 is performed even in a case where $N_{UE,5} \ll N_{UE,6}$ holds. Handover is carried out using a method of the kind illustrated in the first to seventh embodiments. However, if one is larger than the other by more than a set value, handover control is not carried out (step 955).

By virtue of the control set forth above, an imbalance between the throughputs of the two base stations can be corrected, an imbalance in base-station loads can be reduced and load can be alleviated.

(J) Tenth Embodiment

Figure 44:
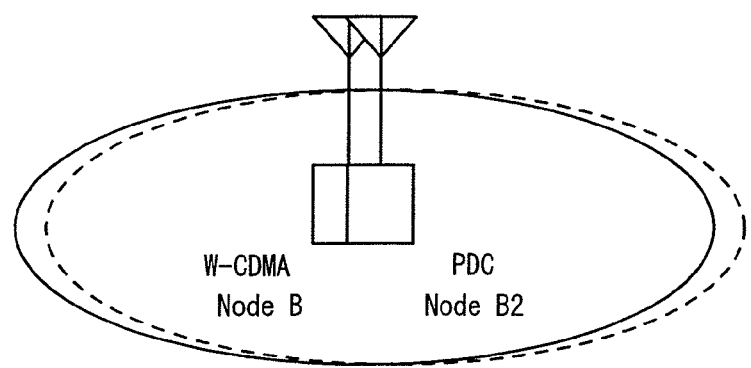
FIG. 44 is a first conceptual view of a tenth embodiment.
Figure 45:
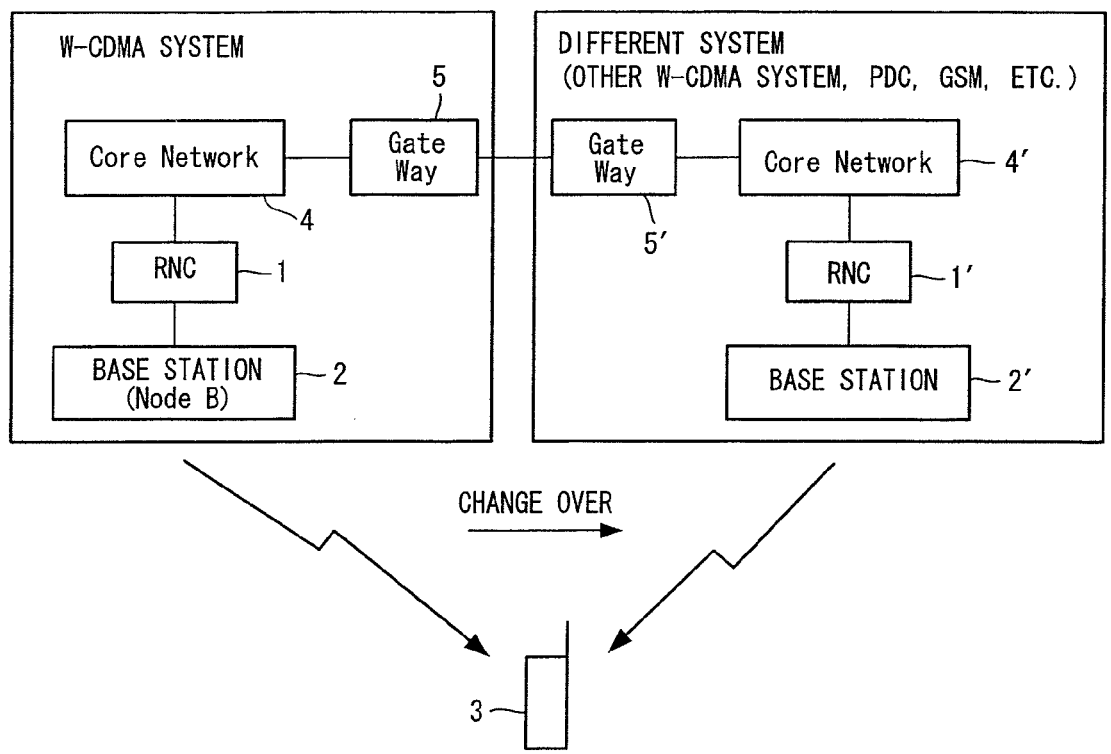
FIG. 45 is a second conceptual view of the tenth embodiment.
Figure 46:
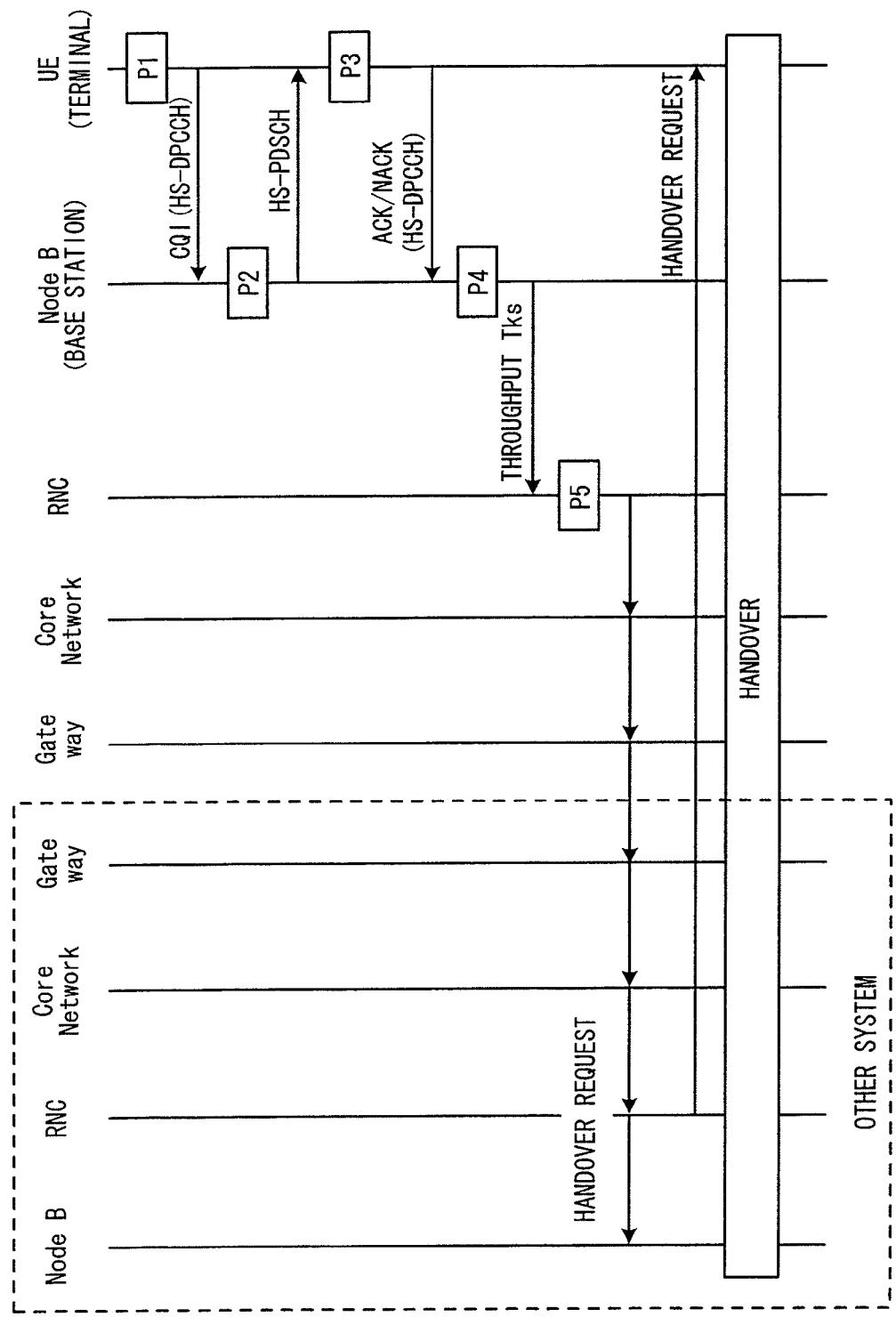
FIG. 46 illustrates a protocol in the tenth embodiment.
Figure 47:
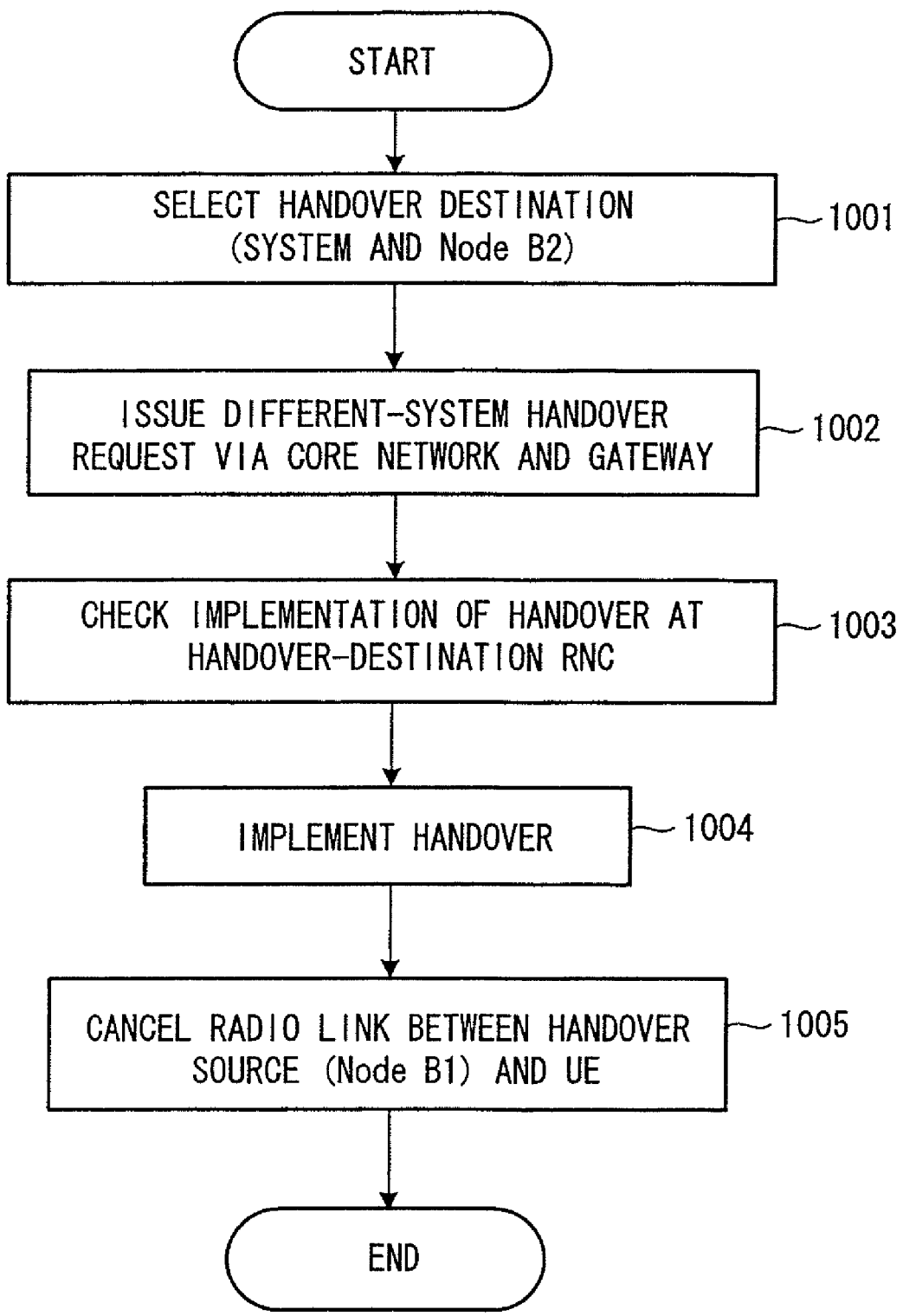
FIG. 47 is a processing flow according to the tenth embodiment.
Figure 48:
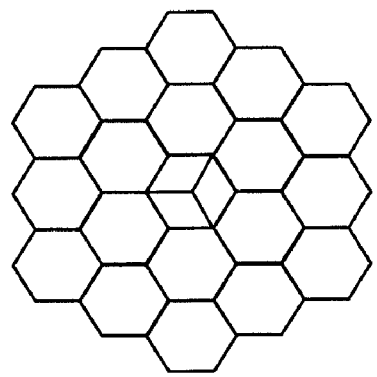
FIG. 48 is a diagram useful in describing service areas in a cellular configuration.
Figure 49:
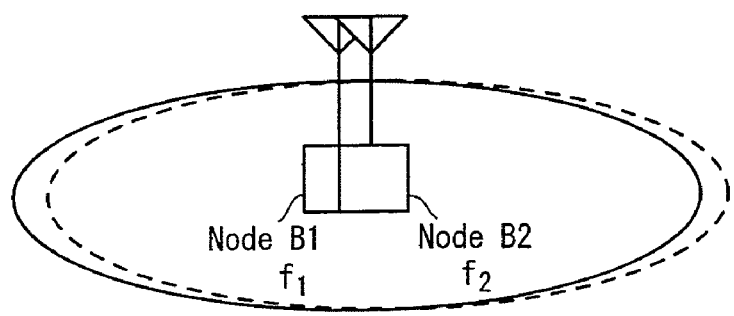
FIG. 49 is a diagram useful in describing a case where two frequencies have been assigned to one sector.
Figure 50:
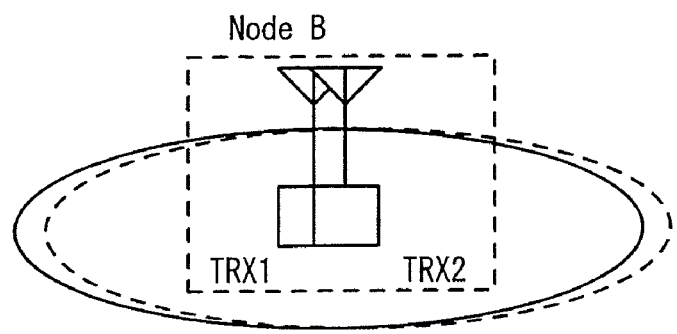
FIG. 50 is a diagram useful in describing an arrangement one Node B uses two frequencies.
Figure 51:
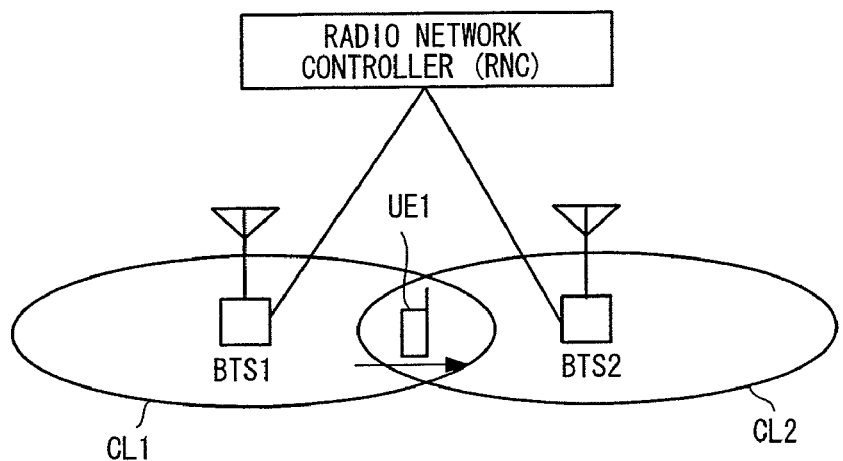
FIG. 51 is a diagram useful in describing handover.
Figure 52:
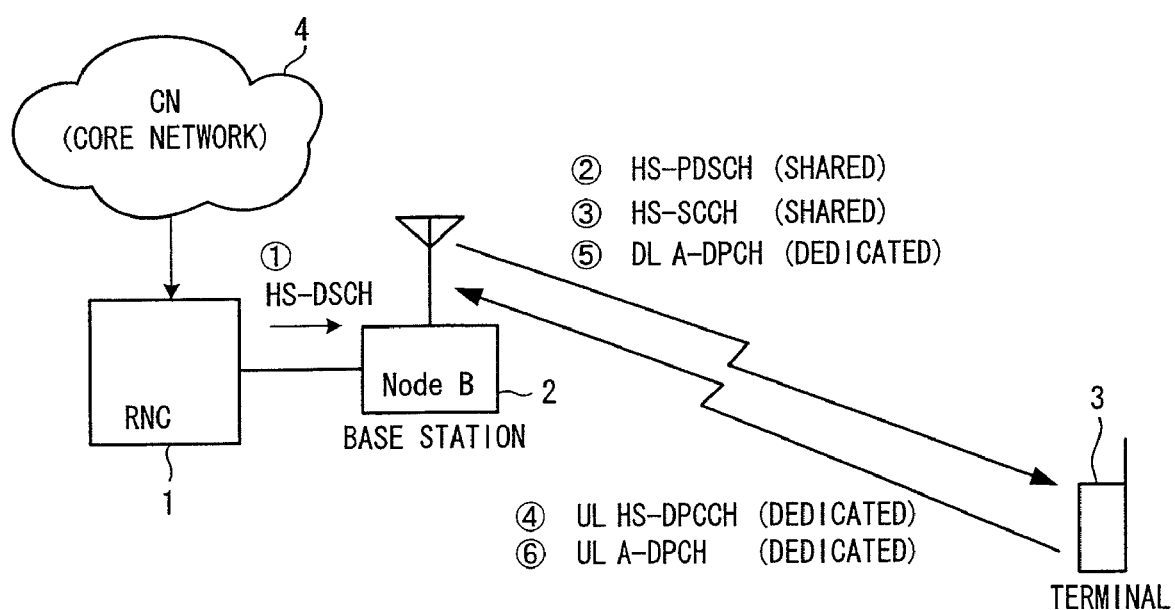
FIG. 52 is a schematic view of the configuration of an HSDPA system.
Figure 53:
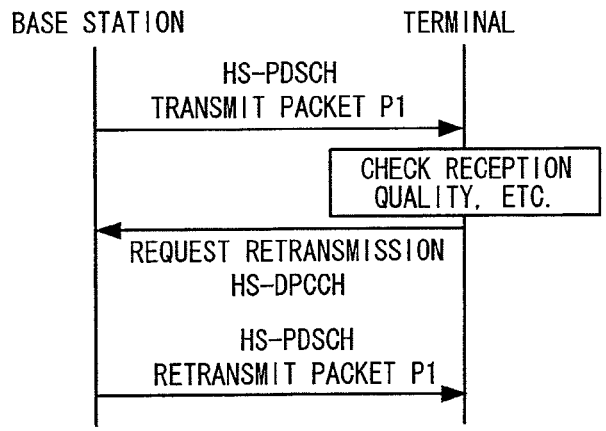
FIG. 53 is a diagram useful in describing flow of retransmission control.
Figure 54:
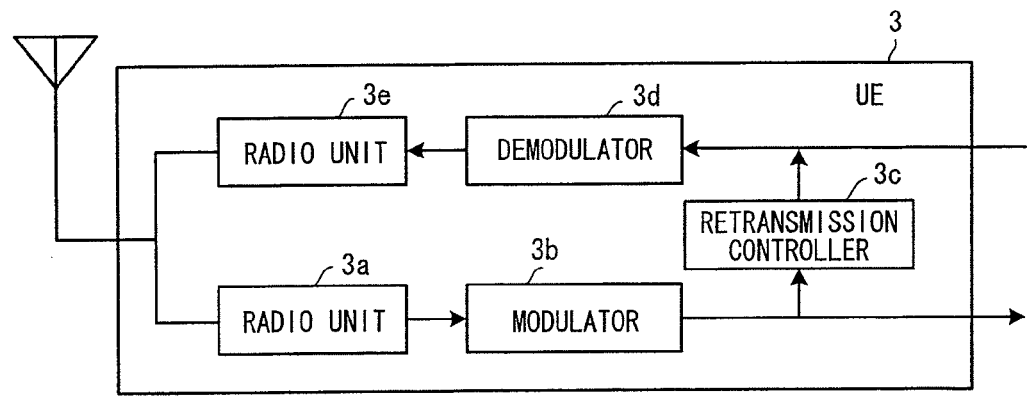
FIG. 54 is a structural view of a terminal UE.
Figure 55:
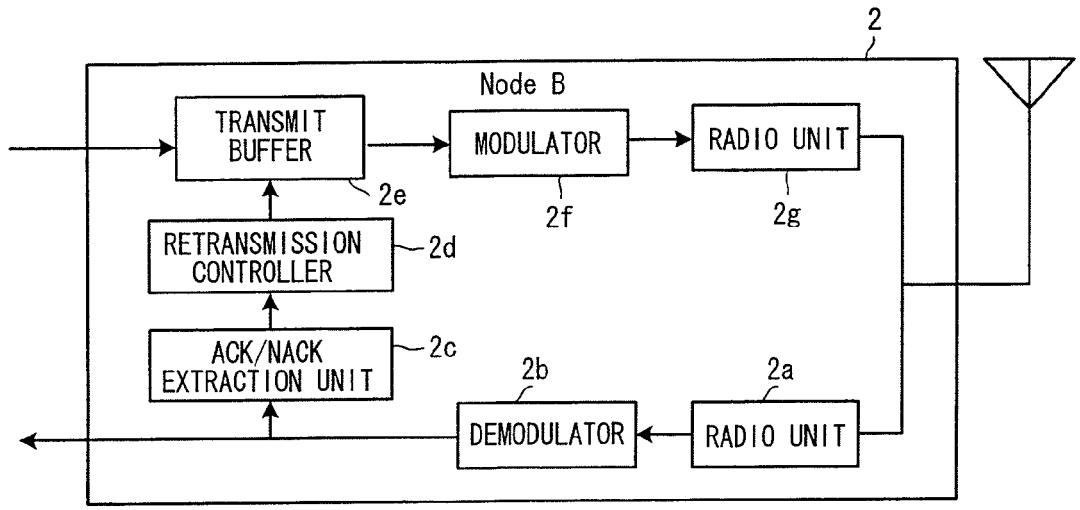
FIG. 55 is a structural view of a base station Node B.
Figure 56:
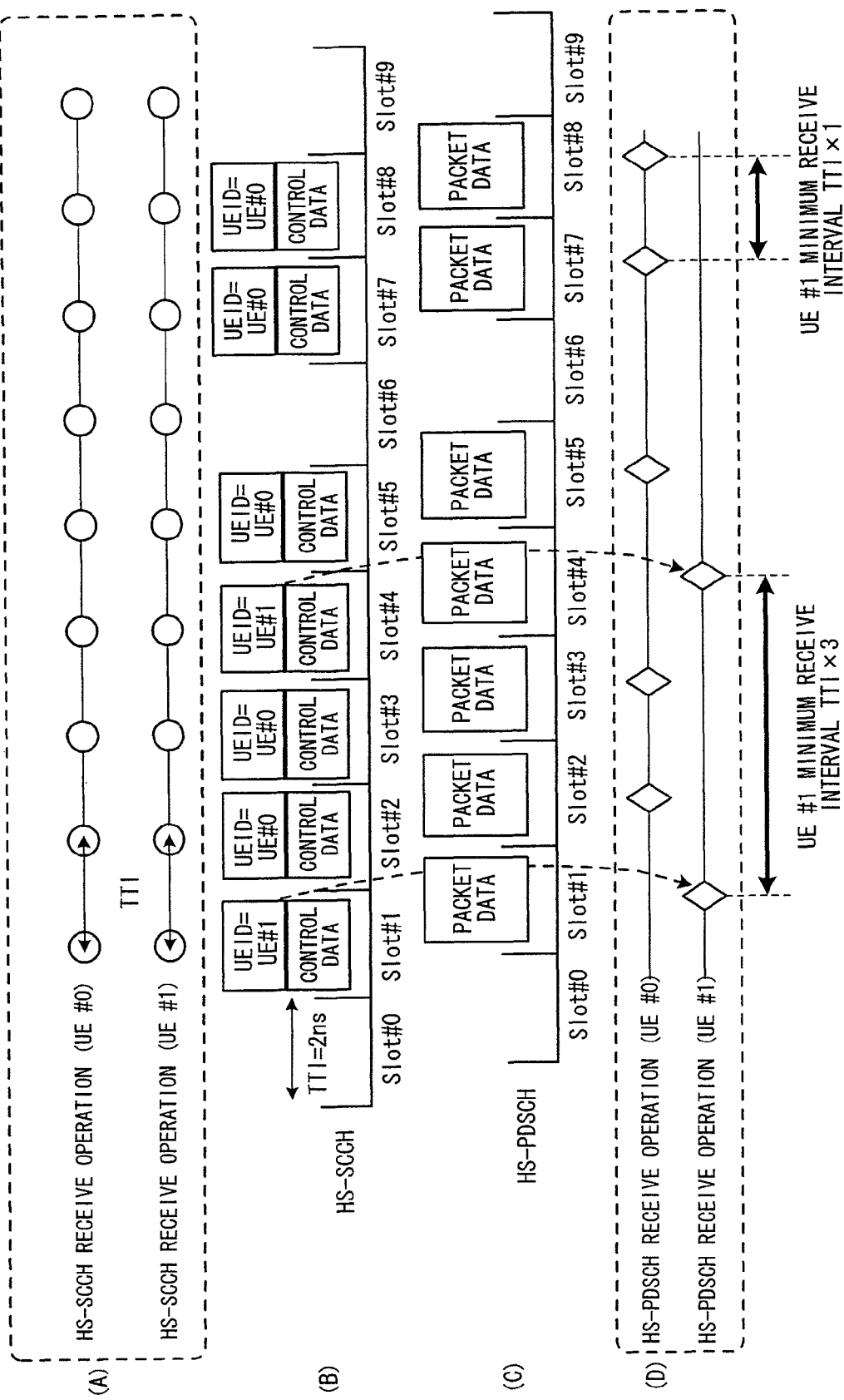
FIG. 56 is a diagram useful in describing a mechanism for receiving packet data on an HS-PDSCH.

A tenth embodiment implements handover to a different system. FIGS. 44 and 45 are conceptual views, FIG. 46 illustrates a protocol and FIG. 47 a processing flow.

In the first to ninth embodiments, handover is performed in the same system. In the tenth embodiment, however, it is assumed that the handover destination is a different system (e.g., W-CDMA→PDC, W-CDMA→GSM).

In a case where the location at which the terminal UEk1 is situated is being serviced by a plurality of mobile communication systems (e.g., W-CDMA and PDC, etc.) (FIG. 44), handover to a different system is carried out.

Processing for deciding the handover terminal and handover control apply the first to ninth embodiments. This embodiment differs in that it is necessary that handover be managed, controlled and implemented not only by the higher-order RNC 1 of the base station but between this and an RNC 1 that is at the handover destination. In other words, control is exercised in cooperation with the handover-destination RNC 1' or base station 2' through a gateway 5, which is the point of connection between the core network 4 constituting the higher layer of the RNC 1 and the other system (see FIG. 45).

Here the core network is constituted by, e.g., an MSC, GMSC, GGSN, etc., and implements line switching control or packet switching control. The core network establishes a connection to a different system via the gateway. Further, the different system is a W-CDMA system, PDC system or GSM system, etc., of a different provider. Furthermore, it is required that a terminal be capable of sending and receiving to and from a plurality of mobile communication systems. At present, a terminal of this kind is referred to as a dual-mode terminal. Terminals capable of being used in W-CDMA and GSM are commercially available.

Processing P1 to P4 in the protocol of FIG. 46 is identical with that of the first embodiment; only the processing of processing P5 differs. That is, in the processing P5, handover to a different system is requested in accordance with the processing flow shown in FIG. 47.

When implementation of handover is judged to be necessary at the RNC or node B based the first to ninth embodiments, a request to implement handover is sent to RNC 1' or Node B2' at the handover destination via the core network 4, which is the higher layer, and the gateway 5 at the point of connection to the other system (steps 1001, 1002). The RNC 1' or Node B2' at the handover destination that has received the request checks the possibility of handover implementation (step 1003) and, if it is found to be possible, requests the RNC 1 and Node B2 of the handover-source system to perform handover. In response, handover to the different system is performed using a different frequency or a different frequency and different modulation scheme (steps 1004, 1005).

By virtue of the foregoing, effects similar to those of the first to ninth embodiments can be obtained. Another effect is that a service (QoS) that could not be accommodated in a certain system becomes possible in another system by movement to this system.

The following effects are produced by the present invention as set forth above:

It is possible for a terminal to communicate without a failure such as loss of an image in the transmission of a moving picture.

A base station can reduce the processing load ascribable to communication. Further, it is possible to level the processing load between base stations and between frequencies. This makes it possible to provide services to new users.

Additional Note

1. A base station apparatus for wirelessly communicating with terminals, comprising:

means for monitoring a receiving state of each terminal;

detecting means for detecting, based upon the receiving state, a terminal in which there is a possibility that loss of a call or a decline in quality will occur or a terminal in which loss of a call or a decline in quality has occurred; and control means for exercising control for handing over said terminal to another base station apparatus having a different carrier frequency.

2. A mobile communication system having a terminal, a base station apparatus for wirelessly communicating with said terminal, and a radio network controller for controlling the base station apparatus, wherein, said base station apparatus comprises:

means for monitoring a receiving state of each terminal;

detecting means for detecting, based upon the receiving state, a terminal in which there is a possibility that loss of a call or a decline in quality will occur or a terminal in which loss of a call or a decline in quality has occurred; and handover control means for requesting a radio network controller to hand over said detected terminal to another base station apparatus; and said radio network controller comprises:

means for handing over said terminal to another base station apparatus, which has a carrier frequency different from that of the present base station apparatus, in response to said request.

3. A mobile communication system according to item 2, wherein said radio network controller performs handover to a different mobile communication system.

4. A handover method in a radio communication, comprising:

monitoring a receiving state of a terminal;

detecting, based upon the receiving state, a terminal in which there is a possibility that loss of a call or a decline in quality will occur or a terminal in which loss of a call or a decline in quality has occurred; and exercising control for handing over said terminal to another base station apparatus having a carrier frequency different from that of a present base station apparatus.

5. A base station apparatus for wirelessly communicating with terminals, comprising:

a receiver/demodulator for receiving and demodulating a signal that has been transmitted from a terminal;

an information extraction unit for extracting, from the demodulated data, information indicative of the receiving state of the terminal and retransmission control information indicative of arrival/non-arrival of data;

a transmit buffer for holding transmit data and retransmit data on a per-terminal basis;

a transmit-data size setting unit for setting size of data, which is transmitted to said terminal, based upon the receiving state of said terminal;

a transmit terminal selector for deciding, based upon the receiving state of each terminal, to which terminal the data of said size is to be transmitted;

a transmitter for modulating and transmitting the data of said size being held in said transmit buffer;

a transmission speed calculation unit for calculating transmission speed based upon size of said transmit data and time of transmission and time of reception of said data; and handover control means for exercising control, if a terminal requires handover based upon a required transmission speed, which is decided by service quality of said transmit data, and the calculated transmission speed, in such a manner that said terminal is handed over to another base station apparatus having a different carrier frequency.

6. A base station apparatus according to item 5, further comprising, means for storing a threshold value of transmission speed on a per-service-quality basis; wherein said handover controller decides a handover terminal based upon size of a difference between a speed margin value, which is the difference between said calculated transmission speed and said required transmission speed, and said speed threshold value.

7. A base station apparatus according to item 5, wherein said handover control means judges the necessity of handover with regard to each terminal based upon said required transmission speed and said calculated transmission speed, and requests a radio network controller to perform handover if handover is necessary and said radio network controller exercised control for handing over said terminal to another base station apparatus, which has a carrier frequency different from that of the present base station apparatus.

8. A base station apparatus according to item 5, wherein said handover control means inputs, on a per-terminal basis, the required transmission speed decided by service quality of said transmit data and said calculated transmission speed to a radio network controller; and said radio network controller judges the necessity of handover with regard to a terminal based upon said required transmission speed and said transmission speed received from the base station apparatus and, if handover is necessary, performs handover to another base station apparatus having a carrier frequency different from that of the present base station apparatus.

9. A base station apparatus according to item 5, further comprising:

priority setting means for setting order of priority between among terminals, order of priority among service qualities or order of priority among receiving states of terminals; and means for deciding a first order of priority of handover based upon the terminal, or service quality of transmit data or receiving quality of the terminal, and a second order of priority of handover based upon a difference between said required transmission speed and said calculated transmission speed; wherein said handover control means judges the necessity of handover with regard to each terminal based upon the first and second orders of priority, and hands over said terminal to another base station apparatus having a different carrier frequency if handover is necessary.

10. A handover method in a mobile communication system having terminals, a base station apparatus for wirelessly communicating with said terminals, and a radio network controller for controlling the base station apparatus, comprising:

receiving and demodulating a signal that has been transmitted from each terminal;

extracting CQI information, which is indicative of the receiving state of the terminal, from the demodulated data;

setting size of data, which is transmitted to said terminal, based upon the CQI information of said terminal;

calculating transmission speed based upon size of said transmit data and time of transmission and time of reception of said data; and judging whether handover is necessary with regard to each terminal based upon a required transmission speed, which is decided by service quality of said transmit data, and said calculated transmission speed, and handing over said terminal to another base station apparatus having a different carrier frequency if handover is necessary.

11. A handover method according to item 10, further comprising:

storing beforehand a threshold value of transmission speed on a per-service-quality basis; and deciding a handover terminal based upon size of a difference between a speed margin value, which is the difference between said calculated transmission speed and said required transmission speed, and said speed threshold value.

12. A base station apparatus for wirelessly communicating with terminals, comprising:

a receiver/demodulator for receiving and demodulating a signal that has been transmitted from a terminal;

an information extraction unit for extracting, from the demodulated data, information indicative of the receiving state of the terminal and retransmission control information indicative of arrival/non-arrival of data;

a transmit buffer for holding transmit data and retransmit data on a per-terminal basis;

a transmit-data size setting unit for setting size of data, which is transmitted to said terminal, based upon the receiving state of said terminal;

a transmit terminal selector for deciding, based upon the transmitting state of each terminal, to which terminal the data of said size is to be transmitted;

a transmitter for modulating and transmitting the data of said size being held in said transmit buffer;

a transmission delay time calculation unit for calculating transmission delay time based upon size of said transmit data and time of transmission and time of reception of said data; and handover control means for judging the necessity of handover with regard to each terminal based upon maximum allowable delay time, which is decided by service quality of said transmit data, and said calculated transmission delay time, and exercising control to hand over said terminal to another base station apparatus having a different carrier frequency if handover is necessary.

13. A base station apparatus according to item 12, wherein said handover control means judges the necessity of handover with regard to each terminal based upon said maximum allowable delay time and said calculated transmission delay time, and requests a radio network controller to perform handover if handover is necessary and said radio network controller exercises control for handing over said terminal to another base station apparatus, which has a carrier frequency different from that of the present base station apparatus.

14. A base station apparatus according to item 12, wherein said handover control means inputs, on a per-terminal basis, said maximum allowable delay time and said calculated transmission delay time to a radio network controller; and said radio network controller judges the necessity of handover with regard to a terminal based upon said maximum allowable delay time received from the base station apparatus and said calculated transmission delay time received from the base station apparatus, and performs handover to another base station apparatus having a carrier frequency different from that of the present base station apparatus if handover is necessary.

15. A base station apparatus according to item 12, further comprising:

a transmission speed calculation unit for calculating transmission speed based upon size of said transmit data and transmission time and reception time of said data; and means for deciding a first order of priority of handover based upon a required transmission speed, which is decided by the service quality of the transmit data, and said calculated transmission speed, and a second order of priority of handover based upon said maximum allowable delay time and said calculated transmission delay time; wherein said handover control means judges the necessity of handover with regard to each terminal based upon the first and second orders of priority, and hands over said terminal to another base station apparatus having a different carrier frequency if handover is necessary.

16. A handover method in a mobile communication system having terminals, a base station apparatus for wirelessly communicating with said terminals, and a radio network controller for controlling the base station apparatus, comprising:

receiving and demodulating a signal that has been transmitted from each terminal;

extracting CQI information, which is indicative of the receiving state of the terminal, from the demodulated data;

setting size of data, which is transmitted to said terminal, based upon the CQI information of said terminal;

calculating transmission delay time based upon size of said transmit data and time of transmission and time of reception of said data; and judging whether handover is necessary with regard to each terminal based upon a maximum allowable delay time, which is decided by service quality of said transmit data, and said calculated transmission delay time, and handing over said terminal to another base station apparatus having a different carrier frequency if handover is necessary.

17. A base station apparatus for wirelessly communicating with terminals, comprising:

a receiver/demodulator for receiving and demodulating a signal that has been transmitted from a terminal;

an information extraction unit for extracting, from the demodulated data, information indicative of the receiving state of the terminal and retransmission control information indicative of arrival/non-arrival of data;

a transmit buffer for holding transmit data and retransmit data on a per-terminal basis;

a transmit-data size setting unit for setting size of data, which is transmitted to said terminal, based upon the receiving state of said terminal;

a transmit terminal selector for deciding, based upon the transmitting state of each terminal, to which terminal the data of said size is to be transmitted;

a transmitter for modulating and transmitting the data of said size being held in said transmit buffer;

a transmission speed calculation unit for calculating transmission speed based upon size of said transmit data and time of transmission and time of reception of said data; and judging the necessity of handover with regard to each terminal based upon a difference between said calculated transmission speed and a transmission speed threshold value, and requesting a radio network controller to perform handover if handover is necessary; said terminal being handed over to another base station apparatus, which has a carrier frequency different from that of the present base station apparatus, by said radio network controller.

18. A base station apparatus for wirelessly communicating with terminals, comprising:

a receiver/demodulator for receiving and demodulating a signal that has been transmitted from a terminal;

an information extraction unit for extracting, from the demodulated data, information indicative of the receiving state of the terminal;

a transmit buffer for holding transmit data and retransmit data on a per-terminal basis;

a transmitter for modulating and transmitting the data being held in said transmit buffer;

a required transmission power calculation unit for calculating a required transmission power, which is necessary in order to maintain said terminal at a transmission quality above a fixed quality, based upon the information indicative of the receiving state of said terminal; and a handover controller for judging the necessity of handover based upon actual transmission power and the required transmission power, and requesting a radio network controller to perform handover if handover is necessary; wherein said terminal is handed over to another base station apparatus, which has a carrier frequency different from that of the present base station apparatus, by said radio network controller.

19. A base station apparatus for wirelessly communicating with terminals, comprising:

a receiver/demodulator for receiving and demodulating a signal that has been transmitted from a terminal;

an information extraction unit for extracting, from the demodulated data, information indicative of the receiving state of the terminal and retransmission control information indicative of arrival/non-arrival of data;

a transmit buffer for holding transmit data and retransmit data on a per-terminal basis;

a transmit-data size setting unit for setting size of data, which is transmitted to said terminal, based upon the receiving state of said terminal;

a transmit terminal selector for deciding, based upon the transmitting state of each terminal, to which terminal the data of said size is to be transmitted;

a transmitter for modulating and transmitting the data of said size being held in said transmit buffer;

a transmission speed calculation unit for calculating transmission speed based upon size of said transmit data and time of transmission and time of reception of said data;

a base station transmission speed calculation unit for calculating transmission speed of the overall base station using said transmission speed calculated with regard to each terminal; and a handover controller for judging the necessity of handover based upon required transmission speed of the overall base station and said calculated base station transmission speed and, if handover is necessary, deciding to which terminal handover is to be performed based upon required transmission speed, which is decided by service quality of transmit data, and said calculated transmission speed, and requesting a radio network controller to perform handover; wherein said terminal is handed over to another base station apparatus, which has a carrier frequency different from that of the present base station apparatus, by said radio network controller.

20. A base station apparatus according to item 19, further comprising means for comparing base station transmission speeds of neighboring base station apparatus and, if the difference is greater than a set value, handing over a terminal that is under the control of a base station having a high base station transmission speed to another neighboring base station apparatus.

21. A base station apparatus for wirelessly communicating with terminals, comprising:

a receiver/demodulator for receiving and demodulating a signal that has been transmitted from a terminal;

an information extraction unit for extracting, from the demodulated data, information indicative of the receiving state of the terminal and retransmission control information indicative of arrival/non-arrival of data;

a transmit buffer for holding transmit data and retransmit data on a per-terminal basis;

a transmit-data size setting unit for setting size of data, which is transmitted to said terminal, based upon the receiving state of said terminal;

a transmit terminal selector for deciding, based upon the transmitting state of each terminal, to which terminal the data of said size is to be transmitted;

a transmitter for modulating and transmitting the data of said size being held in said transmit buffer;

a transmission speed calculation unit for calculating transmission speed based upon size of said transmit data and time of transmission and time of reception of said data;

an accommodated-terminal-number calculation unit for calculating number of terminals accommodated by a base station; and a handover controller for judging the necessity of handover based upon an accommodated-terminal-number threshold value, which is a threshold value on number of terminals accommodated by the base station, and said calculated number of terminals accommodated and, if handover is necessary, deciding to which terminal handover is to be performed based upon required transmission speed, which is decided by service quality of transmit data, and said calculated transmission speed, and requesting a radio network controller to perform handover; wherein said terminal is handed over to another base station apparatus, which has a carrier frequency different from that of the present base station apparatus, by said radio network controller.

22. A base station apparatus according to item 21, further comprising means for comparing numbers of terminals accommodated by neighboring base station apparatuses and, if the difference is greater than a set value, handing over a terminal that is under the control of a base station having a large number of accommodated terminals to another neighboring base station apparatus.

What is claimed is:

1. A mobile communication system having a terminal, a base station apparatus for wirelessly communicating with said terminal, and a radio network controller for controlling the base station apparatus, wherein, said base station apparatus comprises:
a monitoring portion configured to monitor transmission speed of each terminal;
a detecting portion configured to detect, based upon a difference value between the transmission speed and a required transmission speed that conforms to QoS (quality of service) of transmitted data, a terminal in which there is a possibility that loss of a call or a decline in quality will occur; and
a handover control portion configured to request a radio network controller to hand over said detected terminal to another base station apparatus; and said radio network controller comprises:
a portion configured to hand over said terminal to another base station apparatus, which has a carrier frequency different from that of the present base station apparatus, in response to said request.

2. A mobile communication system according to claim 1, wherein said radio network controller performs handover to a different mobile communication system.

3. A base station apparatus for wirelessly communicating with a terminal, comprising:
a monitoring portion configured to monitor transmission speed of each terminal;
a detecting portion configured to detect, based upon a difference value between the transmission speed and a required transmission speed that conforms to QoS (quality of service) of transmitted data, a terminal in which there is a possibility that loss of a call or a decline in quality will occur; and
a handover control portion configured to request a radio network controller to hand over said detected terminal to another base station apparatus wherein said radio network controller hands over said terminal to another base station apparatus, which has a carrier frequency different from that of the present base station apparatus, in response to said request.

* * * * *